United States Patent
Ryan et al.

(10) Patent No.: US 12,465,438 B2
(45) Date of Patent: Nov. 11, 2025

(54) AUGMENTED REALITY ASSISTED NAVIGATION OF KNEE REPLACEMENT

(71) Applicant: INSIGHT MEDICAL SYSTEMS, INC., Austin, TX (US)

(72) Inventors: Matthew William Ryan, Aliso Viejo, CA (US); Jonathan Kirk Nielsen, Cedar Park, TX (US)

(73) Assignee: Insight Medical Systems, Inc., Austin, TX (US)

( * ) Notice: Subject to any disclaimer, the term of this patent is extended or adjusted under 35 U.S.C. 154(b) by 371 days.

(21) Appl. No.: 17/670,877

(22) Filed: Feb. 14, 2022

(65) Prior Publication Data

US 2022/0168051 A1 Jun. 2, 2022

Related U.S. Application Data

(63) Continuation of application No. PCT/US2021/017222, filed on Feb. 9, 2021, which is
(Continued)

(51) Int. Cl.
*A61B 34/00* (2016.01)
*A61B 17/00* (2006.01)
(Continued)

(52) U.S. Cl.
CPC ............ *A61B 34/25* (2016.02); *A61B 90/361* (2016.02); *G02B 27/0093* (2013.01);
(Continued)

(58) Field of Classification Search
CPC ................ A61B 17/1666; A61B 34/25; A61B 2090/365; A61F 2/4607; A61F 2/4609; G06T 19/006
See application file for complete search history.

(56) References Cited

U.S. PATENT DOCUMENTS 6,859,661 B2 * 2/2005 Tuke ..................... A61B 90/36
606/130
6,900,777 B1 5/2005 Hebert et al.
(Continued)

FOREIGN PATENT DOCUMENTS

AU 2022204673 A1 8/2022
CN 111031954 B 4/2020
(Continued)

OTHER PUBLICATIONS

Anonymous: "Simultaneous Localization and mapping—Wikipedia," dated Jul. 25, 2016, https://en.wikipedia.org/w/index.php?t itle=Simultaneous localization-and-mapping &oldid=731478358—[retrieved on Oct. 23, 2017].
(Continued)

*Primary Examiner* — Oommen Jacob
(74) *Attorney, Agent, or Firm* — Veros Legal Solutions, LLP

(57) ABSTRACT

Described here are self-contained surgical navigation systems which include a head-worn display device to be worn by a user during surgery. The system includes a display generator for generating a visual display on the display device, and a sensor suite having at least one tracking camera. The system further includes a support module including: a user-replaceable, modular battery that is removably insertable into a housing of the support module, and a processor unit configured to receive data from the sensor suite and calculate a position and an orientation of at least one marker. The support module is electrically coupled to the head-worn display device to provide power and data to the head-worn display device. The display device and the support module together comprise the entire sensing and computing capability of the system, without requiring exter-
(Continued)

nal sensors, cameras, computers, or other electrical equipment.

20 Claims, 62 Drawing Sheets

Related U.S. Application Data a continuation of application No. 16/786,938, filed on Feb. 10, 2020, now Pat. No. 11,071,596, which is a continuation-in-part of application No. PCT/US2018/018330, filed on Feb. 15, 2018, which is a continuation-in-part of application No. 15/674,749, filed on Aug. 11, 2017, now abandoned, said application No. PCT/US2018/018330 is a continuation-in-part of application No. PCT/US2017/046438, filed on Aug. 11, 2017.

(60) Provisional application No. 62/375,483, filed on Aug. 16, 2016.

(51) Int. Cl.
- *A61B 90/00* (2016.01)
- *G02B 27/00* (2006.01)
- *G02B 27/01* (2006.01)
- *G06T 7/73* (2017.01)
- *G06T 19/00* (2011.01)

(52) U.S. Cl.
CPC ............ *G02B 27/0172* (2013.01); *G06T 7/74* (2017.01); *G06T 19/006* (2013.01); *A61B 2017/00216* (2013.01); *A61B 2090/363* (2016.02); *A61B 2090/365* (2016.02); *G02B 2027/0187* (2013.01)

(56) References Cited

U.S. PATENT DOCUMENTS

| | | | |
|---|---|---|---|
| 8,933,935 B2 | 1/2015 | Yang et al. | |
| 10,013,808 B2 | 7/2018 | Jones et al. | |
| 10,016,243 B2 | 7/2018 | Esterberg | |
| 10,134,166 B2 | 11/2018 | Benishti et al. | |
| 10,194,990 B2 | 2/2019 | Amanatullah et al. | |
| 10,258,427 B2 | 4/2019 | Saget et al. | |
| 10,368,947 B2 | 8/2019 | Lang | |
| 10,398,514 B2 * | 9/2019 | Ryan ................. A61B 90/37 | |
| 10,548,667 B2 | 2/2020 | Flett | |
| 10,580,217 B2 | 3/2020 | Jones et al. | |
| 10,667,868 B2 | 6/2020 | Malackowski | |
| 10,747,301 B2 | 8/2020 | Shipes et al. | |
| 10,748,259 B2 | 8/2020 | Rodriguez et al. | |
| 10,825,248 B2 | 11/2020 | Miller | |
| 10,835,322 B2 | 11/2020 | Ruckel et al. | |
| 10,838,207 B2 | 11/2020 | Miller et al. | |
| 10,838,210 B2 | 11/2020 | Robaina et al. | |
| 10,838,577 B2 | 11/2020 | Helm et al. | |
| 10,839,576 B2 | 11/2020 | Hoover et al. | |
| 10,841,347 B2 | 11/2020 | Miller | |
| 10,841,556 B2 | 11/2020 | Casas | |
| 10,852,547 B2 | 12/2020 | Bhargava | |
| 10,854,165 B2 | 12/2020 | Chi et al. | |
| 10,951,872 B2 | 3/2021 | Casas | |
| 11,064,756 B2 | 7/2021 | Kidman et al. | |
| 11,082,462 B2 | 8/2021 | Miller | |
| 11,217,028 B2 | 1/2022 | Jones et al. | |
| 2002/0075201 A1 | 6/2002 | Sauer et al. | |
| 2002/0082498 A1 | 6/2002 | Wendt et al. | |
| 2004/0019274 A1 | 1/2004 | Galloway, Jr. et al. | |
| 2004/0111024 A1 * | 6/2004 | Zheng ................. A61B 6/466 | |
| | | | 600/426 |
| 2004/0181149 A1 | 9/2004 | Langlotz | |
| 2005/0203380 A1 | 9/2005 | Sauer et al. | |
| 2005/0281465 A1 | 12/2005 | Marquart | |
| 2006/0133069 A1 | 6/2006 | Clupper et al. | |
| 2007/0273610 A1 | 11/2007 | Baillot | |
| 2008/0013809 A1 | 1/2008 | Zhu et al. | |
| 2008/0202509 A1 | 8/2008 | Dillon | |
| 2008/0319491 A1 | 12/2008 | Schoenefeld | |
| 2009/0131941 A1 * | 5/2009 | Park ................. A61B 34/10 | |
| | | | 606/87 |
| 2009/0190815 A1 * | 7/2009 | Dam ................. A61B 5/4514 | |
| | | | 382/128 |
| 2009/0306499 A1 | 12/2009 | Van Vorhis et al. | |
| 2010/0292703 A1 * | 11/2010 | Couture .............. A61B 34/20 | |
| | | | 606/96 |
| 2013/0123801 A1 | 5/2013 | Umasuthan et al. | |
| 2013/0150863 A1 | 6/2013 | Baumgartner | |
| 2013/0237811 A1 * | 9/2013 | Mihailescu ............ G01S 17/66 | |
| | | | 600/407 |
| 2014/0022283 A1 | 1/2014 | Chan et al. | |
| 2014/0031668 A1 | 1/2014 | Mobasser | |
| 2014/0081659 A1 | 3/2014 | Nawana et al. | |
| 2014/0369584 A1 | 12/2014 | Fan et al. | |
| 2014/0375683 A1 | 12/2014 | Salter et al. | |
| 2015/0080072 A1 * | 3/2015 | Kim ................. A63F 13/814 | |
| | | | 463/7 |
| 2016/0000518 A1 * | 1/2016 | Thoranaghatte ......... G16B 5/00 | |
| | | | 703/11 |
| 2016/0125603 A1 | 5/2016 | Tanji et al. | |
| 2016/0143693 A1 | 5/2016 | Yilmaz et al. | |
| 2016/0143699 A1 * | 5/2016 | Tanji ................. A61B 34/20 | |
| | | | 600/431 |
| 2016/0183841 A1 | 6/2016 | Duindam et al. | |
| 2016/0191887 A1 * | 6/2016 | Casas ................. H04N 13/156 | |
| | | | 348/47 |
| 2016/0206379 A1 | 7/2016 | Flett et al. | |
| 2016/0225192 A1 * | 8/2016 | Jones ................. G06F 3/011 | |
| 2016/0275703 A1 | 9/2016 | Mariampillai et al. | |
| 2016/0324580 A1 | 11/2016 | Esterberg | |
| 2016/0338776 A1 * | 11/2016 | Jaramaz ................. A61B 34/10 | |
| 2017/0178375 A1 | 6/2017 | Benishti et al. | |
| 2017/0296292 A1 * | 10/2017 | Mahmood ................. G03H 5/00 | |
| 2017/0312031 A1 * | 11/2017 | Amanatullah .......... A61B 34/10 | |
| 2017/0312032 A1 | 11/2017 | Amanatullah et al. | |
| 2017/0322410 A1 | 11/2017 | Watson et al. | |
| 2018/0012416 A1 | 1/2018 | Jones et al. | |
| 2018/0032130 A1 | 2/2018 | Meglan | |
| 2018/0049622 A1 | 2/2018 | Ryan et al. | |
| 2018/0081179 A1 | 3/2018 | Samec et al. | |
| 2018/0168740 A1 | 6/2018 | Ryan et al. | |
| 2018/0185100 A1 | 7/2018 | Weinstein et al. | |
| 2018/0256256 A1 | 9/2018 | May et al. | |
| 2018/0286136 A1 | 10/2018 | Jones et al. | |
| 2018/0344309 A1 | 12/2018 | Nawana et al. | |
| 2018/0344412 A1 | 12/2018 | Esterberg | |
| 2019/0011709 A1 * | 1/2019 | Yadav ................. G06T 19/006 |
| 2019/0094981 A1 | 3/2019 | Bradski et al. | |
| 2019/0142520 A1 | 5/2019 | VanDyken | |
| 2019/0192230 A1 | 6/2019 | Siemionow et al. | |
| 2019/0192232 A1 | 6/2019 | Altmann et al. | |
| 2019/0231432 A1 | 8/2019 | Amanatullah | |
| 2019/0231433 A1 | 8/2019 | Amanatullah | |
| 2020/0038112 A1 | 2/2020 | Amanatullah et al. | |
| 2020/0078100 A1 | 3/2020 | Weinstein et al. | |
| 2020/0170807 A1 | 6/2020 | Bettenga | |
| 2020/0183171 A1 | 6/2020 | Robaina et al. | |
| 2020/0184640 A1 | 6/2020 | Mahadik et al. | |
| 2020/0197100 A1 | 6/2020 | Leung et al. | |
| 2020/0197107 A1 | 6/2020 | Ryan et al. | |
| 2020/0210127 A1 | 7/2020 | Browy | |
| 2020/0219324 A1 | 7/2020 | Jones et al. | |
| 2020/0226759 A1 | 7/2020 | Gliner | |
| 2020/0229877 A1 | 7/2020 | Siemionow et al. | |
| 2020/0237447 A1 | 7/2020 | Dohmen et al. | |
| 2020/0242848 A1 | 7/2020 | Ambler et al. | |
| 2020/0246081 A1 | 8/2020 | Johnson et al. | |
| 2020/0336721 A1 | 10/2020 | Casas | |
| 2020/0375272 A1 | 12/2020 | Ulmer et al. | |
| 2020/0390503 A1 | 12/2020 | Casas et al. | |
| 2020/0405398 A1 | 12/2020 | Amanatullah | |

(56) References Cited

U.S. PATENT DOCUMENTS

| | | |
|---|---|---|
| 2021/0011294 A1 | 1/2021 | Yadav et al. |
| 2021/0037224 A1 | 2/2021 | Casas |
| 2021/0045618 A1 | 2/2021 | Stricko et al. |
| 2021/0160472 A1 | 5/2021 | Casas |
| 2021/0241534 A1 | 8/2021 | Avisar et al. |
| 2021/0267698 A1 | 9/2021 | Siemionow et al. |
| 2021/0271080 A1 | 9/2021 | Schowengerdt et al. |
| 2021/0315310 A1 | 10/2021 | Kidman et al. |
| 2022/0151703 A1 | 5/2022 | VanDyken |
| 2022/0160439 A1 | 5/2022 | Ryan et al. |
| 2022/0168051 A1* | 6/2022 | Ryan .................. A61B 90/36 |

FOREIGN PATENT DOCUMENTS

| | | |
|---|---|---|
| CN | 115361916 A | 11/2022 |
| CN | 117752414 A | 3/2024 |
| EP | 3654867 A1 | 5/2020 |
| EP | 4385446 A2 | 6/2024 |
| JP | 2004530491 A | 10/2004 |
| JP | 2004538538 A | 12/2004 |
| JP | 2005304599 A | 11/2005 |
| JP | 2009538487 A | 11/2009 |
| JP | 2010500127 A | 1/2010 |
| JP | 2014120786 A | 6/2014 |
| JP | 2016512973 A | 5/2016 |
| JP | 2019534717 A | 12/2019 |
| WO | 2005088539 A1 | 9/2005 |
| WO | 2005088539 A2 | 9/2005 |
| WO | 2006079211 A1 | 8/2006 |
| WO | 2007139676 A2 | 12/2007 |
| WO | 2010067267 A1 | 6/2010 |
| WO | 2014200016 A1 | 12/2014 |
| WO | 2014200017 A1 | 12/2014 |
| WO | 2015192117 A1 | 12/2015 |
| WO | 2016207628 A1 | 12/2016 |
| WO | 2017185170 A1 | 11/2017 |
| WO | 2018063528 A1 | 4/2018 |
| WO | 2021163039 A1 | 8/2021 |

OTHER PUBLICATIONS

Baker et al. article entitled "The Emergence of Augmented Reality in Orthopaedic Surgery and Education," The Orthopaedic Journal at Harvard Medical School, vol. 16 Jun. 2015.
He et al. article entitled "An Inertial and Optical Sensor Fusion Approach for Six Degree-of-Freedom Pose Estimation," Sensors 2015, 15, 16448-16465; doi:10.3390/s150716448, ISSN 1424-8220 www.mdpi.com/journal/sensor.
Nikou et al. article entitled "Augmented Reality Imaging Technology for Orthopaedic Surgery," Operative Techniques in Orthopaedics, vol. 10, No. 1 Jan. 2000: pp. 82-88.
Sadda et al. article entitled "Surgical Navigation with a head-Mounted Tracking System and Display," Medicine Meets Virtual Reality 20, J.D. Westwood et al. (Eds.), IOS Press, 2013.
Wang et al. article entitled "Augmented Reality Navigation With Automatic Marker-Free Image Registration Using 3-D Image Overlay for Dental Surgery," IEEE Transactions on Biomedical Engineering, vol. 61, No. 4, Apr. 2014.
Wikipedia article entitled "Mixed Reality," dated Jun. 16, 2016 retrieved from Internet on Oct. 23, 2017.
Partial International Search and Provisional Opinion re PCT/US2017/046438 (13 pages).
International Search Report for PCT/US2017/046438 filed Aug. 11, 2017, dated Jan. 24, 2018, (6 pages).
International Search Report and Written Opinion dated May 23, 2018 re PCT/US2018/018330 filed Feb. 15, 2018 (19 pages).
International Search Report for PCT/US2021/017222 filed Feb. 2, 2021, dated Jun. 23, 2021, (16 pages).
Written Opinion of the International Searching Authority for PCT/US2017/046438 filed Aug. 11, 2017, dated Jan. 24, 2018, ., 0055-700.600.
Written Opinion of the International Searching Authority for PCT/US2021/017222 filed Feb. 2, 2021, dated Jun. 23, 2021, (7 pages).
International Preliminary Report on Patentability dated Aug. 11, 2022 (8 pages).
Extended European Search Report mailed Feb. 15, 2024 in 21753965.9.
Extended European Search Report mailed on Sep. 11, 2024 in 24172953.2.
Intention to grant mailed on Dec. 19, 2023 in EP 18707216.0.
Notice of Acceptance for Patent Application mailed on Nov. 11, 2024 in AU 2022204673.
Notification of Reason for Refusal mailed on Sep. 3, 2024 in JP 2022-548406.
Office Action mailed on Apr. 2, 2024 in JP 2022-084943.
Stoll et al. Assessment of Registration Accuracy During Computer-Aided Oncologic Limb-Salvage Surgery Int J CARS (2015).
Wong, K.C., "Image Fusion for Computer-Assisted Bone Tumor Surgery", Computational Radiology for Orthopaedic Interventions, Lecture Notes in Computational Vision and Biomechanics 23, Springer, published 2016, pp. 217-230.
AU Examination Report mailed Nov. 20, 2023.
AU Examination Report mailed Feb. 8, 2024.
CN Notice of Allowance mailed Aug. 15, 2023.
EP Examination Report mailed Mar. 30, 2023.
International Search Report mailed Jun. 23, 2021.
IPRP mailed Aug. 11, 2022.
JP Office Action, Notification of Reason for Refusal, mailed Apr. 4, 2023.
JP Office Action, Notification of Reason for Refusal, mailed Oct. 10, 2023.
Written Opinion mailed Jun. 23, 2021.

* cited by examiner

S7700

Create a database including NxM entries

S7710

Initialize the database

S7720

Output one or both of: a current varus/valgus angle or a current flexion/extension angle of a guide positioned at a target condylar angle

S7730

Determine a closest position to the target varus/valgus angle and flexion/extension angle in the database

S7740

When a reference depth was not previously recorded in the database, compute one or more of: a figure of merit, the current varus/valgus angle, the current flexion/extension angle, or a depth reference point in the database

S7750

When a reference depth was previously recorded in the database, compare one or both of a figure of merit for the current varus/valgus angle or a figure of merit for the current flexion/extension angle to the figure of merit in the database, and when the current figure of merit is less than the previously recorded reference depth, overwrite the reference depth in the database

Determine one or both of a current varus/valgus angle or a current flexion/extension angle of a cutting guide positioned at one or both of a desired depth or a desired angle

S7810

Determine a closest position to one or both of a target varus/valgus angle or a target flexion/extension angle in a database

S7820

When a valid reference depth point is not recorded in the database or the valid reference depth point cannot be interpolated, output an indicator that no reference point is available

S7830

When a valid reference depth point was recorded in the database or was interpolated, output an indicator that the valid reference point is available

FIG. 78

S8100
Attach one or more reference trackers to a bone and a stationary marker that is fixed with respect to the joint

S8110
Register points on the bone in the reference coordinate frame

S8120
Create a bone coordinate frame based on the registered points

S8130
Transform from the reference coordinate frame to the bone coordinate frame

S8140
Acquire points of the stationary tracker in the reference frame

S8150
Determine a joint center in the bone coordinate frame

Receive an inertial acceleration and rate data from the head-worn display and navigation system

S8210

Determine a location of a gravity vector in a head-worn display IMU frame of reference using an attitude estimator

S8220

Acquire an orientation in three-dimensional space of a reference marker with respect to a camera frame of reference

S8230

Generate a static transformation matrix from the camera frame of reference to the IMU frame of reference

S8240

Transform a unit vector in a Z direction of the inertial space from the IMU reference frame to the marker reference frame

FIG. 82

AUGMENTED REALITY ASSISTED NAVIGATION OF KNEE REPLACEMENT

CROSS-REFERENCE TO RELATED APPLICATIONS

This application claims priority to Patent Cooperation Treaty Application No. PCT/US2021/017222 filed Feb. 9, 2021; which is a continuation of U.S. patent application Ser. No. 16/786,938, filed Feb. 10, 2020; which is a continuation-in-part of Patent Cooperation Treaty Application No. PCT/US2018/18330 filed Feb. 15, 2018; which is a continuation-in-part of U.S. application Ser. No. 15/674,749 filed Aug. 11, 2017 and Patent Cooperation Treaty Application No. PCT/US2017/046438 filed Aug. 11, 2017, each of which claim the priority benefit of U.S. Provisional Application Ser. No. 62/375,483 filed on Aug. 16, 2016; the contents of each of which are incorporated by reference in their entireties for all purposes.

FIELD OF INVENTION

The present invention relates to novel visualization and sensory augmentation devices, systems, methods, and apparatuses for positioning, localization, and situational awareness during medical procedures including, but not limited to, surgical, diagnostic, therapeutic, and anesthetic procedures.

BACKGROUND INFORMATION

Current medical procedures are typically performed by a surgeon or medical professional with little or no assistance outside of the required tools to effect changes on the patient. For example, an orthopedic surgeon may have some measurement tools (e.g., rulers or similar) and cutting tools (e.g., saws or drills), but visual, audible, and/or tactile inputs to the surgeon are not assisted. In other words, the surgeon sees nothing but what he or she is operating on, hears nothing but the normal communications from other participants in the operating room, and feels nothing outside of the normal feedback from grasping tools or other items of interest in the procedure. Alternatively, large console type navigation or robotic systems are utilized in which the display and cameras are located outside the sterile field away from the surgeon. These require the surgeon to repeatedly shift his or her gaze between the surgical site and the two-dimensional display. Also, the remote location of the cameras introduces line-of-sight issues when drapes, personnel, and/or instruments obstruct the camera's view of the markers in the sterile field, and the vantage point of the camera does not lend itself to imaging within the wound. Anatomic registrations are typically conducted using a stylus with markers to probe in such a way that the markers are visible to the cameras.

SUMMARY OF INVENTION

The present invention provides projection of feedback necessary for the procedure(s) visually into the user's field of view that does not require an unnatural motion or turning of the user's head to view an external screen. The augmented or virtual display manifests to the user as a natural extension or enhancement of the user's visual perception. Further, sensors and cameras located in the headpiece of the user have the same vantage point as the user, which minimizes line of sight obscuration issues associated with external cameras. 3D mapping of anatomic surfaces and features with the present invention and matching them to models from pre-operative scans are faster and represent a more accurate way to register the anatomy during surgery than current stylus point cloud approaches.

The present invention comprises a novel sensory enhancement device or apparatus generally consisting of at least one augmentation for the user's visual, auditory, or tactile senses that assists in the conduct of medical procedures. Visual assistance can be provided in the form of real time visual overlays on the user's field of view in the form of augmented reality or as a replacement of the visual scene in the form of virtual reality. Auditory assistance can be provided in the form of simple beeps and tones or more complex sounds like speech and instruction. Tactile assistance can be provided in the form of simple warning haptic feedback or more complex haptic generation with the goal of guiding the user. In the preferred embodiments, the visual (augmented or virtual) assistance will be supplemented by audio or tactile or both audio and tactile feedback.

The present invention provides a mixed reality surgical navigation system comprising: a head-worn display device (e.g., headset or the like), to be worn by a user (e.g., surgeon) during surgery, comprising a processor unit, a display generator, a sensor suite having at least one tracking camera; and at least one visual marker trackable by the camera and fixedly attached to a surgical tool; wherein the processing unit maps three-dimensional surfaces of partially exposed surfaces of an anatomical object of interest with data received from the sensor suite; the processing unit establishes a reference frame for the anatomical object by matching the three dimensional surfaces to a three dimensional model of the anatomical object; the processing unit tracks a six-degree of freedom pose (comprised of location and orientation) of the surgical tool with data received from the sensor suite; the processing unit communicates with the display to provide a mixed reality user interface comprising stereoscopic virtual images of desired features of the surgical tool and desired features of the anatomical object in the user's field of view.

The present invention further provides a method of using a mixed reality surgical navigation system for a medical procedure comprising: (a) providing a mixed reality surgical navigation system comprising (i) a head-worn display device comprising a processor unit, a display, a sensor suite having at least one tracking camera; and (ii) at least one visual marker trackable by the camera; (b) attaching the display device to a user's head; (c) providing a surgical tool having the marker; (d) scanning an anatomical object of interest with the sensor suite to obtain data of three-dimensional surfaces of desired features of the anatomical object; (e) transmitting the data of the three-dimensional surfaces to the processor unit for registration of a virtual three-dimensional model of the desired features of the anatomical object; (f) tracking the surgical tool with a six-degree of freedom pose with the sensor suite to obtain data for transmission to the processor unit; and (g) displaying a mixed reality user interface comprising stereoscopic virtual images of the features of the surgical tool and the features of the anatomical object in the user's field of view.

The present invention further provides a mixed reality user interface for a surgical navigation system comprising: stereoscopic virtual images of desired features of a surgical tool and desired features of an anatomical object of interest in a user's field of view provided by a mixed reality surgical navigation system comprising: (i) a head-worn display device comprising a processor unit, a display, a sensor suite having at least one tracking camera; and (ii) at least one visual marker trackable by the camera; wherein the mixed reality user interface is obtained by the following processes: (a) attaching the head-worn display device to a user's head; (b) providing a surgical tool having the marker; (c) scanning a desired anatomical object with the sensor suite to obtain data of three-dimensional surfaces of partially exposed surfaces of the anatomical object; (d) transmitting the data of the three-dimensional surfaces to the processor unit for registration of a virtual three-dimensional model of the features of the anatomical object; (e) tracking the surgical tool with a six-degree of freedom pose with the sensor suite to obtain data for transmission to the processor unit; and (f) displaying a mixed reality user interface comprising stereoscopic virtual images of the features of the surgical tool and the features of the anatomical object in the user's field of view.

The present invention further provides a method for tracking a probe during a surgical procedure. For example, the method may include: receiving two-dimensional images of an internal anatomy of a patient using an ultrasound transducer; tracking a position and an orientation of the ultrasound transducer; tracking a position and an orientation of the patient; combining the two-dimensional images of the patient with the position and the orientation of the ultrasound transducer relative to patient; reconstructing the two-dimensional images in a common reference frame using the position and the orientation of the ultrasound transducer and the position and the orientation of the patient to produce a three-dimensional image of the internal anatomy of the patient; tracking a position and an orientation of a probe; displaying an axis and a location of a tip of the probe relative to the three-dimensional image of the internal anatomy of the patient; and advancing the tip of the probe to a desired position based on the location relative to the internal anatomy of the patient. The method may further include receiving two-dimensional images of an outer anatomy or outer surface of the patient using one or more stereo cameras or tracking cameras or ultrasound transducers; and displaying the two-dimensional image of the outer anatomy with the reconstructed three-dimensional images. The method may be used to monitor position, advancement, retraction, etc. of a pin, needle, screw, injection apparatus, probe, etc. The method may be performed by any of the head-worn display devices and/or mixed reality surgical systems described elsewhere herein.

One aspect of the present disclosure is directed to self-contained, head-worn surgical navigation system. In some embodiments, the system includes: a display generator for generating a visual display on the display device, a sensor suite having at least one tracking camera, and a processor unit configured to receive data from the sensor suite and calculate a position and an orientation of at least two markers by: determining a position of a first marker of the at least two markers within a field of view of the at least one tracking camera, displaying a virtual guide to the user on the display device to direct the user to a position of a second marker of the at least two markers relative to the first marker, and determining the position of the second marker with the at least one tracking camera based on the direction from the virtual guide.

Another aspect of the present disclosure is directed to a self-contained surgical navigation system. In some embodiments, the system includes: a head-worn display device to be worn by a user during surgery includes: a display generator for generating a visual display on the display device, and a sensor suite having at least one tracking camera. The system includes a support module including: a user-replaceable, modular battery that is removably insertable into a housing of the support module, and a processor unit configured to receive data from the sensor suite and calculate a position and an orientation of at least one marker.

In any of the preceding embodiments, the system further includes one or more of: a face shield and a helmet, such that the display device is mounted to the face shield or helmet.

In any of the preceding embodiments, the system further includes the at least one marker affixed to an object of interest for tracking the object of interest. In some such embodiments, the at least one marker is outside of a field of view of the at least one tracking camera, such that the processor unit is further configured to: track an angle of the head of the user using one or more sensors of the sensor suite; calculate a relative position of the at least one marker based on a last known position of the at least one marker when the at least one marker was positioned in the field of view of the at least one tracking camera, wherein the last known position is relative to the angle of the head; and display a virtual guide to the user on the display device to direct the user to a position of the at least one marker.

In any of the preceding embodiments, the support module is electrically coupled to the head-worn display device to provide power and data to the head-worn display device.

In any of the preceding embodiments, the support module is worn on a body of the user on a location other than a head of the user.

In any of the preceding embodiments, the display device and the support module together comprise the entire sensing and computing capability of the system, without requiring external sensors, cameras, computers, or other electrical equipment.

In any of the preceding embodiments, the system further includes: at least two markers affixed to an object of interest for tracking the object of interest. The first marker is within a field of view of the at least one tracking camera and a second marker is outside of the field of view of the at least one tracking camera. In some such embodiments, the processor unit is further configured to: determine a position of the first marker within the field of view of the at least one tracking camera, display a virtual guide to the user on the display device to direct the user to a position of the second marker relative to the first marker, and determine the position of the second marker with the at least one tracking camera based on the direction from the virtual guide.

In any of the preceding embodiments, the system further includes acquiring an initial position of the first marker and the second marker; and when the second marker is not in the field of view of the at least one tracking camera, estimating the position of the second marker relative to the first marker based on the acquired initial position.

In any of the preceding embodiments, the system further includes acquiring an initial position of the first marker and the second marker relative to known anatomical landmarks; calculating a distance between the known anatomical landmarks; and when the second marker is not in the field of view of the at least one tracking camera, estimating the position of the second marker relative to the first marker based on the calculated distance.

In any of the preceding embodiments, the system further includes tracking a movement of the head of the user using one or more sensors in the sensor suite; and calculating the position of the second marker based on a last known position of the second marker when the second marker was within the field of view of the at least one tracking camera.

In any of the preceding embodiments, the system further includes at least two markers affixed to an object of interest for tracking the object of interest. In some such embodiments, one or both of the at least two markers is outside of the field of view of the at least one tracking camera, such that the processor unit is further configured to: display a virtual control between the at least two markers; display a user input control that is configured to be aligned with the virtual control based on user input; adjusting a position of the virtual control when the user turns its head to align the user input control with the virtual control; and tracking the at least two markers in the field of view of the at least one tracking camera when the at least two markers are both in the field of view of the at least one tracking camera.

In any of the preceding embodiments, the head-worn display device further comprises an infrared light.

In any of the preceding embodiments, the system further includes a visible light and an infrared light filter coupled to the visible light, such that the visible light is prevented from emitting infrared light when the infrared light filter is coupled to the visible light.

In any of the preceding embodiments, the system further includes a shroud comprising a plurality of sidewalls arranged around the infrared light and defining an aperture through which light from the infrared light is emitted, In any of the preceding embodiments, the at least one tracking camera, the visible light, and the infrared light are positioned behind a face shield when the head-worn display device is attached to a helmet.

In any of the preceding embodiments, the plurality of sidewalls is in contact with the face shield when the head-worn display device is attached to the helmet such that light emitted by the infrared light is prevented from being reflected into the at least one tracking camera and only passes through the face shield.

In any of the preceding embodiments, the system further includes the face shield and the helmet.

In any of the preceding embodiments, the housing of the support module further includes a base comprising a circuit board arranged for directing electrical power from the battery to the processor unit and the head-worn display device.

In any of the preceding embodiments, the housing of the support module further comprises a bracket configured to securely and removably restrain the battery and the processor unit when positioned in the bracket.

Another aspect of the present disclosure is directed to a self-contained surgical navigation system configured for use with a helmet and a face shield. In some embodiments, the system includes a head-worn display device to be worn by a user during surgery comprising: a display generator for generating a visual display on the display device, a sensor suite having at least one tracking camera, a visible light, an infrared light, and a processor unit configured to receive data from the sensor suite and calculate a position and an orientation of at least one marker.

In any of the preceding embodiments, the system further includes a shroud comprising a plurality of sidewalls arranged around the infrared light and defining an aperture through which light from the infrared light is emitted.

In any of the preceding embodiments, the at least one tracking camera, the visible light, and the infrared light are positioned behind a face shield when the head-worn display device is attached to a helmet.

In any of the preceding embodiments, the plurality of sidewalls is in contact with the face shield when the head-worn display device is attached to the helmet such that light emitted by the infrared light is prevented from being reflected into the at least one tracking camera and only passes through the face shield.

In any of the preceding embodiments, the system further includes an infrared light filter coupled to the visible light, such that the visible light is prevented from emitting infrared light when the infrared light filter is coupled to the visible light.

In any of the preceding embodiments, the system further includes at least two markers affixed to an object of interest for tracking the object of interest, wherein a first marker is within a field of view of the at least one tracking camera and a second marker is outside of the field of view of the at least one tracking camera. In some such embodiments, the processor unit is further configured to: determine a position of the first marker within the field of view of the at least one tracking camera, display a virtual guide to the user on the display device to direct the user to a position of the second marker relative to the first marker, and determine the position of the second marker with the at least one tracking camera based on the direction from the virtual guide.

In any of the preceding embodiments, the system further includes a support module comprising: a user-replaceable, modular battery that is removably insertable into a housing of the support module, and a processor unit configured to receive data from the sensor suite and calculate a position and an orientation of at least one marker.

In any of the preceding embodiments, the support module is electrically coupled to the head-worn display device to provide power and data to the head-worn display device.

In any of the preceding embodiments, the support module is worn on a body of the user on a location other than a head of the user.

In any of the preceding embodiments, the display device and the support module together comprise the entire sensing and computing capability of the system, without requiring external sensors, cameras, computers, or other electrical equipment.

In any of the preceding embodiments, the shroud has a monolithic construction.

In any of the preceding embodiments, a front surface coupled to the plurality of sidewalls is in contact with the face shield and has a radius of curvature that matches a radius of curvature of the face shield.

In any of the preceding embodiments, a front surface coupled to the plurality of sidewalls is in contact with the face shield and has a radius of curvature that approximately matches a radius of curvature of the face shield.

In any of the preceding embodiments, one or more of the plurality of sidewalls is angled 10 to 20 degrees relative to a central axis of the infrared light.

Another aspect of the present disclosure is directed to a self-contained surgical navigation system configured for use with a helmet and a face shield. In some embodiments, the system includes a head-worn display device to be worn by a user during surgery comprising: a display generator for generating a visual display on the display device, wherein the display device is mounted to one or more of: a surgical helmet and a face shield, and a sensor suite having at least one tracking camera.

In any of the preceding embodiments, the system further includes a support module comprising: a user-replaceable, modular battery that is removably insertable into a housing of the support module, and a processor unit.

In any of the preceding embodiments, the support module is electrically coupled to the head-worn display device to provide power and data to the head-worn display device.

In any of the preceding embodiments, the support module is worn on a body of the user on a location other than a head of the user.

In any of the preceding embodiments, the display device and the support module together comprise an entire sensing and computing capability of the system, without requiring external sensors, cameras, computers, or other electrical equipment.

In any of the preceding embodiments, the processor unit is configured to receive data from the sensor suite and calculate a position and an orientation of at least two markers by: determining a position of a first marker of the at least two markers within a field of view of the at least one tracking camera, displaying a virtual guide to the user on the display device to direct the user to a position of a second marker of the at least two markers relative to the first marker, and determining the position of the second marker with the at least one tracking camera based on the direction from the virtual guide.

Another aspect of the present disclosure is directed to a head-worn surgical navigation system for determining a joint center. Any of the head-worn surgical systems described herein may be used to determine a joint center. The system may include a display generator for generating a visual display on the display device; a sensor suite having at least one tracking camera; at least one reference marker affixed to a bone for tracking the bone, wherein the bone is positioned such that the bone pivots at a joint or relative to the joint; at least one stationary reference marker positioned such that is it substantially fixed with respect to the joint; and a processor unit. The processor unit may be configured to: register points on the bone in a reference coordinate frame; create a bone coordinate frame based on the registered points; transform from the reference coordinate frame to the bone coordinate frame; acquire, using the at least one tracking camera, points of the at least one stationary marker in the reference frame, such that, during acquisition, a position of at least a portion of the visual display moves synchronously with movement of the head-worn surgical navigation system; and determine a joint center in the bone coordinate frame.

In any of the preceding embodiments, determining comprises computing a location of the joint center in the bone coordinate system; processing substantially continuously through an optimal estimation filter to determine the joint center; determining comprises batch processing, after acquisition of all points, to determine the joint center; or a combination thereof.

In any of the preceding embodiments, the bone is one of: a femur, a tibia, a humerus, a radius, or a vertebral body.

In any of the preceding embodiments, the joint is one of: a hip, a knee, a shoulder, a elbow, an ankle, or a vertebral body.

In any of the preceding embodiments, stationary further comprises fixed in inertial space.

Another aspect of the present disclosure is directed to a head-worn surgical navigation system for determining a hip center. Any of the head-worn surgical navigation systems described herein may be used. The system may include a display generator for generating a visual display on the display device; a sensor suite having at least one tracking camera; at least one reference marker affixed to a femur for tracking the femur, wherein the femur is positioned such that the femur pivots at a hip or relative to the hip; at least one stationary reference marker positioned such that is it substantially fixed with respect to the hip; and a processor unit. The processor unit is configured to register points on the femur in a reference coordinate frame; create a femoral coordinate frame based on the registered points; transform from the reference coordinate frame to the femoral coordinate frame; acquire, using the at least one tracking camera, points of the at least one stationary marker in the reference frame, wherein, during acquisition, a position of at least a portion of the visual display moves synchronously with movement of the head-worn surgical navigation system; and determine a hip center in the femoral coordinate frame.

In any of the preceding embodiments, determining further comprises computing a location of the hip center in the femoral coordinate system; processing substantially continuously through an optimal estimation filter to determine the hip center; batch processing, after acquisition of all points, to determine the hip center; or a combination thereof.

In any of the preceding embodiments, stationary further comprises fixed in inertial space.

Another aspect of the present disclosure is directed to a method of registering a condylar surface before setting a resection angle, such that the method is performed by any of the head-worn surgical navigation systems described herein. The method is performed by a processor unit and comprises: displaying, on a display of the head-worn surgical navigation system, a target comprising one or more regions; providing, on the display, a movable icon that represents one or more angles received from a condylar guide in real-time; receiving one or more user inputs to adjust a position of the movable icon with respect to the one or more regions in the target; and outputting, on the display, a visual marker on any of the one or more regions of the target that the movable icon interacts with during the adjustment of the position of the movable icon, such that the visually marked regions indicate captured and valid depth reference points.

In any of the preceding embodiments, the method further includes restricting a movement of the movable icon to prevent recording previously captured, valid depth reference points.

In any of the preceding embodiments, the method further includes forming a database in which the captured and valid depth reference points are stored In any of the preceding embodiments, the target is a grid or a bullseye.

In any of the preceding embodiments, each of the one or more regions is sequentially highlighted such that the method includes outputting, on the display, instructions to the user to move the condylar guide relative to the condyle until the movable icon at least partially overlaps the highlighted region.

In any of the preceding embodiments, any one of the one or more regions is highlighted such that the method includes outputting, on the display, instructions to the user to move the condylar guide relative to the condyle until the movable icon at least partially overlaps the highlighted region.

In any of the preceding embodiments, the method further includes, upon at least partially overlapping the highlighted region with the movable icon, inactivating the highlighted region and highlighting a second region of the one or more regions.

In any of the preceding embodiments, the method further includes prompting a user to remove the condylar guide and attach a cutting guide.

In any of the preceding embodiments, the method further includes calculating a resection depth based on a distance from a current resection plane defined by the cutting guide to one of the valid depth reference point corresponding to a depth reference plane.

In any of the preceding embodiments, the method further includes providing a condylar guide comprising: a body having a first end and a second end; at least one planar surface extending from a side region of at least a portion of the first end, such that the planar surface is configured to rest on one or more femoral condyles and construct a zero-depth plane for calculating a resection depth; at least one tracker positioned on the at least one planar surface for tracking a pose of the condylar guide; and a connector extending from the second end of the body and configured to couple to a cutting guide.

In any of the preceding embodiments, the condylar guide includes an elongate handle extending from the first end of the body.

In any of the preceding embodiments, the body of the condylar guide further defines an aperture that is configured to receive a pin therethrough for insertion into a bone In any of the preceding embodiments, a diameter of the aperture is sized such that it allows the condylar guide to be tilted when a pin is inserted through the aperture.

In any of the preceding embodiments, the condylar guide further includes a release mechanism extending from the second end of the body in a direction opposite of the connector. In any of the preceding embodiments, the release mechanism is configured to couple the condylar guide to the bone before pinning the cutting guide to the bone.

In any of the preceding embodiments, at least a portion of the second end of the body of the condylar guide defines a slot configured to receive a slider into which the connector and the release mechanism are inserted on opposing sides of the slider.

In any of the preceding embodiments, the at least one planar surface of the condylar guide is configured to simulate a plane tangent to a femoral condyle.

In any of the preceding embodiments, the method further includes tracking the condylar guide using the at least one tracker positioned on the at least one planar surface to determine one or more valid depth reference points.

In any of the preceding embodiments, the method further includes pinning the cutting guide only after using the condylar guide coupled to the cutting guide to determine the one or more valid depth reference points.

In any of the preceding embodiments, the connector of the condylar guide is removable.

Another aspect of the present disclosure is directed to a method of registering a condylar surface before setting a resection angle, such that the method is performed by any of the head-worn surgical navigation systems described herein. The method is performed by a processor unit and comprises: displaying, on a display of the head-worn surgical navigation system, a target comprising one or more regions; receiving and displaying, on the display, one or more angles received from a condylar guide in real-time; receiving one or more user inputs to adjust the condylar guide with respect to the one or more regions in the target; and outputting, on the display, a visual marker on any of the one or more regions of the target, wherein the visually marked regions indicate captured and valid depth reference points.

In any of the preceding embodiments, the method further includes restricting recording of previously captured, valid depth reference points.

In any of the preceding embodiments, the method further includes forming a database in which the captured and valid depth reference points are stored In any of the preceding embodiments, the target is a grid or a bullseye.

In any of the preceding embodiments, each of the one or more regions is sequentially highlighted such that the method includes outputting, on the display, instructions to the user to move the condylar guide relative to the condyle until an angle of the condylar guide at least partially overlaps the highlighted region.

In any of the preceding embodiments, the method further includes any one of the one or more regions is highlighted such that the method includes outputting, on the display, instructions to the user to move the condylar guide relative to the condyle until an angle of the condylar guide at least partially overlaps the highlighted region.

In any of the preceding embodiments, the method further includes, upon at least partially overlapping the highlighted region with the angle of the condylar guide, inactivating the highlighted region and highlighting a second region of the one or more regions.

In any of the preceding embodiments, the method further includes prompting a user to remove the condylar guide and attach a cutting guide.

In any of the preceding embodiments, the method further includes calculating a resection depth based on a distance from a current resection plane defined by the cutting guide to one of the valid depth reference point corresponding to a depth reference plane.

In any of the preceding embodiments, the method further includes providing a condylar guide comprising: a body having a first end and a second end; at least one planar surface extending from a side region of at least a portion of the first end, such that the planar surface is configured to rest on one or more femoral condyles and construct a zero-depth plane for calculating a resection depth; at least one tracker positioned on the at least one planar surface for tracking a pose of the condylar guide; and a connector extending from the second end of the body and configured to couple to a cutting guide.

In any of the preceding embodiments, the condylar guide includes an elongate handle extending from the first end of the body.

In any of the preceding embodiments, the body of the condylar guide further defines an aperture that is configured to receive a pin therethrough for insertion into a bone In any of the preceding embodiments, a diameter of the aperture defined by the body is sized such that it allows the condylar guide to be tilted when a pin is inserted through the aperture.

In any of the preceding embodiments, the condylar guide includes a release mechanism extending from the second end of the body in a direction opposite of the connector, such that the release mechanism is configured to couple the condylar guide to the bone before pinning the cutting guide to the bone.

In any of the preceding embodiments, at least a portion of the second end of the body defines a slot configured to receive a slider into which the connector and the release mechanism are inserted on opposing sides of the slider.

In any of the preceding embodiments, the at least one planar surface is configured to simulate a plane tangent to a femoral condyle.

In any of the preceding embodiments, the method further includes tracking the condylar guide using the at least one tracker positioned on the at least one planar surface to determine one or more valid depth reference points.

In any of the preceding embodiments, the method further includes pinning the cutting guide only after using the condylar guide coupled to the cutting guide to determine the one or more valid depth reference points.

BRIEF DESCRIPTION OF THE DRAWINGS

Some embodiments of the present invention are illustrated as an example and are not limited by the figures of the accompanying drawings, in which like references may indicate similar elements and in which:

FIG. 77 shows one embodiment of a method of storing and assessing reference depths in a database during condylar surface mapping.

FIG. 78 shows one embodiment of a method of retrieving reference depths from a database during condylar surface mapping.

FIG. 81 shows one embodiment of a method of determining a joint center for a surgical procedure.

FIG. 82 shows one embodiment of a method of determining an orientation of a marker in inertial space.

DETAILED DESCRIPTION OF THE INVENTION

Figure 1:
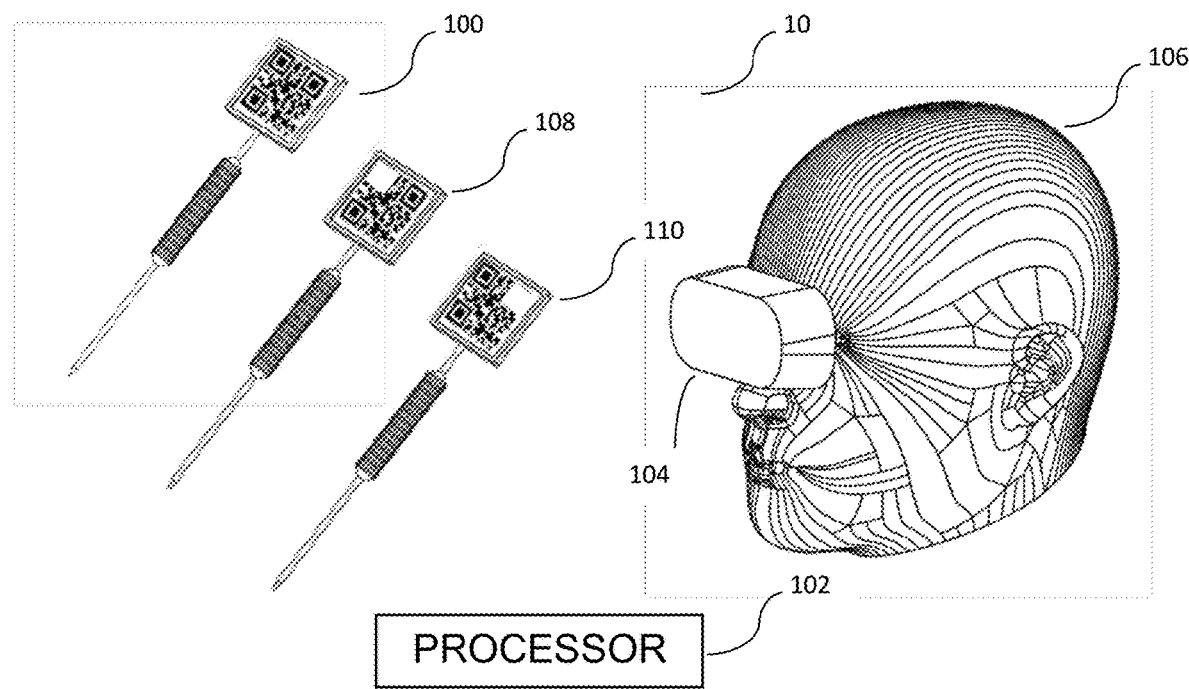
FIG. 1 is a diagrammatic depiction of an augmentation system in accordance with the principles of the present invention.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, and/or groups thereof.

Unless otherwise defined, all terms (including technical and scientific terms) used herein have the same meaning as commonly understood by one having ordinary skill in the art to which this invention belongs. It will be further understood that terms such as those defined in commonly used dictionaries should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and claims.

New sensory augmentation devices, apparatuses, and methods for providing data to assist medical procedures are discussed herein. In the following description, for purposes of explanation, numerous specific details are set forth in order to provide a thorough understanding of the present invention. It will be evident, however, to one skilled in the art that the present invention may be practiced without the specific details.

Further, it shall also be appreciated by one of skill in the art that any of the embodiments described herein can be combined with any other embodiments. For example, any combination of face shield, helmet, display device, etc. is contemplated herein. Further any processor unit executable method may be practiced with any combination of face shield, helmet, display device, etc. described herein or generally available in the art.

I. The Sensory Augmentation System

Referring to FIGS. 1, 2A-B, and 3, a sensory augmentation system 10 of the present invention is provided for use in medical procedures. The system 10 includes one or more visual markers (100, 108, 110), a processing unit 102, a sensor suite 210 having one or more tracking camera(s) 206, and a display device 104 having a display generator 204 that generates a visual display on the display device 104 for viewing by the user 106. The display device 104 is attached to a user 106 such that the display device 104 can augment his visual input. In one embodiment, the display device 104 is attached to the user's 106 head. Alternatively, the display device 104 is located separately from the user 106, while still augmenting the visual scene. In one embodiment, each of the markers (100, 108, and 110) is distinct and different from each other visually so they can be individually tracked by the camera(s) 206.

Figure 2A:
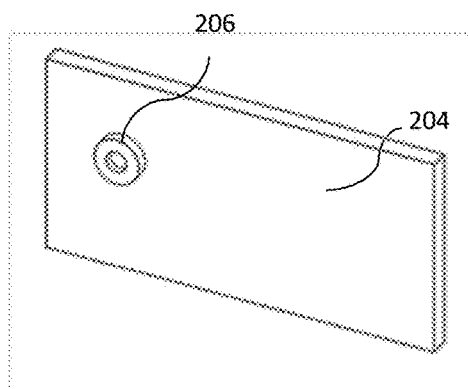
FIG. 2A shows a perspective front view of a diagrammatic depiction of a display device of the system of FIG. 1.
Figure 2B:
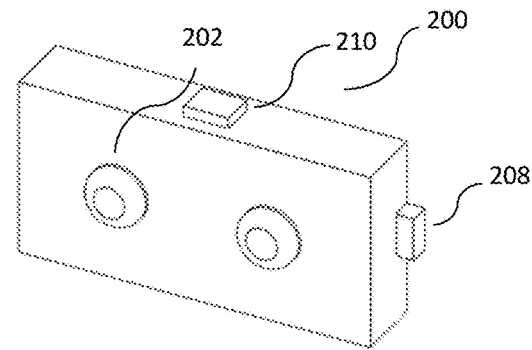
FIG. 2B shows a perspective back view of the display device of FIG. 2A.

Referring to FIGS. 2A-2B, another exemplary embodiment of the display device 104 includes a visor housing 200 having optics 202 that allow focusing of the display generator's 204 video display onto the user's 106 eyes. The sensor suite 210 is attached to or made part of the display device 104. The visor housing 200 includes an attachment mechanism 208 that allows attachment to the user's 106 head or face such that the alignment of the display device 104 to the user's 106 visual path is consistent and repeatable.

Figure 3:
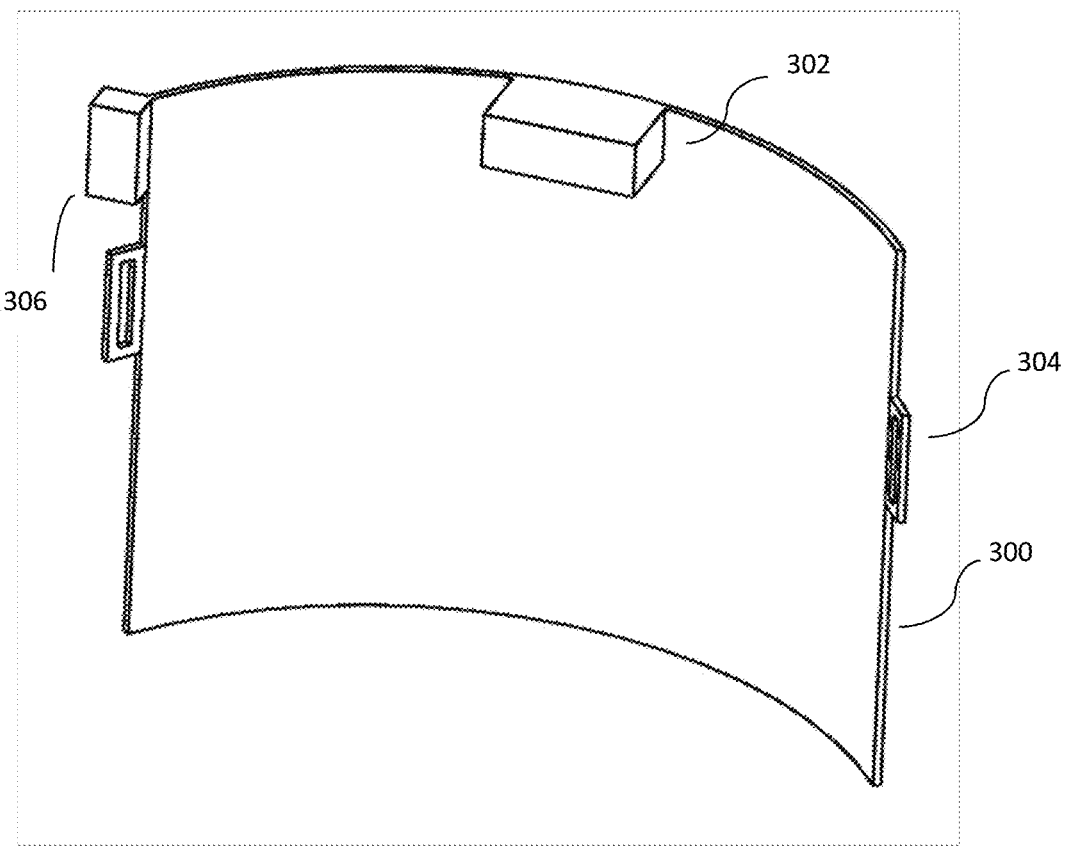
FIG. 3 is a diagrammatic depiction of another embodiment of the display device of the system of FIG. 1.

Referring to FIG. 3, another exemplary embodiment of the display device 104 includes a clear face shield 300 that allows a projection from the display generator 302 onto the shield 300 that overlays data and imagery within the visual path of the user's 106 eyes. The sensor suite 306 is attached to or made part of the display device, shown here as face shield 300. The face shield 300 further includes the attachment mechanism 304. The sensor suite 306 and the attachment mechanism 304 serve the same functions as the sensor suite 210 and the attachment mechanism 208 described above.

Figure 4:
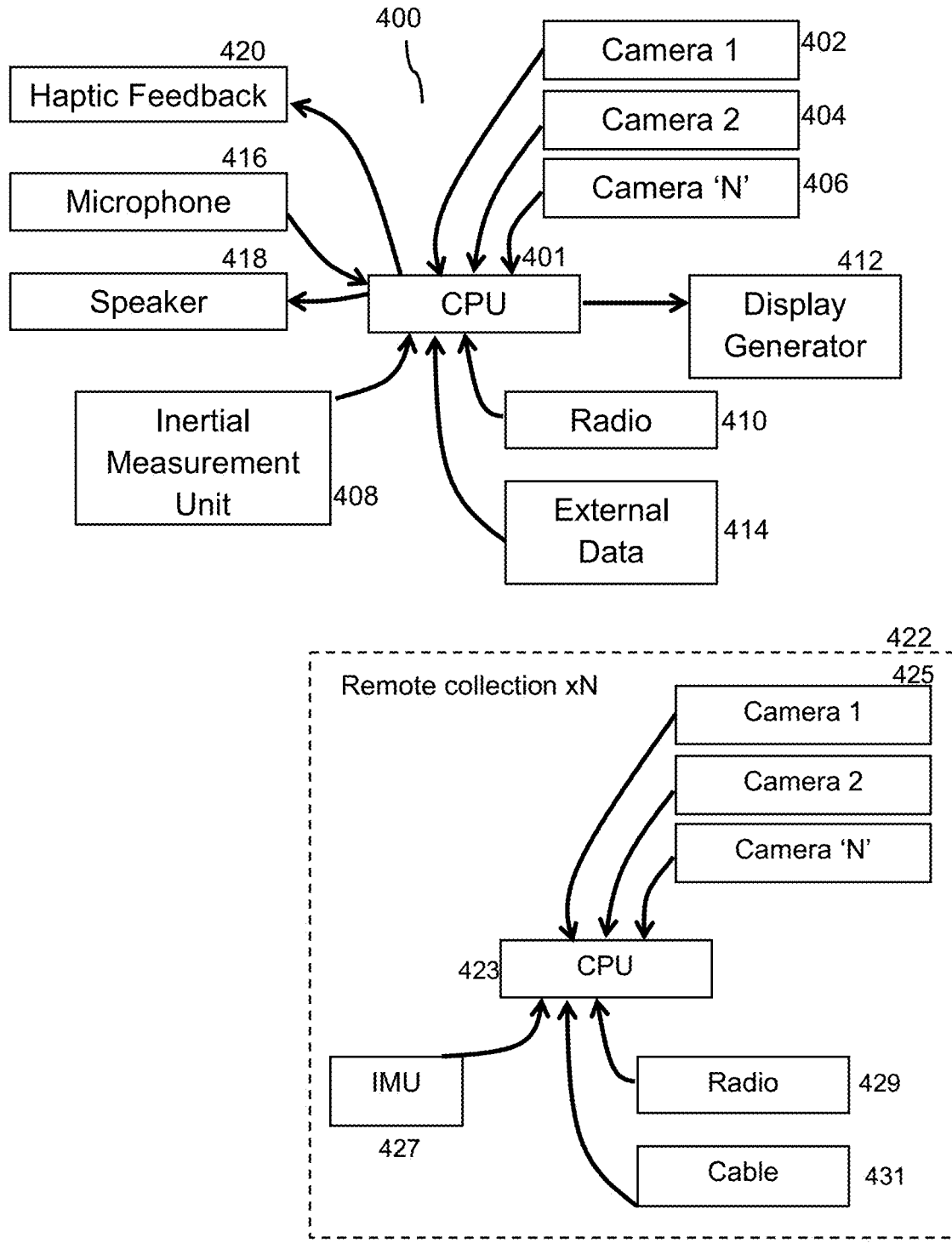
FIG. 4 is a schematic view of the electrical hardware configuration of system of FIG. 1.

Referring to FIG. 4 which shows the electronic hardware configuration of the system 10, the sensor suite (210, 306) not only includes one or more tracking cameras 402, 404, 406 (same as 206), it may optionally include an inertial measurement unit ("IMU") 408; a radio 410 for communication to other sensors or control units; a microphone 416 for voice activation of different display modes, including, but not limited to, removal of all displayed items for a clear field of view; one or more speakers 418 for audible alerts and other purposes; and haptic feedback 420 in the form of shaker motors, piezoelectric buzzers, or other embodiments. The IMU 408 provides added orientation and localization data for an object that is not visually based. The IMU 408 can be used for, but is not limited to, generation of simultaneous localization and mapping ("SLAM") data from camera tracking and IMU's 408 data to determine non-marker specific room features that assist in localization and generation of surface maps of the objects of interest. Furthermore, the sensor suite(s) (400, 210, and 306) includes external data 414 as relayed by wire, radio, or stored memory. External data 414 may optionally be in the forms of fluoroscopy imagery, computerized axial tomography ("CAT or CT") scans, positron emission tomography ("PET") scans, and/or magnetic resonance imaging ("MRI") data, or the like. Such data may be combined with other data collected by the sensor suite (400, 210, and 306) to create augmentation imagery.

During operation of the system 10, the display generator 412 (also shown as 204 and 302) and the processing unit 401 (also shown as 102) are in electronic communication with the components described above for the sensor suite (210, 306). The processing unit 401 is a central processing unit ("CPU") that controls display management and algorithm prosecution. Referring to FIG. 4, the system 10 may optionally include one or more remote sensor suites 422. These remote sensor suites 422 are physically located away from the display device 104. Each of these remote sensor suites 422 includes some or all of the components described above for the sensor suite (210, 306), for example cameras 425, IMU 427, radio 429, and cable 431 (e.g., for sharing data with system 400). It may also optionally include a separate and remote processing unit 423. The remote sensor suites 422 contribute data to the external data 414, which may be further processed by the processing unit 401 if desired. In another embodiment, the system 10 uses the remote suite(s) 422 to track not only the markers located in the field of regard, but also any marker(s) attached to the display unit 104 worn by the user 106, in order to localize the objects in the field of regard with respect to the user 106.

In one exemplary embodiment, the system 10 uses the sensor suite(s) (422, 210, 306) to create a three-dimensional point cloud of data representing objects in the workspace. These data can be used to create or match to already modeled objects for use in subsequent tracking, visualization, or playback at a later time.

Furthermore, the system 10 can optionally overlay imagery and masks using art-disclosed means in order to obscure objects in the field of view, including but not limited to, retractors or soft tissue around an exposure that are not the subject of the procedure to assist in highlighting the area, items, or regions of interest. In one embodiment, the external image can be projected with overlays in an augmented reality ("AR") mode. In another embodiment, the external image may be ignored, and only computer-generated graphics may be used to display data to the user 106 in a virtual reality ("VR") mode. VR mode is supported if the display device 104 or part thereof is made opaque to block the external visual data or if some other method is used to emphasize to the user 106 that concentration should be on the imagery and not the external imagery.

Other alternative embodiments of the display device 104 would include, but are not limited to, holographic or pseudo holographic display projections into the field of regard for the user 106. Furthermore, the display device may optionally provide art-disclosed means of eye tracking that allows determination of the optimal displayed imagery with respect to the user's 106 visual field of view.

The system 10 can optionally use algorithms to discriminate between items in the field of view to identify what constitutes objects of interest versus objects not important to the task at hand. This could include, but is not limited to, identifying bony landmarks on a hip acetabulum for use in comparison and merge with a pre-operative scan in spite of soft tissue and tools that are visible in the same field of regard.

Figure 5:
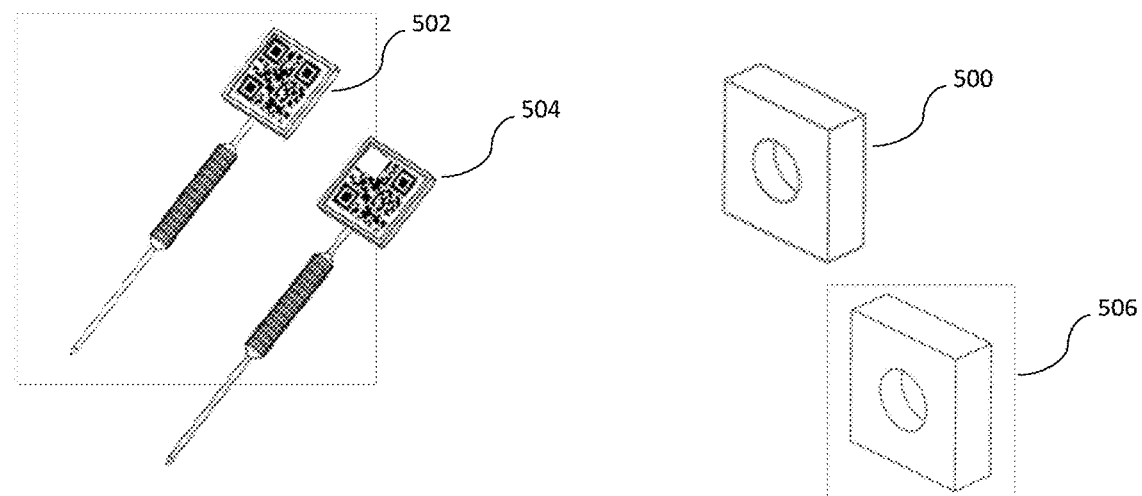
FIG. 5 is a diagrammatic depiction of markers and cameras of the system of FIG. 1.

Referring to FIG. 5, the one or more cameras 500, 506 of the sensor suites (400, 422, 210, and 306) and the one or more visual markers 502, 504 are used to visually track a distinct object (e.g., a surgical tool, a desired location within an anatomical object, etc.) and determine altitude, location, orientation, and/or position relative to the user 106. In one embodiment, each of the one or more markers is distinct and different from each other visually. Standalone object recognition and machine vision technology can be used for marker recognition. Alternatively, the present invention also provides for assisted tracking using IMUs 408 on one or more objects of interest, including but not limited to, the markers 502, 504. Please note that the one or more cameras 500, 506 can be remotely located from the user 106 and provide additional data for tracking and localization.

Optimal filtering algorithms are optionally used to combine data from all available sources to provide the most accurate position and orientation data for items in the field of regard. This filter scheme will be able to accommodate events including, but not limited to, occlusions of the camera(s) field(s) of view, blood, tissue, or other organic temporary occlusions of the desired area of interest, head movement or other camera movement that move the camera(s) field(s) of view away from the area of interest, data drop outs, and battery/power supply depletion or other loss of equipment.

Referring to FIGS. 36A-B, 37A-B, 38A-B, and 39-41A-B, another exemplary embodiment of the display device 104 is a self-contained AR headset 3600. Previously available systems suffered from several technical problems or limitations. For example, previously available systems (1) required external sensors, cameras, computers, and/or power sources for full operation of a display device worn by the user; (2) were limited in their useful life during a procedure due to power source constraints (e.g., the power source was not easily or quickly replaceable during the procedure without experiencing data loss); and/or (3) the self-contained system was not adaptable to a variety of helmets, face shields, or hoods. The self-contained AR headsets described herein overcome these technical problems with technical solutions. As will be described in greater detail elsewhere herein, the self-contained AR headsets of the present disclosure include (1) all required sensor, cameras, computers, and/or power sources to fully execute a surgical procedure (i.e., no external electrical equipment is required); (2) a user replaceable power source or battery or a modular battery (i.e., not built into the support module but easily removable and separable from the support module), such that the battery is easily replaceable during a surgical procedure without tools, manipulating latches, or data loss so that the procedure can progress without delay; and (3) is readily adaptable to various surgical helmets, hoods, and face shields. Various embodiments of such self-contained AR headsets will now be described in greater detail.

The AR headset 3600 is used in various sterile surgical procedures (e.g., spinal fusion, hip and knee arthroplasty, etc.). The AR headset 3600 is clamped on the head of a surgeon 3602 (i.e., user 106) by adjusting a head strap 3604 by turning a thumb wheel 3606. A transparent protective face shield 3608 is optionally attached to the device 3600 by attachment to Velcro strips 3610. Alternatively, attachment may be via adhesive, magnetic, hooks, or other art-disclosed attachment means. A coupling feature 3612 is present for attachment of a surgical helmet 3700 both mechanically and electrically to the AR headset 3600. The surgical helmet 3700 is optionally connected to a surgical hood (not shown) that provides full body coverage for the surgeon 3602. Full body coverage is useful for certain surgical procedures such as hip and knee arthroplasty or the like. If the surgical helmet 3700 is to be attached to a surgical hood, then a fan draws air in through the surgical hood into air inlet 3702 and is circulated under the surgical hood and helmet to cool the surgeon 3602 and prevent fogging of the optical components. A chin piece 3704 spaces the helmet 3700 (and if applicable, the attached surgical hood) away from the surgeon's 3602 face. The location of the surgical helmet 3700 relative to the AR headset 3600 is designed to allow unobstructed view of the surgical site for the surgeon 3602 and all cameras and sensors. The surgical helmet 3700 includes the necessary features to attach to and interface with the surgical hood. A flexible cord 3706 connects the AR headset 3600 to a support module 3708, which can be worn on the surgeon's 3602 belt or any other location on the surgeon other than the surgeon's head. For example, the support module may be worn on a hip, on a lower back, on an upper back, on a shoulder (e.g., using a strap), on a chest, on a thigh, on a wrist, on a bicep, etc. A replaceable battery 3800 inserts into the support module 3708.

Figure 39:
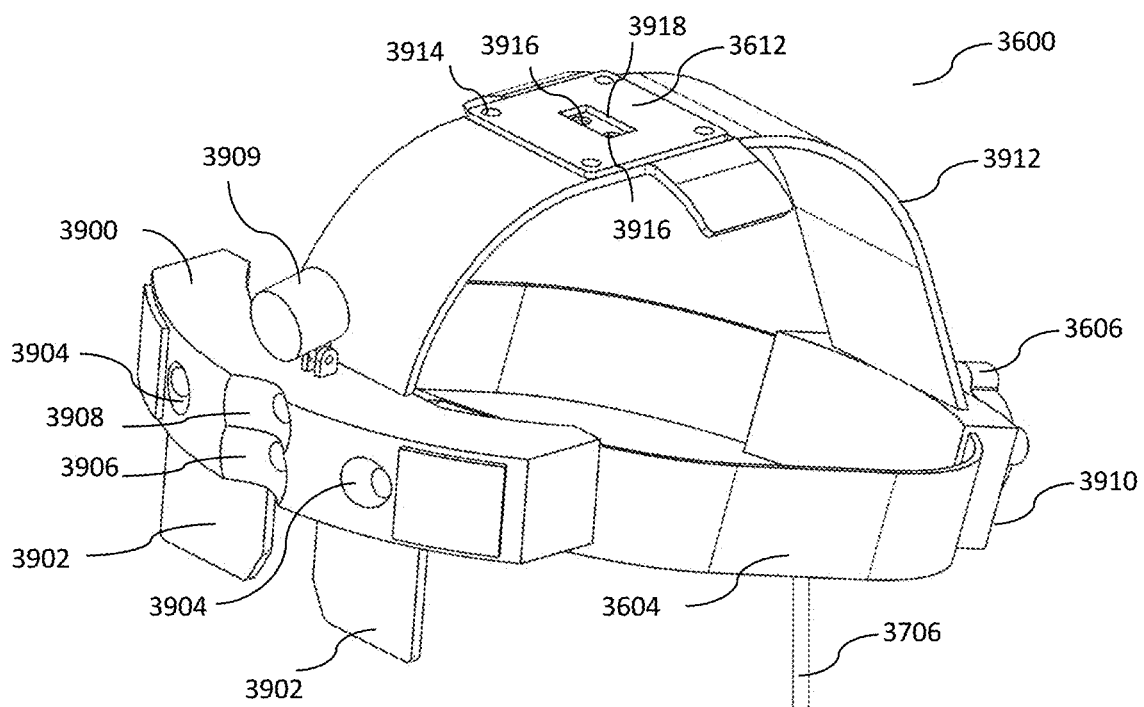
FIG. 39 shows a perspective front view of the AR headset shown in FIG. 36A.

Referring to FIG. 39, the AR headset 3600 includes a display section 3900 having a pair of see-through optical displays 3902 for visual augmentation and one or more tracking cameras 3904 for performing tracking and stereoscopic imaging functions including two-dimensional and three-dimensional digital zoom functions. A depth sensor 3906 and a structured-light projector 3908 are included in the display section 3900. It is preferred that the depth sensor 3906 and the projector 3908 are located in the middle of the display section 3900. A surgical headlight 3909 is optionally mounted to the display section 3900 and may be electrically connected to the AR headset 3600 to allow its brightness to be controlled by the software of the AR headset 3600 including by voice command. This feature may be deployed, for example, to dim or switch off the surgical headlight when in mixed reality mode to allow better visualization of virtual content against a bright background. It may also be adjusted to optimize optical tracking which at times can be impaired by high contrast illumination of targets or by low ambient lighting. In another exemplary embodiment, the operating room lights may be controlled wirelessly by the software of the AR headset 3600 for the same reasons.

Figure 40:
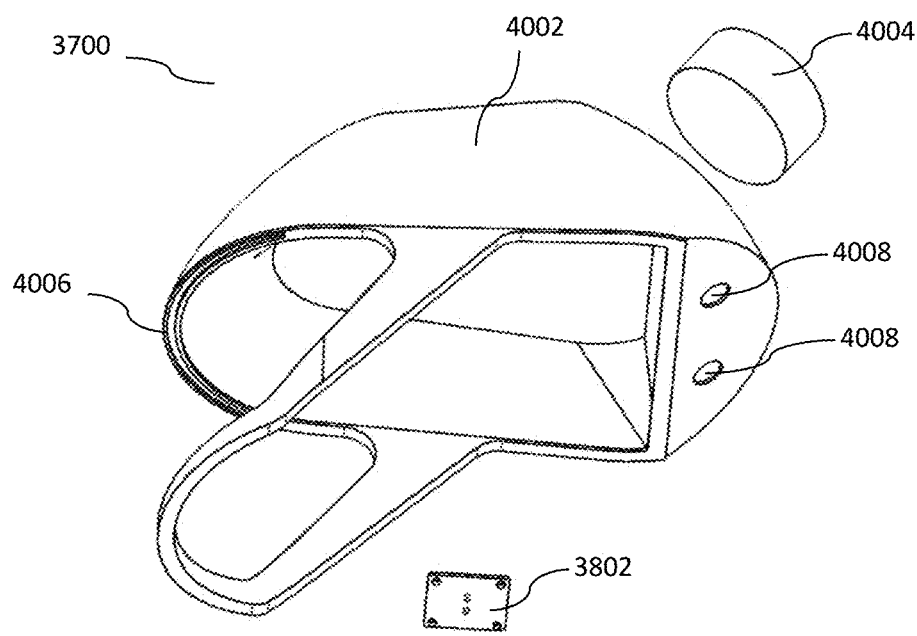
FIG. 40 is an exploded view of the surgical helmet shown in FIG. 37A.

Referring to FIGS. 39-40, the rear section 3910 of the AR headset 3600 may optionally contain the heat-generating and other components of the circuitry such as the microprocessor and internal battery. The arch-shaped bridge section 3912 and the head strap 3604 of the AR headset 3600 mechanically connect the rear section 3910 to the display section 3900. A portion of the bridge section 3912 is flexible to accommodate size adjustments. The bridge section 3912 may include wiring or a flexible circuit board to provide electrical connectivity between the display section 3900 and the rear section 3910. The bridge section 3912 includes the coupling feature 3612, which is a ferromagnetic plate with a plurality of locating holes 3914, which defines an aperture 3918 provides access to two electrical contacts 3916 for powering the fan of the surgical helmet 3700. In alternative embodiments, the coupling feature 3612 can be other art-disclosed means such as Velcro, latches or threaded fasteners or the like. The coupling feature 3612 may optionally include a vibration isolation mount to minimize transmission of mechanical noise from the fan of the surgical helmet 3700 to the AR headset 3600, which can be detrimental to tracking performance. The fan 4004 may be software controlled allowing it to be slowed or shut down to minimize the generation of mechanical noise. It may also be controlled by the surgeon 3602 using voice commands. A flexible cord 3706 connects the rear section 3910 to the support module 3708, shown in FIG. 38A.

Referring to FIG. 40, the surgical helmet 3700 includes a hollow shell 4002 into which a fan 4004 draws air which is exhausted through various vents in the shell to provide cooling air for the surgeon. A brim vent 4006 provides airflow over the visor of the surgical hood and rear vents 4008 provide cooling air to the rear including to the rear section 3910 of the AR headset 3600.

Figures 41A, 41B:
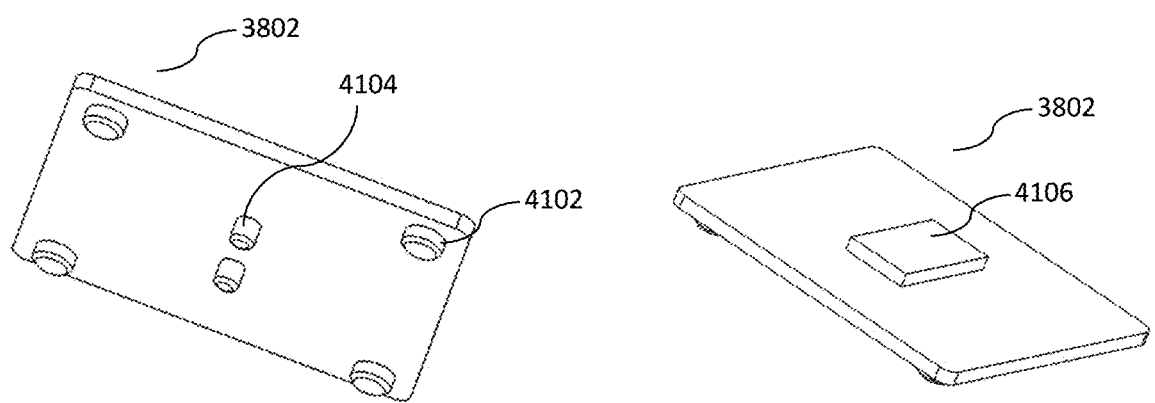
FIG. 41A is a perspective bottom view of the electromechanical coupling plate shown in FIG. 40.
FIG. 41B is a perspective top view of the electromechanical coupling plate shown in FIG. 40.

Referring to FIGS. 41A-B, the coupling plate 3802 includes a plurality of bosses 4102 for location with the holes 3914 in the AR headset 3600. The coupling plate 3802 also includes spring-loaded electrical contacts 4104, which connect with the electrical contacts 3916 of the AR headset 3600 to provide power to the fan 4004. The coupling plate 3802 further includes a magnet 4106, which provides a mechanical retention force between the coupling plate 3802 and the coupling feature 3612.

Figure 60:
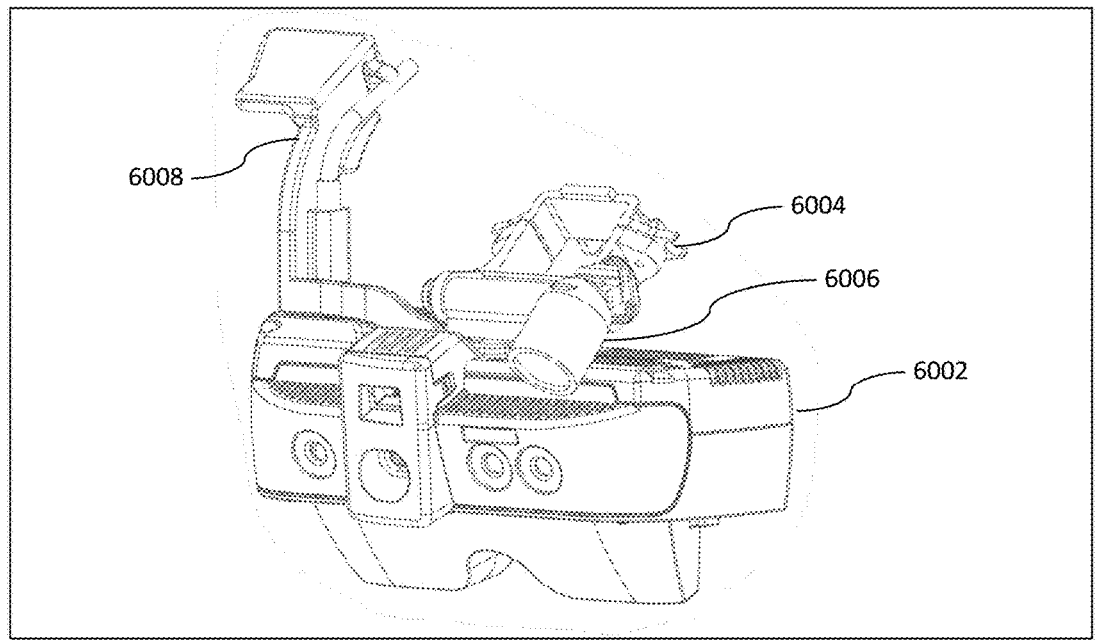
FIG. 60 is a diagrammatic depiction of an eyepiece with bracket.

Referring to FIG. 60, another exemplary embodiment of display device is in an eyepiece 6002, which includes a modular bracket 6004 configured to adapt to a headband or other support structure such as a surgical helmet 3700. A plurality of brackets 6004 can be interchanged to mount the eyepiece 6002 to different types of headgear. A focused spotlight or visible light 6006 is integrated to provide illumination to the procedural site and is mounted on a bracket allowing it to pivot up and down relative to the eyepiece so both the eyepiece display and the spotlight or visible light can be adjusted, independently of one another, to the correct angle for each user. In this embodiment, a handle 6008 is integrated to allow the user to easily adjust the position of display device even when worn under a surgical hood.

Figure 69:
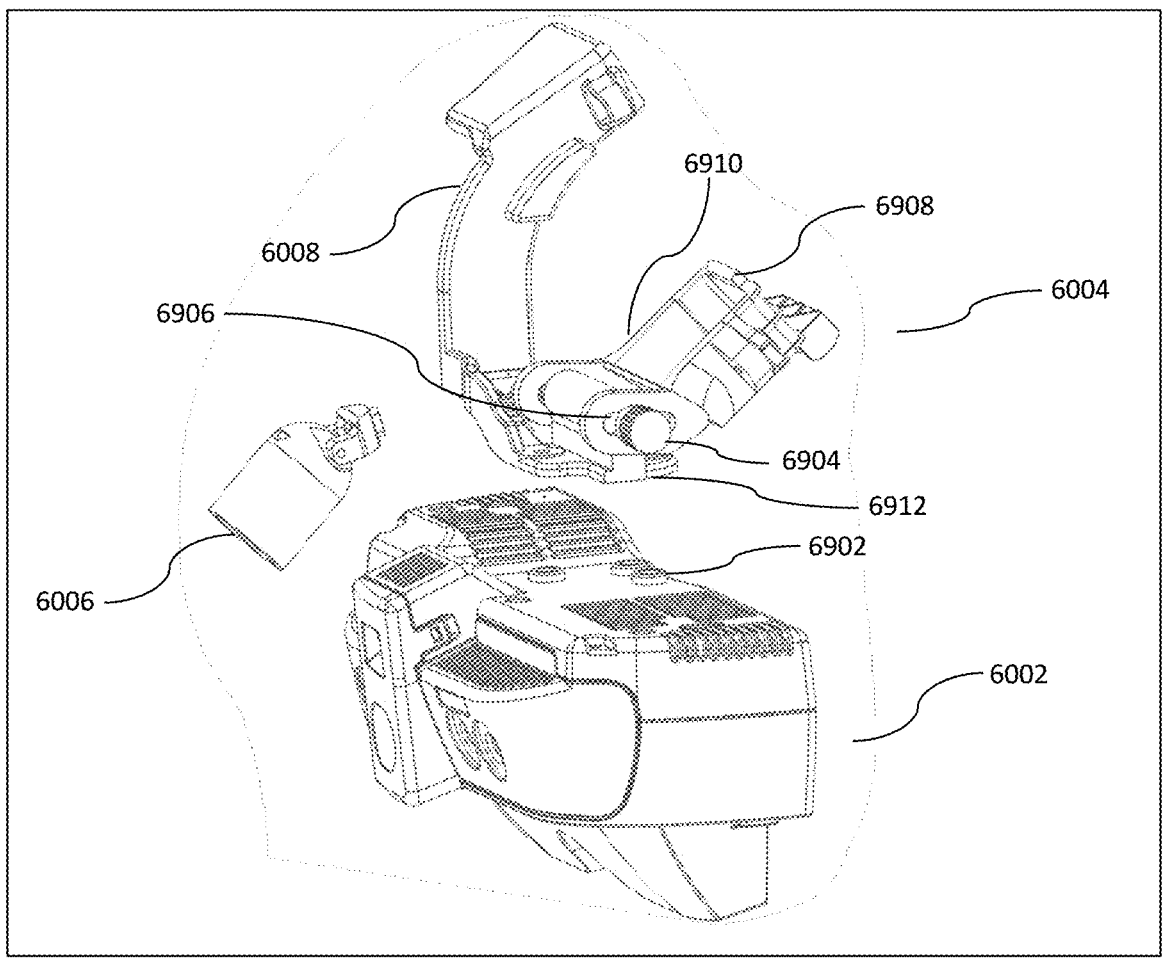
FIG. 69 shows an exploded view of the eyepiece and bracket depicted in FIG. 60.

In order for the display to be in focus, it must be positioned at the correct distance and angle to the user's eyes. Due to anatomic variations from user to user, it is beneficial to provide a means of adjusting the position and angle of the eyepiece 6002 for each user. Referring to FIG. 69, some additional features of eyepiece 6002 and bracket 6004 are shown which enable this adjustment. Bracket 6004 is mounted to eyepiece 6002 using one or more mounting features 6902, such as screws. Bracket 6004 comprises a lower bracket 6912 and an upper bracket 6910, which are connected by a locking knob 6904. Upper bracket 6910 further includes a clamp 6908 configured to rigidly connect it to a support structure such as a headband or surgical helmet. In this embodiment, the clamp 6908 is configured to mount the bracket 6904 to a Stryker Flyte surgical helmet. Lower bracket 6912 is rigidly coupled to eyepiece 6002. The upper bracket 6910 contains a slot 6906 interfacing with locking knob 6904 and allowing lower bracket 6912 and eyepiece 6002 to slide forward and backward when locking knob 6904 is loosened. Lower bracket 6912 can additionally pivot around locking knob 6904 to adjust the angle of eyepiece 6002. When worn under a surgical hood (not shown), the eyepiece 6002 may be difficult to reach and manipulate, since it is positioned behind a semi-rigid transparent face shield. In this embodiment, a handle 6008 is incorporated into lower bracket 6912 to enable the user to adjust the position and angle of eyepiece 6002 when worn under a hood.

Figure 71:
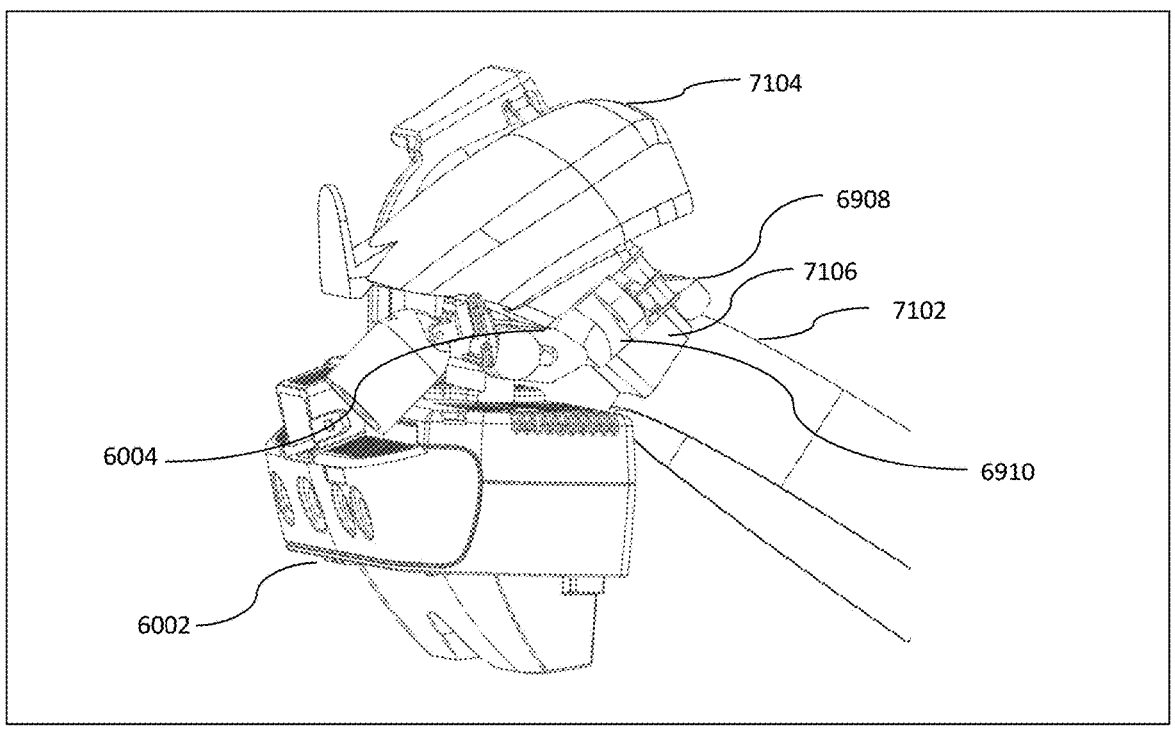
FIG. 71 shows the eyepiece and bracket depicted in FIG. 60 mounted in a surgical helmet.

Referring to FIG. 71, the eyepiece 6002 and bracket 6004 are shown mounted in a Flyte surgical helmet. The helmet includes a headband 7102 and a duct 7104 connected by a brace 7106. Bracket 6910 and clamp 6908 fully surround brace 7106 and fit tightly against its sides, top, and bottom to prevent angular movement between the bracket components (6908, 6910) and the brace 7106. In this embodiment, clamp 6908 contacts both duct 7104 and headband 7102 to prevent the bracket from moving forwards or backwards relative to the helmet. Bracket 6910 and clamp 6908 are drawn tightly together by two screws.

Figure 61:
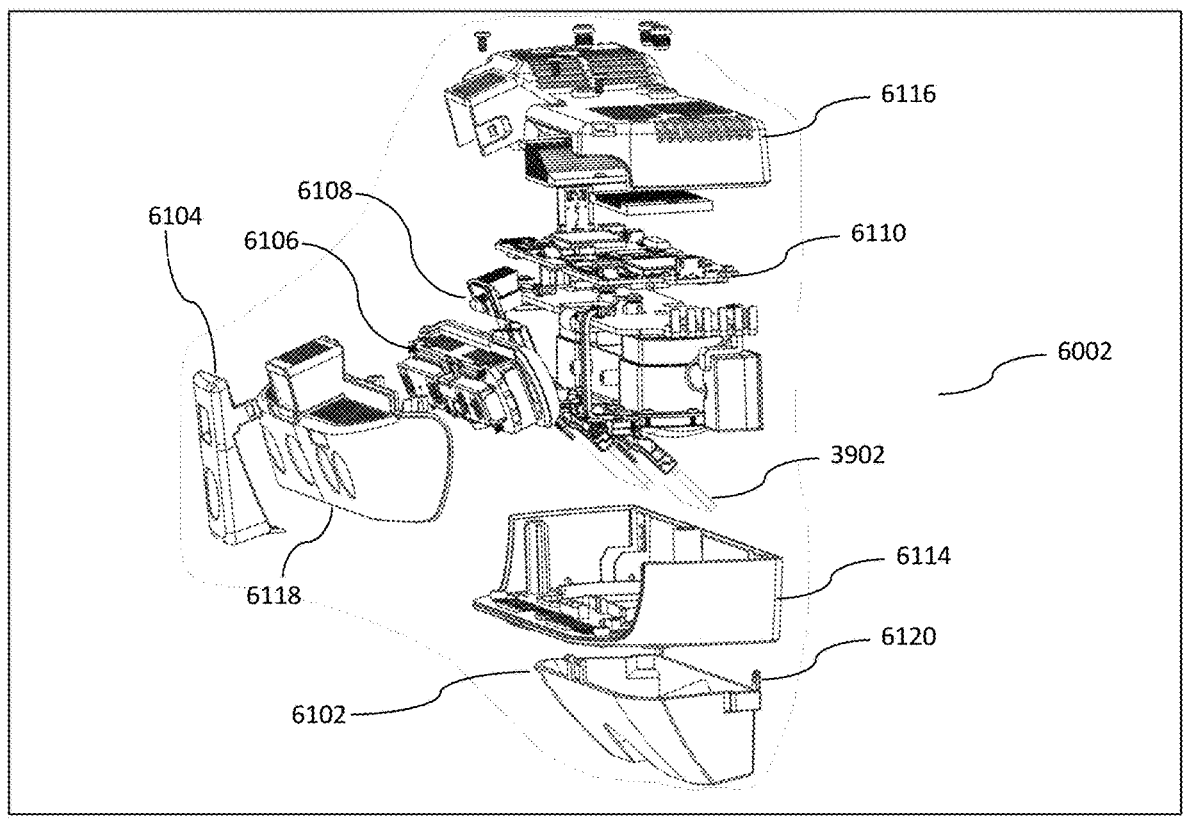
FIG. 61 shows an exploded view of the eyepiece depicted in FIG. 60.
Figure 70:
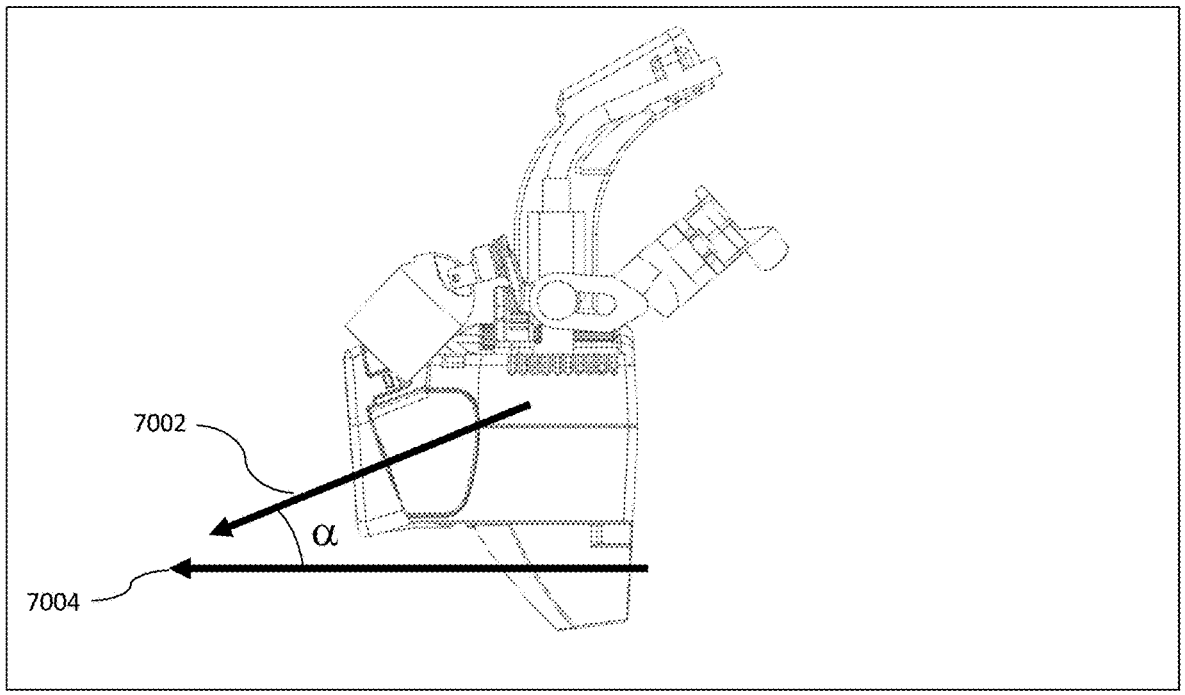
FIG. 70 shows a side view of the eyepiece and bracket depicted in FIG. 60.

Referring to FIG. 61, the components of one embodiment of eyepiece 6002 include a modular transparent visor 6102 and housing components 6114, 6116, and 6118 to protect the optical displays 3902. The visor 6102 can be removed and replaced without tools to allow easy replacement in case of damage or wear. Spring tabs 6120 engage with bottom housing 6114 to retain visor 6102. To attach the visor, the user pushes it into position against the bottom housing. The visor 61002 can be removed from bottom housing 6114 by lifting the tabs 6120 and pulling the visor off. A plurality of optional visors 6102 of various sizes and shapes allow optimal fit for each user accounting for the use of prescription eyewear, anatomical variations, and preference. In one embodiment, visor 6102 is configured to minimally obstruct outward view and allow the user 106 to look under the visor 6102 when not actively viewing information in the optical displays 3902. This may be additionally enabled by mounting the eyepiece 6002 high in the line of sight of user 106. Further referring to FIG. 61, this embodiment of the eyepiece 6002 includes a stereo camera module 6106 such as the Intel Realsense D435. In one embodiment, the stereo camera module 6106 utilizes infrared cameras, and the camera's viewing axis 7002 is angled down 20-30 degrees from the display's neutral viewing angle 7004, as shown as angle α in FIG. 70. In this embodiment, the camera module 6106 is positioned forward of the other internal electrical components to allow cooling air to pass around the camera module via vents in housing components 6114 below and 6118 above. Positioning camera module 6106 forward of the display module additionally moves the camera module closer to face shield 3608 (shown in FIG. 36B) and reduces the effect of reflections of light off of face shield 3608. Eyepiece 6002 further includes an infrared light 6108 to provide illumination for the stereo camera module 6106, allowing control over the scene illumination independent of the ambient room or procedural lighting. In one embodiment, the infrared light 6108 uses one or more dome LED components such as Lumileds L110-0850090000000. One embodiment includes a shroud 6104 comprising a plurality of sidewalls 7320 defining an aperture 7316 through which a light from an infrared light 6108 is emitted and then shines through faceshield. In some embodiments, a plurality of sidewalls 7320 is analogous to a singular sidewall such that the shroud 6104 comprises a conical or continuous sidewall. The shroud 6104 is configured to fit closely to the face shield 3608 to minimize reflections of light from the infrared light 6108 into the camera module 6106. The shroud 6104 may be formed of or comprise a front surface 7204 coupled to border 7310 and may comprise a modular construction such that the shroud 6104 is easily replaceable or removable. Shroud 6104 may comprise a monolithic construction. Alternatively, border 7310 and front surface 7204 may be coupled, bonded, or otherwise fixed together to form shroud 6104. The shroud 6104 is further configured to avoid extending into the field of view of camera module 6106, for example based one or more of: a height of the shroud, a shape (e.g., conical, oval, circular, etc.) of the shroud, or how the shroud lies or is positioned in the FOV of one or both tracking cameras. In one embodiment, the shroud 6104 can be removed and replaced without tools, enabling the user 106 to select from a plurality of shrouds 6104 to optimize contact against face shield 3608, accounting for variations in eyepiece 6002 position for different user eyesight and anatomy. In one embodiment, spotlight or visible light 6006 includes an infrared light filter to prevent infrared light from the spotlight or visible light from reaching the camera module 6106. Infrared light illuminating the procedure site and reflecting back to camera module 6106 can also be limited by applying an infrared filter to spotlight 6006, ensuring its output is limited to visible wavelengths only. Circuit board 6110 coordinates communication of the camera module 6106 and optical displays 3902 with a computer located in the support module 3708.

Figure 72A:
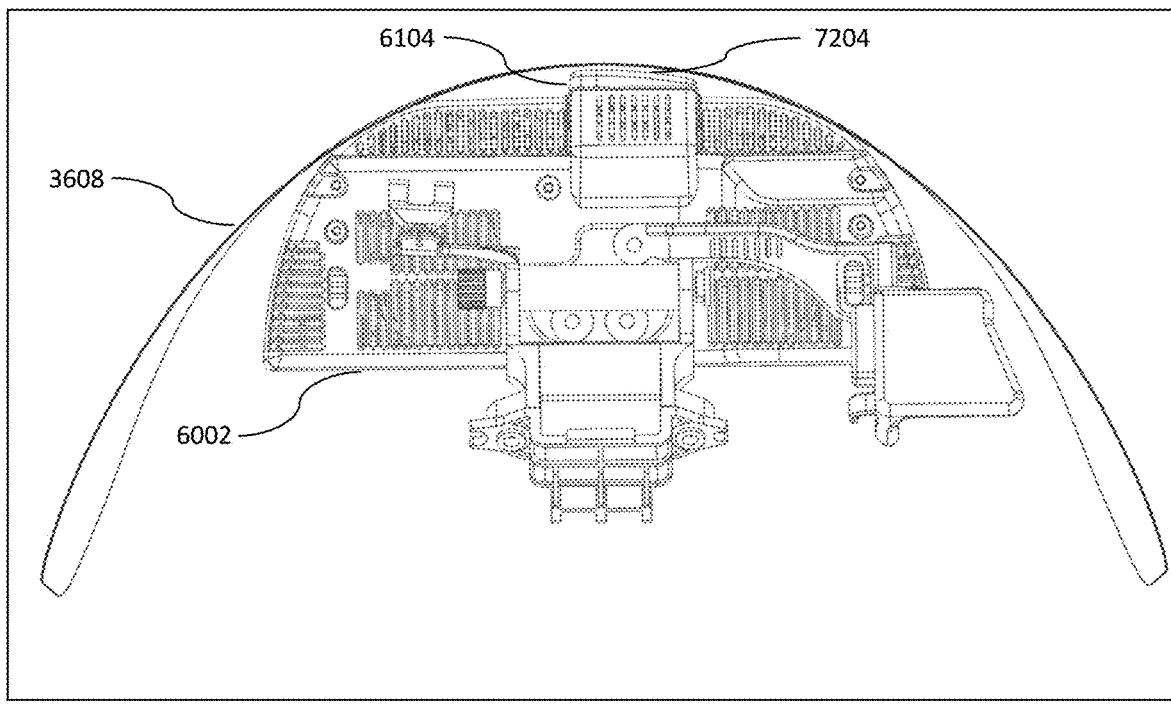
FIG. 72A shows a top view of the eyepiece depicted in FIG. 60 mounted relative to a surgical face shield.
Figure 72B:
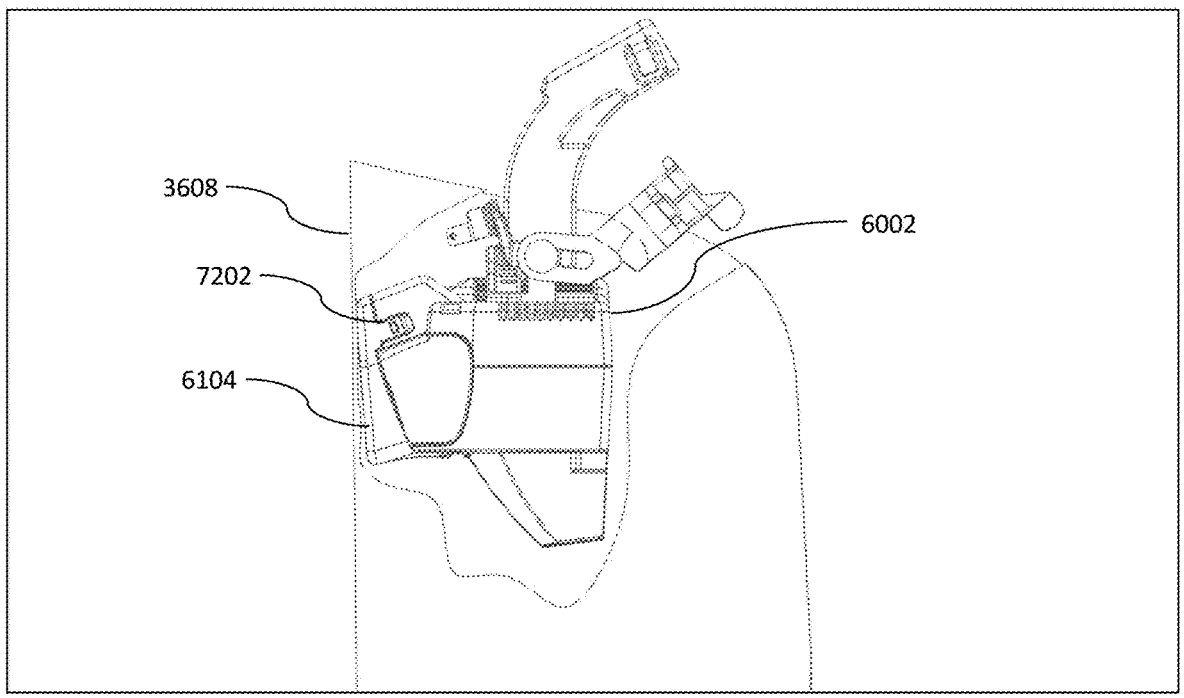
FIG. 72B shows a side view of the eyepiece depicted in FIG. 60 mounted relative to a surgical face shield.

Referring to FIGS. 72A and 72B, which show eyepiece 6002 in its installed position relative to face shield 3608 (shown transparent for clarity), some features of the shroud are illustrated. FIG. 72A shows a top view of the system, with FIG. 72B illustrating a side view of the same system. Because both infrared light 6108 and stereo camera module 6106 shown in FIG. 61, as components of eyepiece 6002, lie behind the face shield 3608, infrared light 6108 can be reflected off of face shield 3608 into camera module 3608, disrupting tracking of markers. This challenge is mitigated by the inclusion of shroud 6104, which extends around the infrared light 6108 to the face shield 3608. In some embodiments, aperture 7316 contacts face shield 3608; in other embodiments, a front surface 7204 coupled to and/or surrounding an outer perimeter 7324 of the plurality of sidewalls 7320 of shroud 6104 contacts the face shield 3608, is in close proximity (e.g., 0 to 5 mm, 0 to 1 mm, 0 to 2 mm, 0 to 3 mm, 0 to 4 mm, 0 to 6 mm, etc.) to the face shield 3608, or is otherwise adjacent to the face shield such that light emitted by the infrared light only escapes through the face shield and does not interfere with the camera module. Contact or proximity between any one or more portions of shroud 6104 and face shield 3608 prevents infrared light from escaping except through an aperture 7316 defined by the plurality of sidewalls 7320 of the shroud 6104 and thus through the face shield 3608. Any reflections of infrared light 6108 off of face shield 3608 are also contained within shroud 6104 and prevented from reaching camera module 6106. The plurality of sidewalls 7320 of shroud 6104 may be constructed from, may integrate, may be coated with, or otherwise include a material with low reflectivity of infrared light in the wavelengths discernable to camera module 6106, such as nylon PA12 or Cerakote ceramic coating. While face shield 3608 is in a fixed location relative to the user's head, eyepiece 6002 may be adjusted forward or backward to account for differences in eyesight and anatomy, which also decreases or increases the distance from shroud 6104 to face shield 3608. To minimize the gap between the shroud and face shield, a plurality of shrouds 6104 of varying lengths $L_{6104}$ can be provided, as shown in FIG. 73C, allowing the user to select the longest shroud that fits behind the face shield for a given position of eyepiece 6002. Shroud 6104 is held in place by one or more flexible spring tabs 7202 that mate with features on the eyepiece housing. Shroud 6104 snaps into place and can be removed without tools by lifting the spring tab(s) to release. To conform to the curved surface of face shield 3608 with minimal gap, shroud 6104 has a front surface 7204 with approximately the same radius of curvature as that of the face shield, as shown in FIG. 72A. In other words, a radius of curvature of the front surface 7204 of the shroud 6014 matches or approximately matches a radius of curvature of the face shield. In other embodiments (in the absence of front surface 7204), aperture 7316 has approximately the same radius of curvature as that of the face shield. In other words, a radius of curvature of the aperture 7316 of the shroud 6104 matches or approximately matches a radius of curvature of the face shield. The radius of the face shield may be about zero (flat), about 0 cm to about 4 cm, about 0 cm to about 8 cm, about 0 cm to about 10 cm, etc.

Figure 73A:
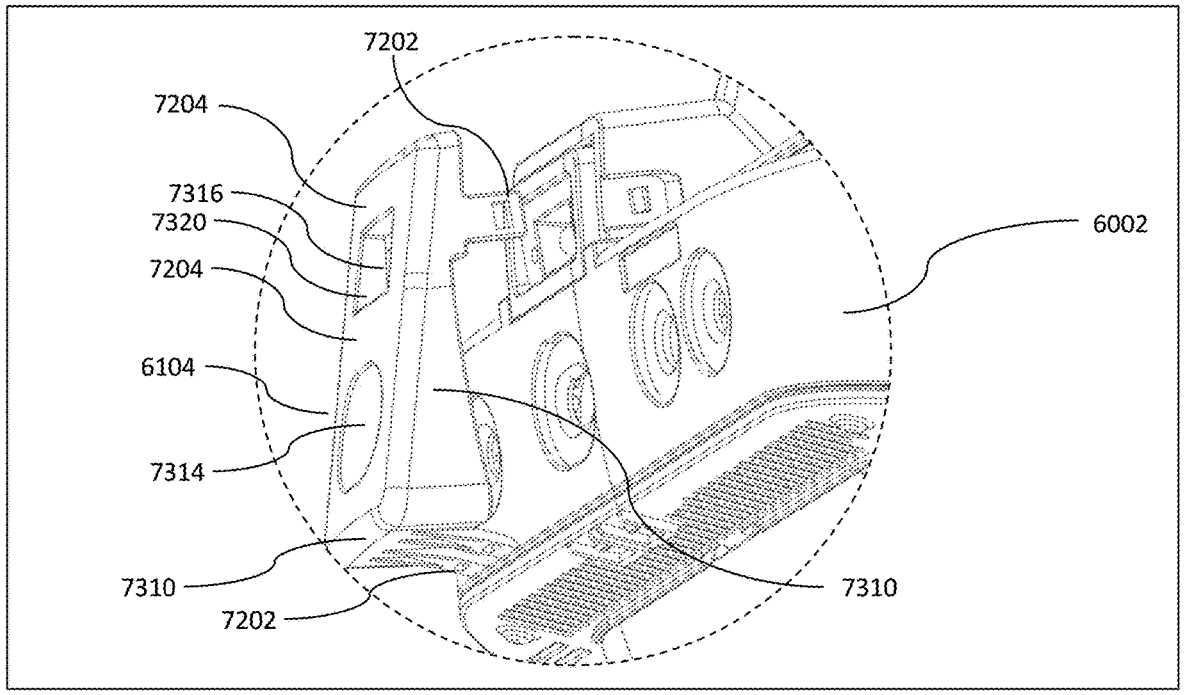
FIG. 73A shows a zoomed in view of a shroud of FIGS. 72A-72B.
Figure 73B:
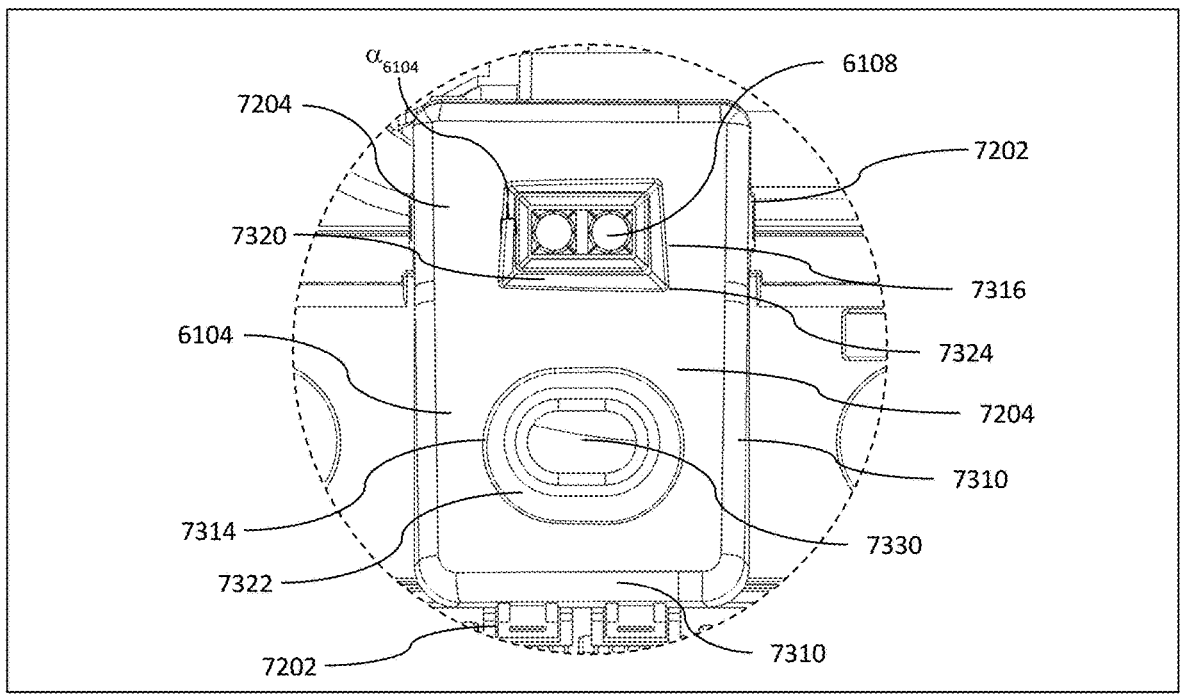
FIG. 73B shows a zoomed in front view of a shroud of FIGS. 72A-72B.
Figure 73C:
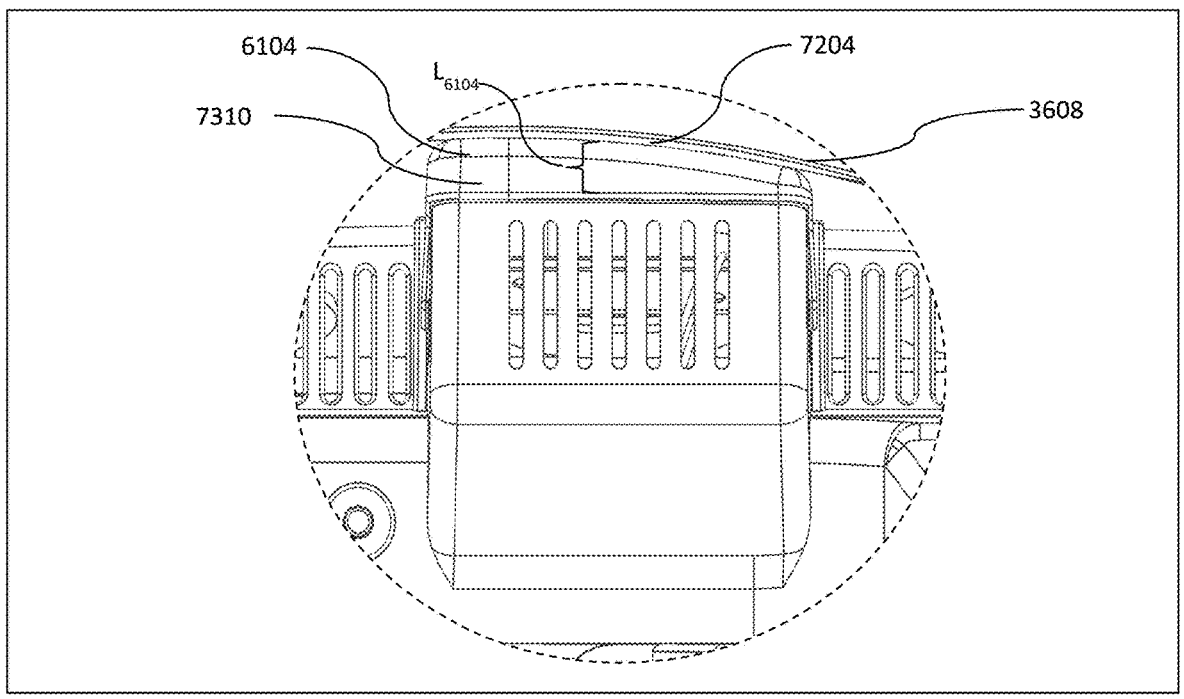
FIG. 73C shows a zoomed in top view of a shroud of FIGS. 72A-72B.

FIGS. 73A-73C show a perspective view, front view, and side view, respectively of shroud 6104. As shown in FIGS. 73A-73C, shroud 6104 includes a plurality of sidewalls that define one or more apertures. For example, the plurality of sidewalls 7320 define aperture 7316 which houses or surrounds infrared light 6108. Additionally, or alternatively, a second plurality of sidewalls 7322 may define a second aperture 7314 which houses a second infrared light, camera module, light projector, or other component 7330. In an embodiment comprising apertures 7314, 7316, the first and second apertures 7314, 7316 are combined into a modular component via front surface 7204 coupled to border 7310. The front surface 7204 interfaces with a face shield. In other embodiments, shroud 6104 does not include front surface 7204 such that the first and second plurality of sidewalls 7322, 7320 define the apertures 7314, 7316, respectively. Further, one or more of the plurality of sidewalls 7320 may have an angle $\alpha_{6104}$ as measured from a central axis of the infrared light 6108 or a central axis of a cone of light (e.g., cone may be substantially or about 90 degrees) emitted by the infrared light 6108. The angle $\alpha_{6104}$ may be about or substantially: 0 to 50 degrees, 0 to 40 degrees, 0 to 30 degrees, 0 to 20 degrees, 0 to 10 degrees, 0 to 5 degrees, 5 to 10 degrees, 10 to 20 degrees, 5 to 20 degrees, 5 to 25 degrees, etc. In one embodiment, angle $\alpha_{6104}$ is substantially or about 12 to about 16 degrees. In another embodiment, angle $\alpha_{6104}$ is substantially or about 10 to about 18 degrees. In some embodiments, each of the plurality of sidewalls is angled at the same or substantially the same angle. In other embodiments, opposing sidewalls have a same or similar angle. In still other embodiments, each of the plurality of sidewalls is angled at a different angle that the other sidewalls.

Figure 62:
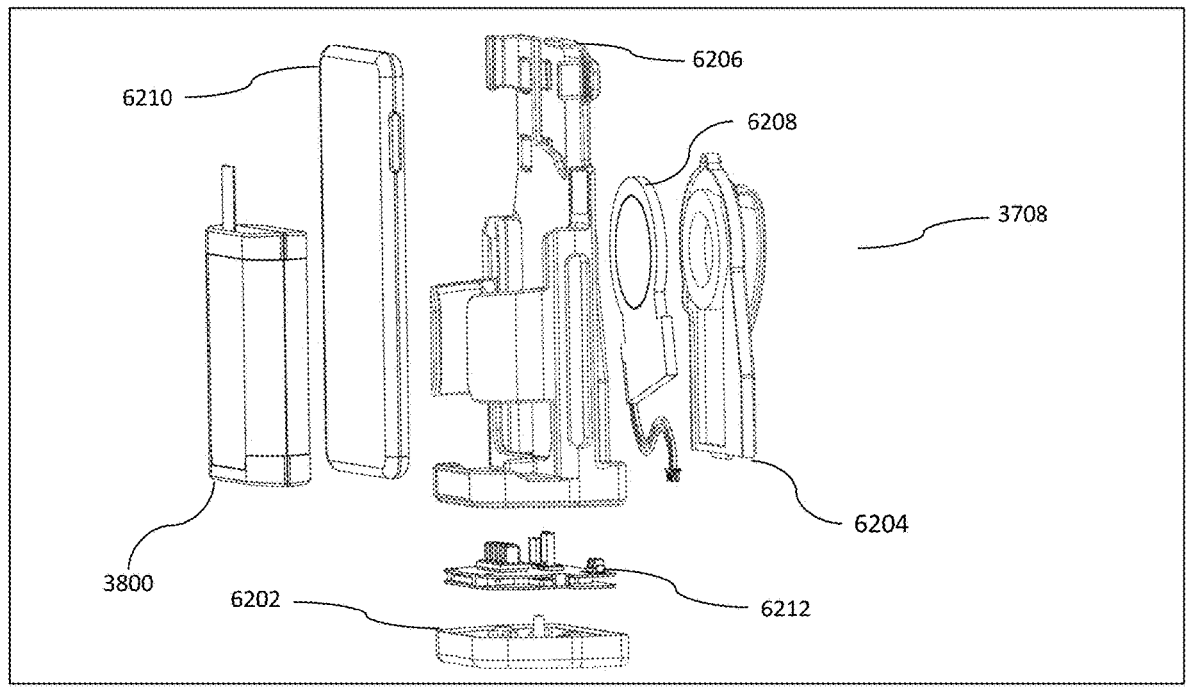
FIG. 62 shows an exploded view of the support module.

Referring to FIG. 62, which shows an exploded view of an embodiment of support module 3708, all electronic components are contained in or mounted to a housing comprising base 6202 configured to receive circuit board 6212; coupler 6204 configured to couple the housing to clothing, a strap, a belt, or the like; and bracket 6206 configured to securely and removably restrain battery 3800 and processor unit 6210. The battery 3800 may be received into housing in a fixed orientation; in other embodiments, the battery 3800 is configured to fit into the housing in more than one orientation. A replaceable battery 3800 powers computer module or processor unit 6210 and AR eyepiece 6002 or head-worn display device. Bracket 6206 is configured to allow an assistant to replace battery 6800 without using tools or manipulating mechanical latches. Circuit board 6212 is configured to direct electrical power from battery 3800 to computer module or processor unit 6210 and AR eyepiece 6002. In one embodiment, power and data flow between support module 3708 and AR eyepiece 6002 or a head-worn display device via a USB connection. In one embodiment, the computer module or processor unit 6210 is a mobile phone with a single USB connector. In one embodiment, the computer module or processor unit 6210 receives power from battery 3800 through a wireless charger 6208, enabling the USB connector of computer module or processor unit 6210 to behave as a full-time power source, and reduce the likelihood of it behaving as a power "sink."

Figure 63A:
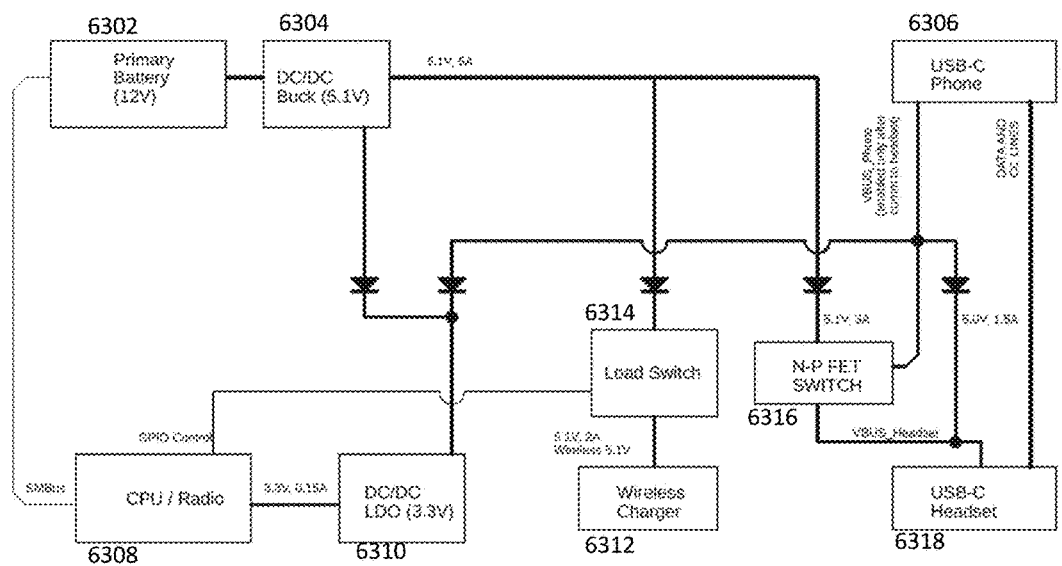
FIG. 63A is a schematic view of the electrical hardware configuration of support module circuit board 6212.

Referring to FIG. 63A, in which an electrical schematic for a support module circuit board 6212 is shown, a battery connector 6302 receives power from replaceable battery 3800 and DC/DC buck circuit 6304 steps the voltage down to the nominal system voltage. DC/DC LDO regulator 6310 ensures the voltage is at the required level and passes power to CPU/Radio 6308. Power flows to wireless charger 6312 through load switch 6314 as directed by CPU/Radio 6308. Power flows through N-P FET switch 6316 to both phone USB connector 6306 and headset USB connector 6318. CPU/Radio 6308 monitors the charge level of battery 3800 and reports the level to computer module 6210 using radio transmission.

Figure 63B:
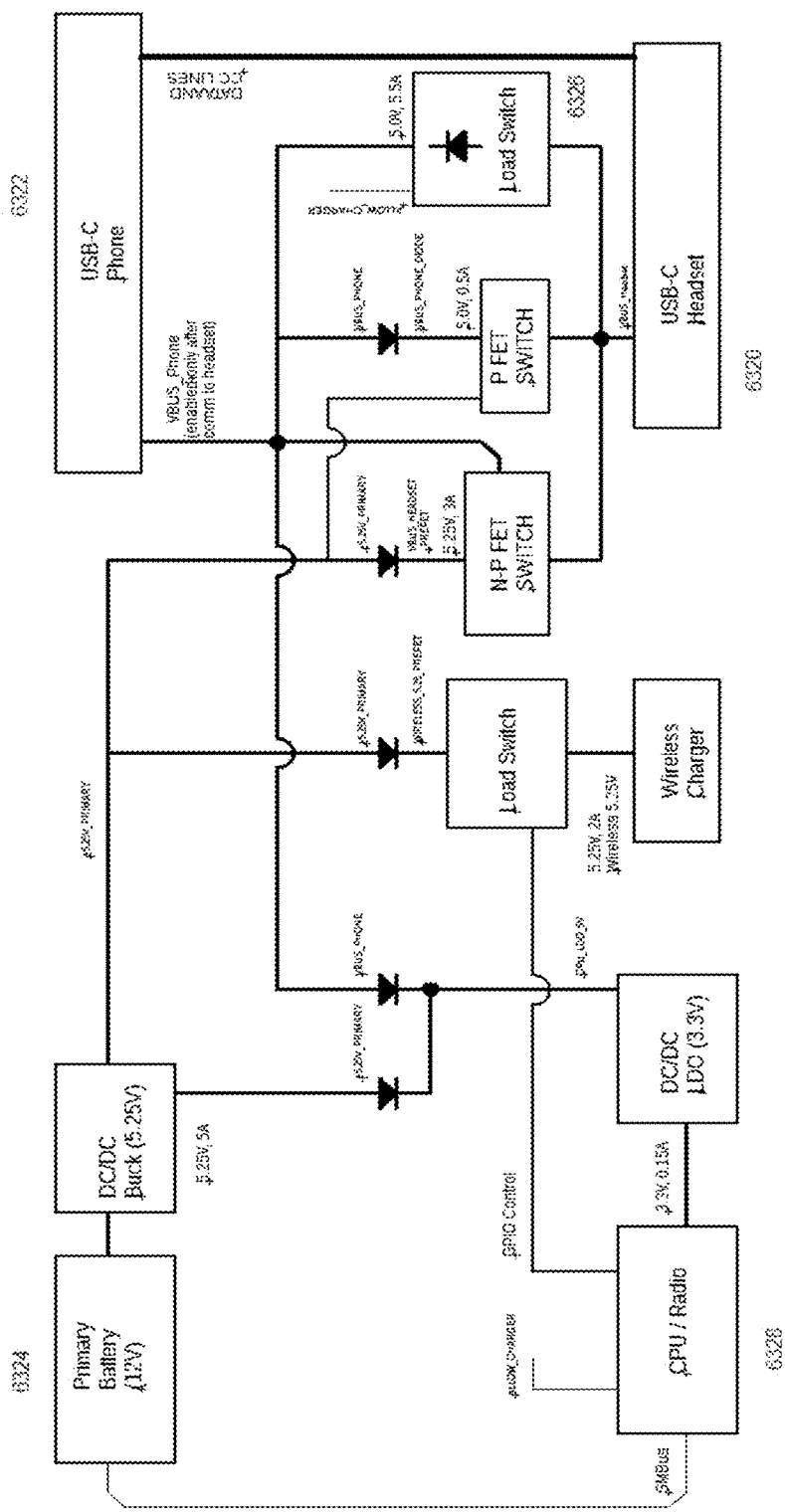
FIG. 63B shows a schematic of a circuit board for one embodiment of a support module.

Referring to FIG. 63B, in which an electrical schematic for a support module circuit board 6212 is shown, a USB connector 6320 acts as a source of power and communication for a headset when the headset is plugged into the USB connector 6320. The power delivered from the phone 6322 to the headset is supplemented by the 12V battery 6324. In this case, the load switch 6326 from the headset to the phone may be disabled by the CPU 6328. In another embodiment, the CPU 6328 detects that the 12V battery 6324 is not present and enables the load switch 6326 from the headset 6320 to the phone 6322. In this embodiment, an external USB charger can be attached to the USB connector 6320 and used to recharge the phone 6322 battery as if the devices were connected directly to each other.

In an exemplary embodiment, the AR headset 3600 is optionally used as a system for reporting device complaints or design feature requests. The user interface can have a menu option or voice command to initiate a report at the time that it occurs. This would activate voice and video camera recording allowing the user 106 to capture and narrate the complaint in 3D while the issue is occurring. The user 106 terminates complaint with voice or selecting an option. The complaint record is compressed and transmitted to the company via the internet to wirelessly provide complaint handling staff excellent data to be able to "re-live" the situation firsthand for better diagnosis. Artificial intelligence can be used to parse and aggregate the complaint material to establish patterns and perform statistical analysis. The same sequence can be used to connect to live technical support during the procedure with the exception that the data stream is transmitted in real-time.

II. Pre-Operative Procedures

The present invention can be used for pre-operative tasks and surgical procedures. For example, an alternate general surgical procedure that includes possible pre-operative activities is now described. First, a scan of the region of interest of the patient such as CT or MRI is obtained. If possible, the patient should be positioned in a way that approximates positioning during surgery. Second, segmentation of the scan data is performed in order to convert it into three-dimensional models of items of interest including but not limited to: teeth and bony structures, veins and arteries of interest, nerves, glands, tumors or masses, implants and skin surfaces. Models are segregated so that they can later be displayed, labeled or manipulated independently. These will be referred to as pre-operative models. Third, pre-operative planning is performed (optionally using VR for visualization and manipulation of models) using models to identify items including, but not limited to: anatomic reference frames, targets for resection planes, volumes to be excised, planes and levels for resections, size and optimum positioning of implants to be used, path and trajectory for accessing the target tissue, trajectory and depth of guidewires, drills, pins, screws or instruments. Fourth, the models and pre-operative planning data are uploaded into the memory of the display device 104 prior to or at time of surgery. This uploading process would most conveniently be performed wirelessly via the radio.

Fifth, the patient is prepared and positioned for surgery. During surgery, the surgical site is ideally be draped in a way that maximizes the visualization of skin surfaces for subsequent registration purposes. This could be achieved by liberal use of Ioban. It would be beneficial to use a film like Ioban that fluoresced or reflected differently when targeted by a specific LED or visible light emitter in a broad illumination, point, or projected pattern. This film may also have optical features, markers, or patterns, which allowed for easy recognition by the optical cameras of the headpiece.

Sixth, after the patient has been prepped and positioned for surgery, the system 10 (e.g., via the AR headset 3600) scans the present skin envelope to establish its present contour and creates pre-operative 3D models available for user 106 to see on the display device 104. The preferred method is to project a grid or checkerboard pattern in infrared ("IR") band that allows for determination of the skin envelope from the calculated warp/skew/scale of the known image. An alternate method is to move a stylus type object with a marker attached back and forth along exposed skin, allowing the position and orientation track of the stylus and subsequent generation of the skin envelope. Optionally, the skin model is displayed to the user 106, who then outlines the general area of exposed skin, which has been scanned. An optimum position and orientation of the pre-operative skin model is calculated to match the present skin surface. The appropriate pre-operative models are displayed via the display device 104 to the user 106 in 3D. Optionally, the user 106 may then insert an optical marker into a bone of the patient for precise tracking. Placement of this marker may be informed by his visualization of the pre-operative models. The position and orientation of pre-operative models can be further refined by alternative probing or imaging including, but not limited to, ultrasound.

Seventh, during surgery, the user 106 using the system 10 with the display device 104, can see the pre-operative planning information and can track instruments and implants and provide intraoperative measurements of various sorts including, but not limited to, depth of drill or screw relative to anatomy, angle of an instrument, angle of a bone cut, etc.

Figure 8:
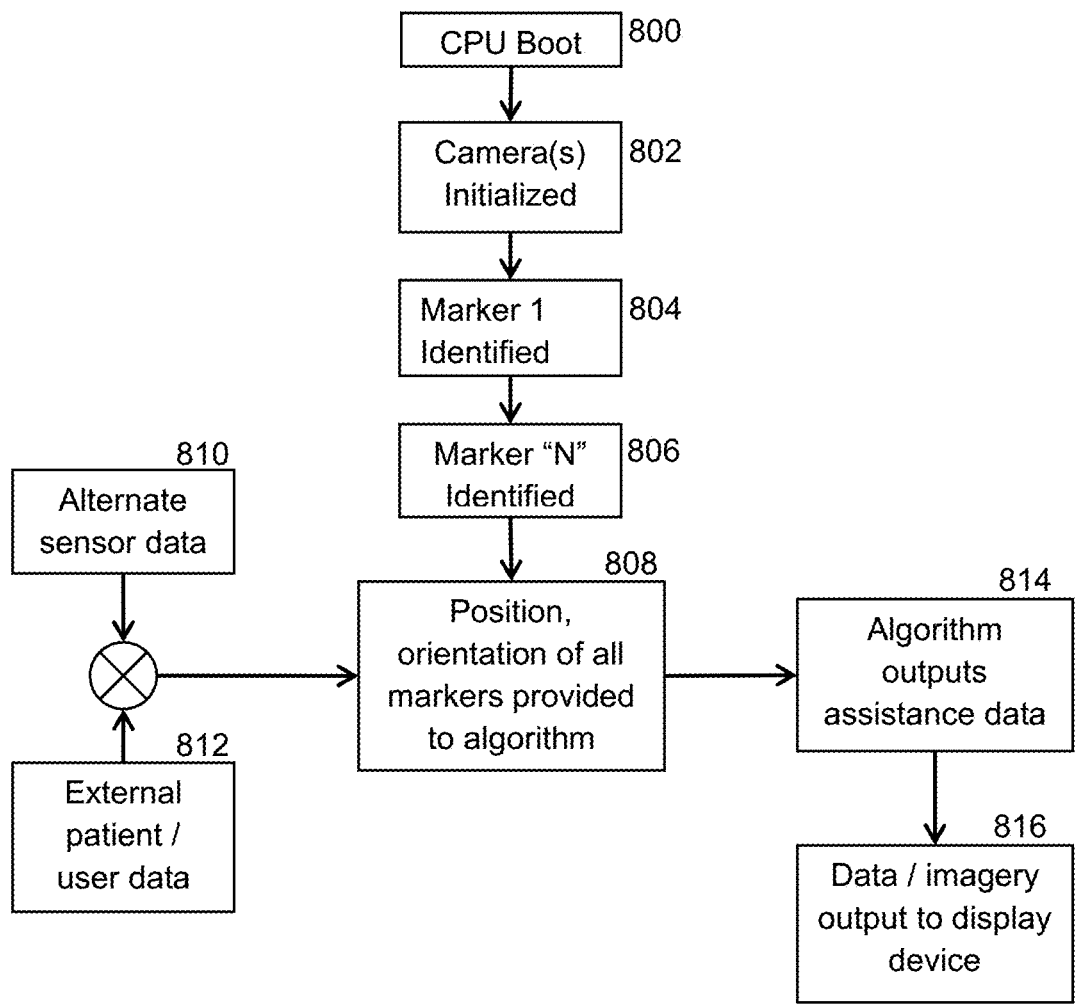
FIG. 8 is a flowchart showing the operational processes of the system of FIG. 1 during a medical procedure.

Referring to FIG. 8, an exemplary embodiment of the operational flow during a procedure using the system 10 is presented. In this embodiment, the CPU 401 boots (800) and initializes one or more cameras 402, 404, 406 (802). When in the field of view of the camera(s) 402, 404, 406, the first marker 100 is located and identified (804), followed by subsequent markers 108, 110 (806). The track of these markers 100, 108, 110 provides position and orientation relative to each other as well as the main camera locations (808). Alternate sensor data from sensors such as IMUs and cameras from the remote sensor suites 422 (810) can be optionally incorporated into the data collection. Further, external assistance data (812) about the patient, target, tools, or other portions of the environment may be optionally incorporated for use in the algorithms. The algorithms used in the present invention are tailored for specific procedures and data collected. The algorithms output (814) the desired assistance data for use in the display device (816).

III. Hip Replacement Procedures

Figure 6:
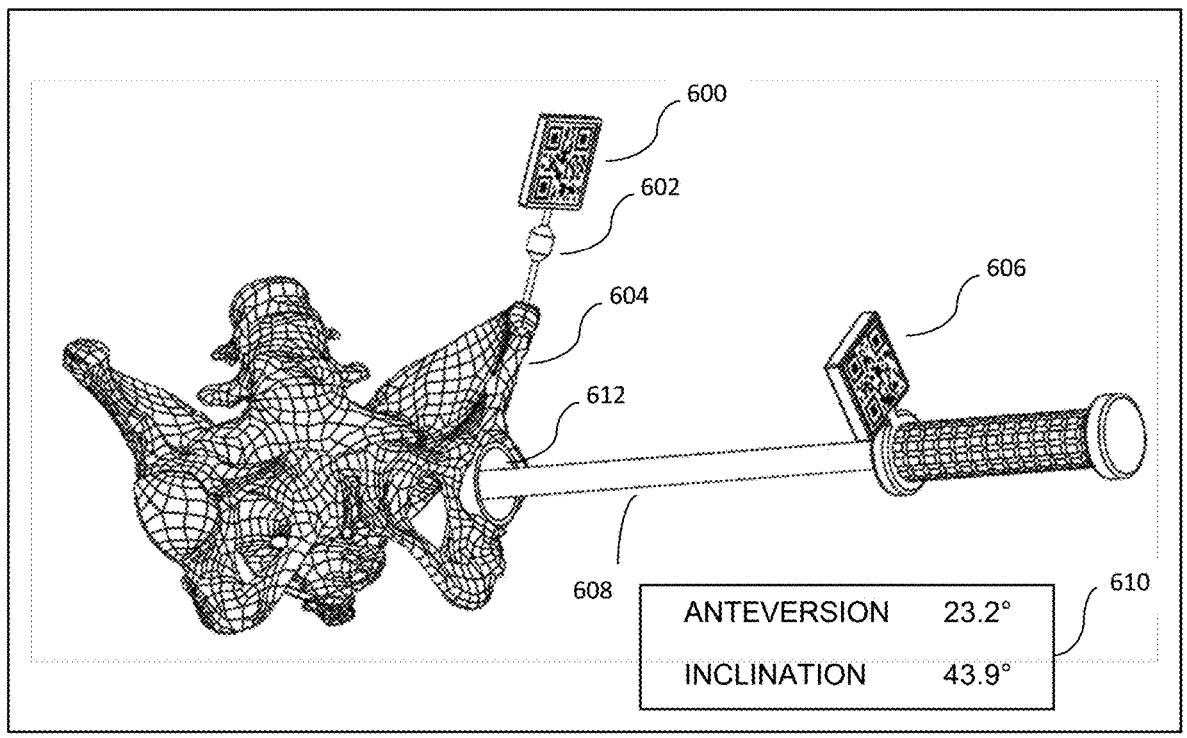
FIG. 6 is a diagrammatic depiction of a mixed reality user interface image ("MXUI") provided by system of FIG. 1 during positioning of an acetabular shell in a hip replacement procedure showing a virtual pelvis.

In one exemplary embodiment of the present invention and referring to FIG. 6, the system 10 is used for hip replacement surgery wherein a first marker 600 is attached via a fixture 602 to a pelvis 604 and a second marker 606 is attached to an impactor 608. The user 106 can see the mixed reality user interface image ("MXUI") shown in FIG. 6 via the display device 104. The MXUI provides stereoscopic virtual images of the pelvis 604 and the impactor 604 in the user's field of view during the hip replacement procedure.

The combination of markers (600, 606) on these physical objects, combined with the prior processing and specific algorithms allows calculation of measures of interest to the user 106, including real time version and inclination angles of the impactor 608 with respect to the pelvis 604 for accurate placement of acetabular shell 612. Further, measurements of physical parameters from pre- to post-operative states can be presented, including, but not limited to, change in overall leg length. Presentation of data can be in readable form 610 or in the form of imagery including, but not limited to, 3D representations of tools or other guidance forms.

Figure 7:
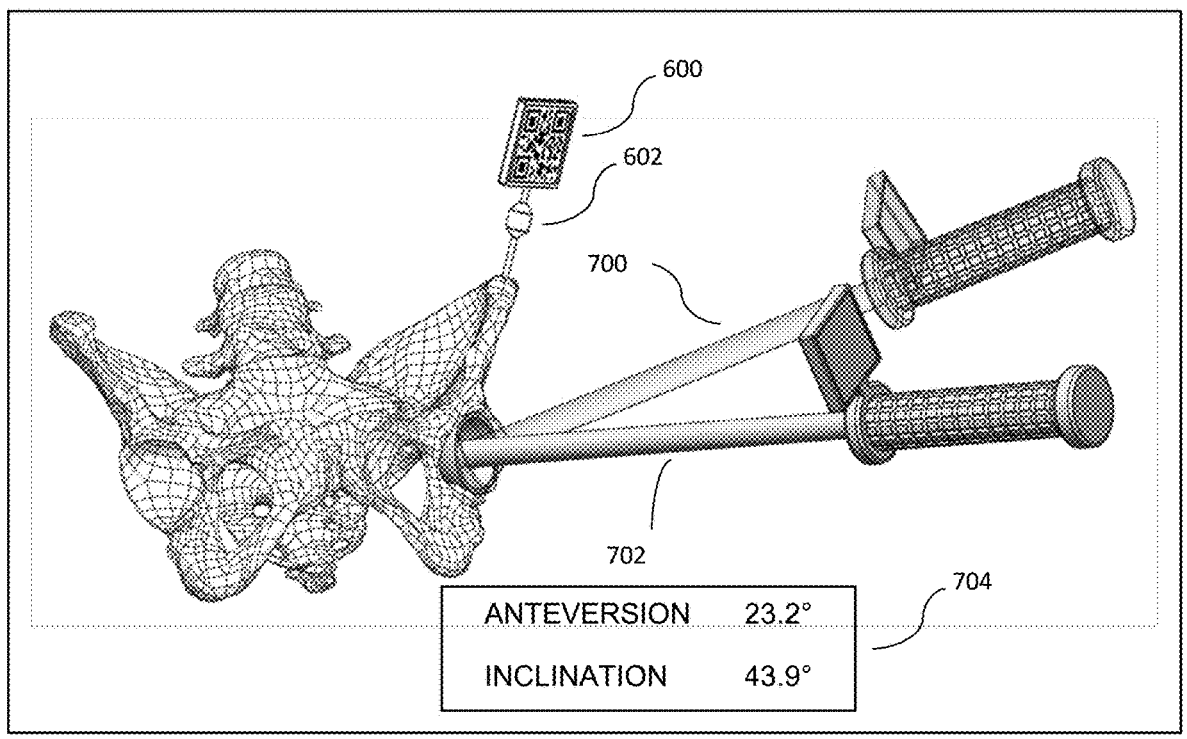
FIG. 7 is a diagrammatic depiction of a MXUI provided by system of FIG. 1 during positioning of an acetabular shell in a hip replacement procedure showing a virtual pelvis and virtual acetabular impactor.

FIG. 7 depicts an alternate view of the MXUI previously shown in FIG. 6, wherein a virtual target 700 and a virtual tool 702 are presented to the user 106 for easy use in achieving the desired version and inclination. In this embodiment, further combinations of virtual reality are used to optimize the natural feeling experience for the user by having a virtual target 700 with actual tool 702 fully visible or a virtual tool (not shown) with virtual target fully visible. Other combinations of real and virtual imagery can optionally be provided. Presentation of data can be in readable form 704 or in the form of imagery including, but not limited to, 3D representations of tools or other guidance forms.

Figure 9:
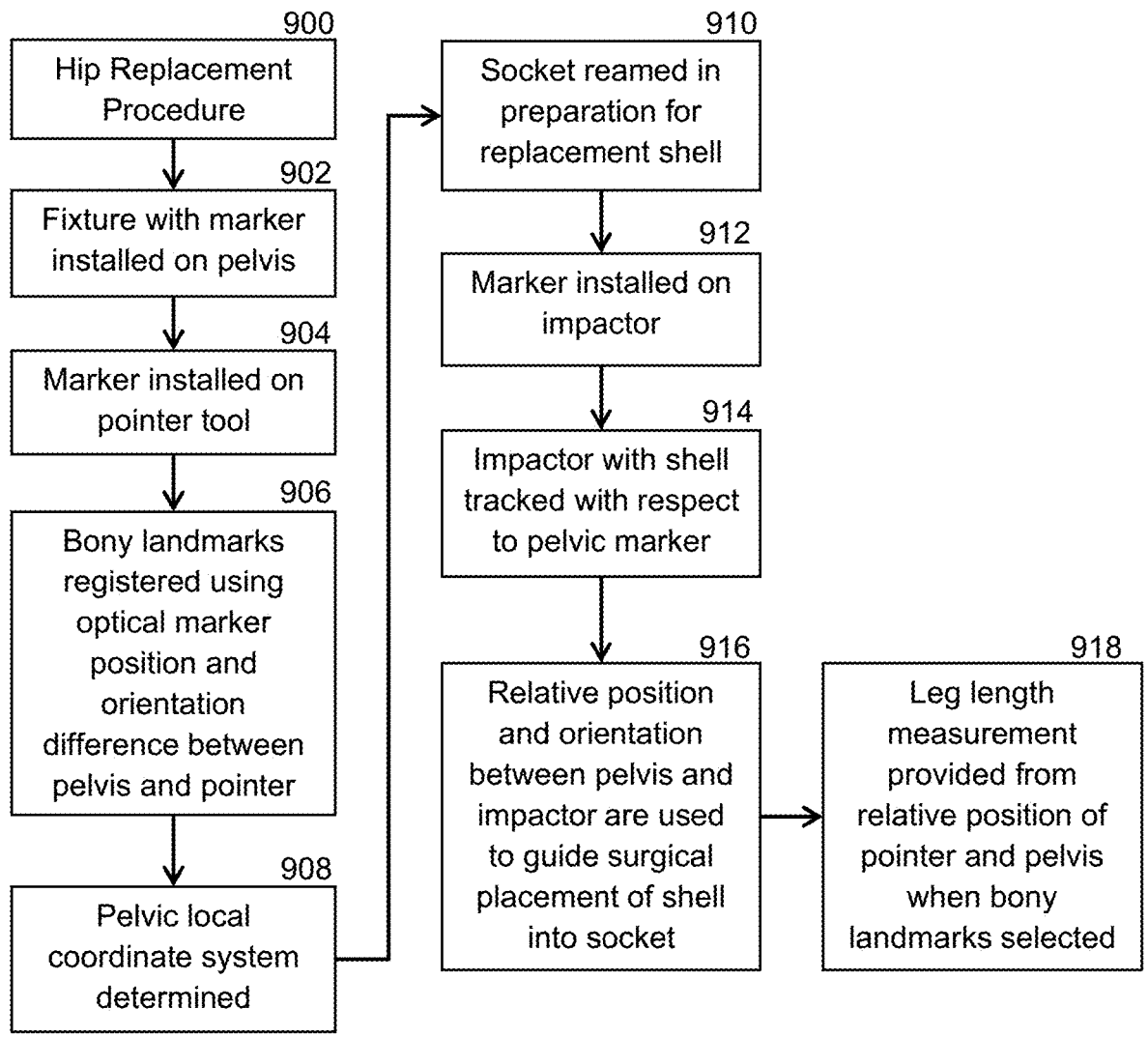
FIG. 9 is a flowchart showing a method of using the system of FIG. 1 to perform a hip replacement procedure in accordance with the principles of the present invention.

Referring to FIG. 9, the present invention further provides a method of using the system 10 to perform a hip replacement procedure (900) in which a hip bone has the socket reamed out and a replacement cup is inserted for use with a patient's leg. In this embodiment, a first marker (e.g., 100, 108, or 110, etc.) is installed on a fixture of known dimensions with respect to the marker and this fixture is installed on the hip bone of a patient (902). A second distinct marker (e.g., 100, 108, or 110, etc.) is installed on a pointing device of known dimensions with respect to the first marker (904). Bony landmarks or other anatomic landmarks position and orientation relative to the hip fixture are registered using the optical markers and the position/orientation difference between the hip and the pointer (906). These points are used to determine a local coordinate system (908). The pointer is used to determine position and orientation of the femur before the femur is dislocated and the acetabulum of the hip bone is reamed to make room for the replacement shell (910). An impactor with replacement shell installed on it has a third distinct marker installed with known dimensions of the impactor (912). The impactor with shell is tracked per the previously described algorithm with respect to the hip marker (914). The relative position and orientation between the hip marker and impactor are used to guide surgical placement of the shell via AR or VR display into the socket at a desired position and angle per medical requirement for the patient (916). The change in leg length can also be calculated at this point in the procedure using the marker position and orientation of the replaced femur (918). Another embodiment augments this procedure with pre-operative CT data to determine component positioning. Another embodiment uses the display output in an AR or VR manner to determine the femoral head cut. Another embodiment uses the data to place screws in the acetabulum.

The coordinate reference frame of the table or support on which the patient lies is desirable in some implementations. Table alignment with respect to ground, specifically gravity, can be achieved as follows. The IMU (from each of the sensor suites such as the one located within the AR headset 3600) provides the pitch and roll orientation of the display device 104 with respect to gravity at any given instant. Alternatively, SLAM or similar environment tracking algorithms will provide the pitch and roll orientation of the display device 104 with respect to gravity, assuming most walls and features associated with them are constructed parallel to the gravity vector. Separate from the display device's 104 relationship between to gravity, the table orientation may be determined by using the stylus to register three (3) independent points on the table. With these three points selected in the display device 104 coordinate frame, the table roll and pitch angles with respect to gravity can then be determined as well. Alternatively, the table may be identified and recognized using machine vision algorithms to determine orientation with respect to gravity. The alignment of the patient spine relative to the display device 104, and therefore any other target coordinate systems such as defined by the hip marker, in pitch and roll is now known. To provide a yaw reference, the stylus can be used in conjunction with the hip marker to define where the patient head is located, which provides the direction of the spine with respect to him. Alternatively, image recognition of the patient's head can be used for automatic determination. Ultimately, the roll, pitch and yaw of the table and/or patient spine are now fully defined in the display device 104 and all related coordinate systems.

Figure 11:
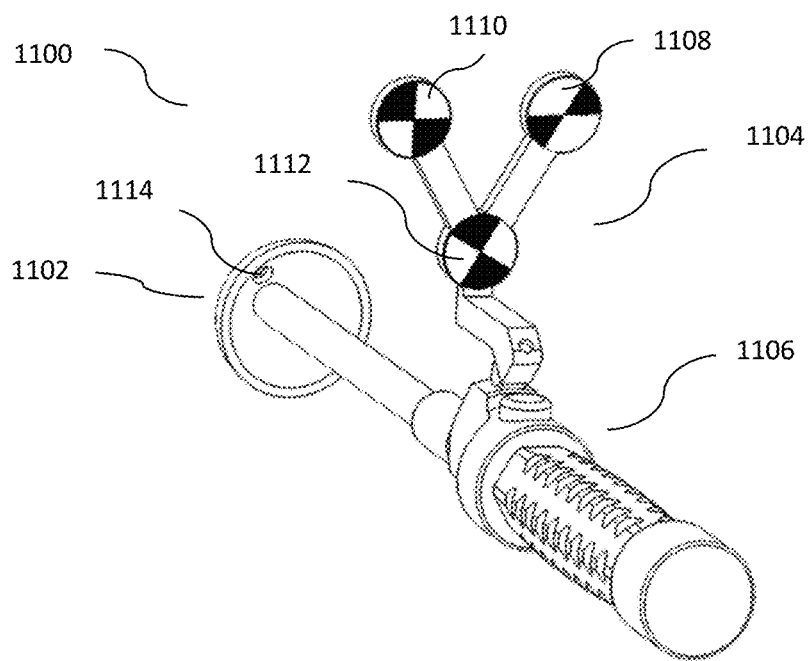
FIG. 11 shows a perspective view of a diagrammatic depiction of a hip impactor assembly including an acetabular shell and an optical marker.
Figure 12:
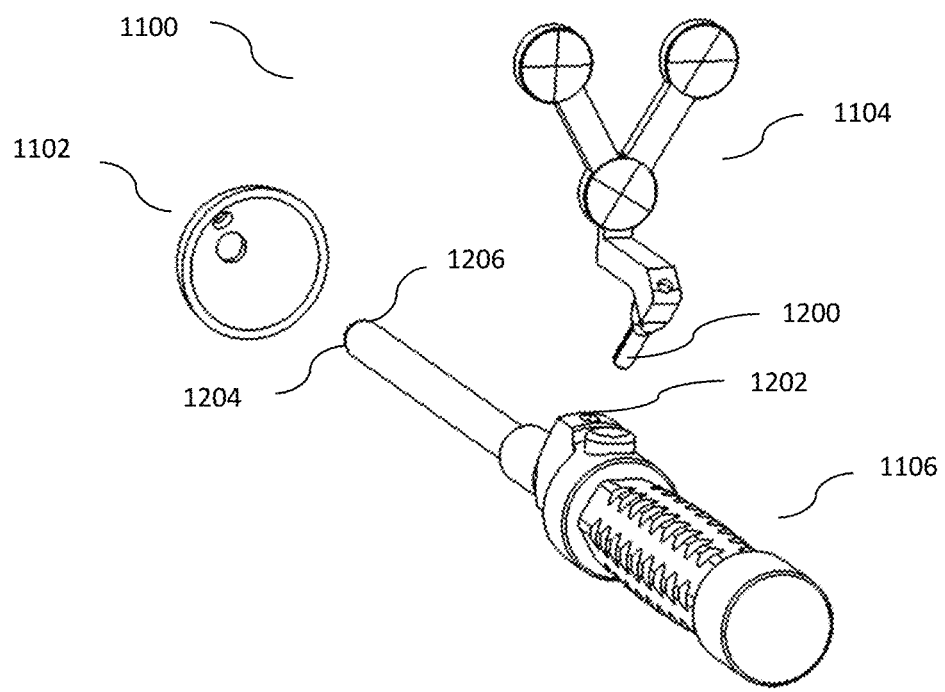
FIG. 12 shows an exploded view of the hip impactor assembly shown in FIG. 11.

Referring to FIGS. 11-12, the system 10 may optionally include a hip impactor assembly 1100 for use in hip arthroplasty procedures. The assembly includes an acetabular shell 1102, and an optical marker 1104 (same as 100, 108, 110, 502, 504, 600, 606, 804, 806, 904, 912 described above) assembled to an acetabular impactor 1106. FIG. 12 depicts an exploded view of the assembly 1100 illustrating how the optical marker 1104 attaches to the impactor 1106 in a reproducible way by insertion of an indexed post 1200 into an indexed hole 1202. The acetabular shell 1102 assembles reproducibly with the impactor 1106 by screwing onto a threaded distal end 1204 of the impactor and seating on a shoulder 1206. The marker 1104 includes a first fiducial 1108, a second fiducial 1110, and a third fiducial 1112; each having adjacent regions of black and white wherein their boundaries form intersecting straight lines. Algorithms in the AR headset 3600 are used to process the images from the stereoscopic cameras (3904) to calculate the point of intersection of each fiducial (1108, 1110, 1112) and thereby determine the six-degrees of freedom pose of the marker 1104. For the purpose of this specification, "pose" is defined as the combination of position and orientation of an object. The fiducials (1108, 1110, and 1112) can be created by printing on self-adhesive sticker, by laser-etching the black regions onto the surface of white plastic material, or alternative methods. The shell contains a fixation hole 1114 through which a screw is optionally used to fixate the shell 1102 to the bone of the acetabulum.

Figures 13A, 13B:
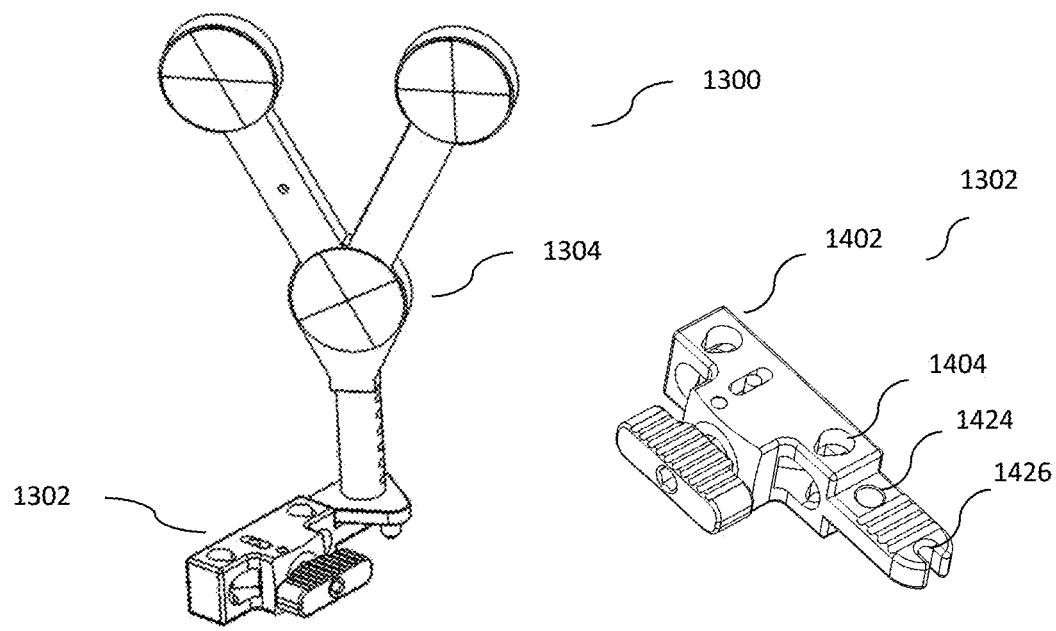
FIG. 13A shows a perspective view of a diagrammatic depiction of an anatomy marker assembly that is optionally included in the system of FIG. 1.
FIG. 13B shows a perspective view of a clamp assembly of the anatomy marker shown in FIG. 13A.
Figure 14:
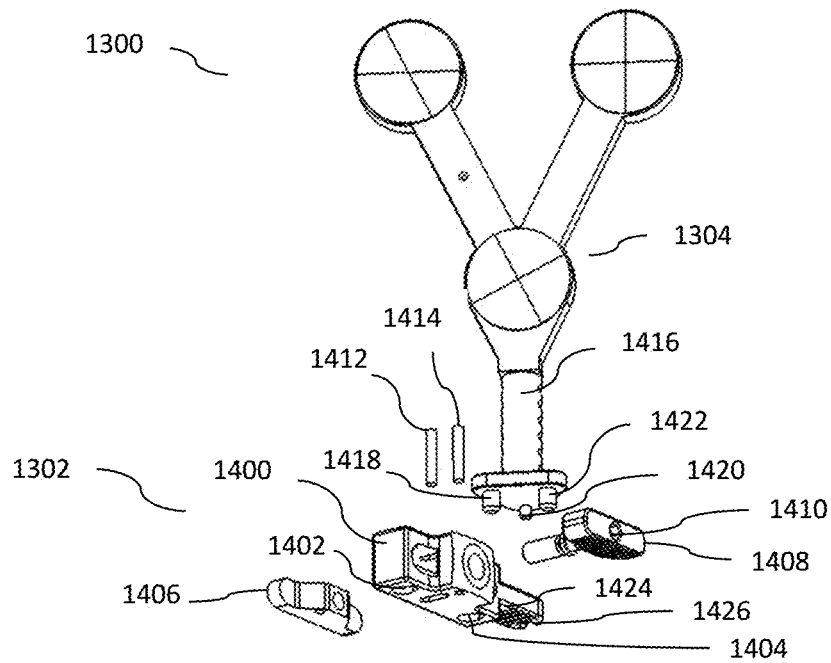
FIG. 14 shows an exploded view of the anatomy marker assembly shown in FIG. 13A.

In another exemplary embodiment and referring to FIGS. 13A-B and 14, the system 10 optionally includes an anatomy marker assembly 1300 comprising a clamp assembly 1302 and an optical marker 1304. The clamp assembly 1302 includes a base 1400, which defines a first teardrop-shaped hole 1402 and a second teardrop-shaped hole 1404. Fixation pins (not shown) which have been fixed to the bone can be inserted through the teardrop shaped holes (1402, 1404) and clamped between a clamp jaw 1406 and the body 1400 thereby fixing the clamp assembly 1302 to the pins and therefore to the bone. A clamp screw 1408 engages threads in the jaws and is used to tighten the assembly 1302 onto the pins. A hexagonal hole 1410 allows a hex driver to be used to tighten the assembly 1302. A first retaining pin 1412 and a second retaining pin 1414 prevent disassembly of the clamp assembly 1302. A marker body 1416 has a first locating post 1418, as second locating post 1420, and a third locating post 1422, which provide location to the base 1400 by engaging two locating posts with a locating hole 1424 and locating slot 1426 in the base. The design provides for two possible rotational positions of the marker 1304 which allows the marker 1304 to be oriented relative to the cameras (e.g., 3904) in the display device 104 (e.g., the AR headset 3600) for optimal tracking. The marker body 1416 encapsulates a magnet (not shown) which provides sufficient holding force to the base 1400.

Figure 15:
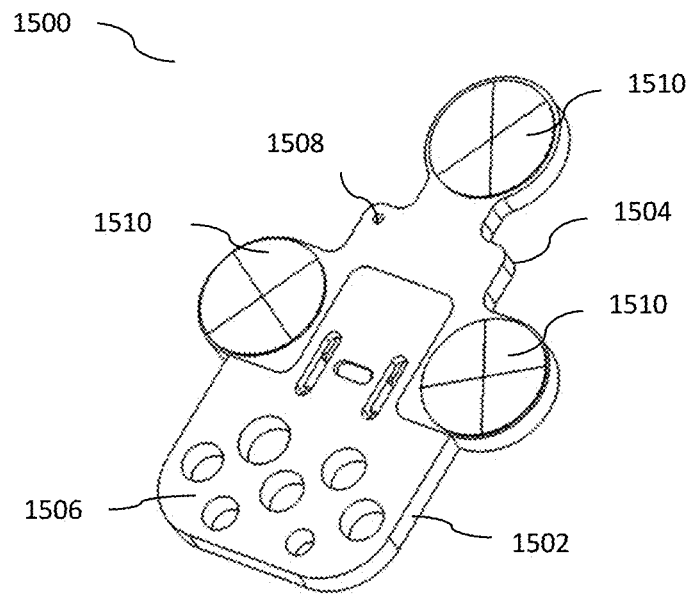
FIG. 15 shows a perspective view of a diagrammatic depiction of a calibration assembly that is optionally included in the system of FIG. 1.
Figure 16:
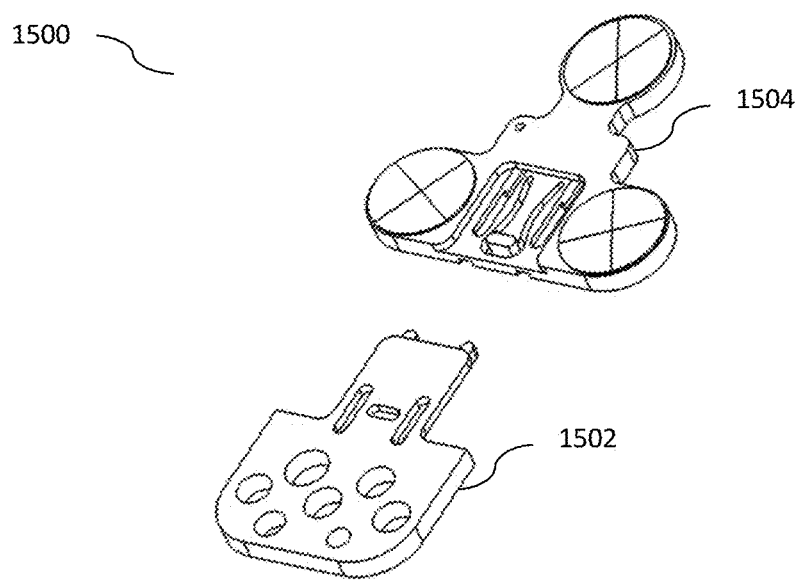
FIG. 16 shows an exploded front view of the calibration assembly shown in FIG. 15.
Figure 17:
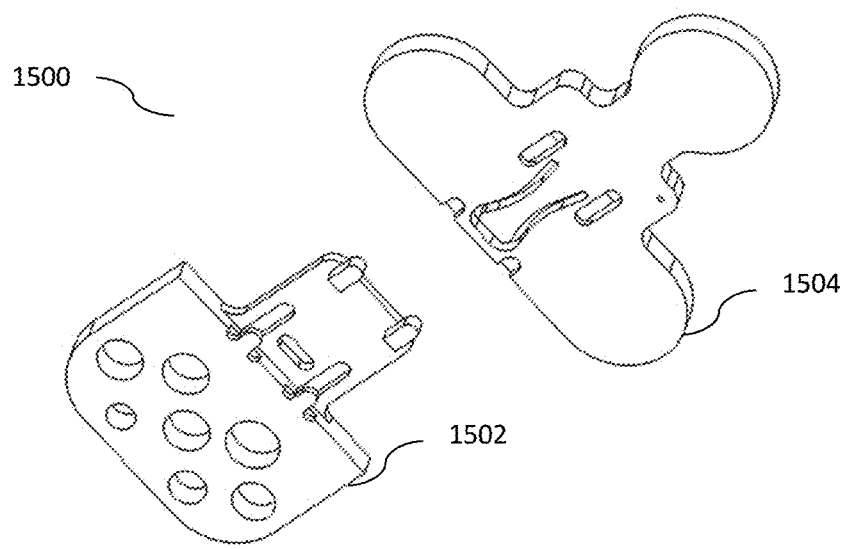
FIG. 17 shows an exploded back view of the calibration assembly shown in FIG. 16.

Referring to FIGS. 15-17, the system 10 may optionally include a calibration assembly 1500 comprising a plate 1502 and a marker 1504 with tongue and groove assembly features for coupling plate 1502 and marker 1504 together. The tongue and groove assembly features are especially useful for precisely assembling a metal part to a plastic part, which has a different rate of thermal expansion than the metal part. The plate 1502 has a plurality of holes 1506 having a plurality of thread types to accept various impactor types. The marker 1504 has a dimple 1508 into which the tip of a stylus may be inserted for registration. The marker 1504 has a plurality of fiducials 1510.

Figure 18:
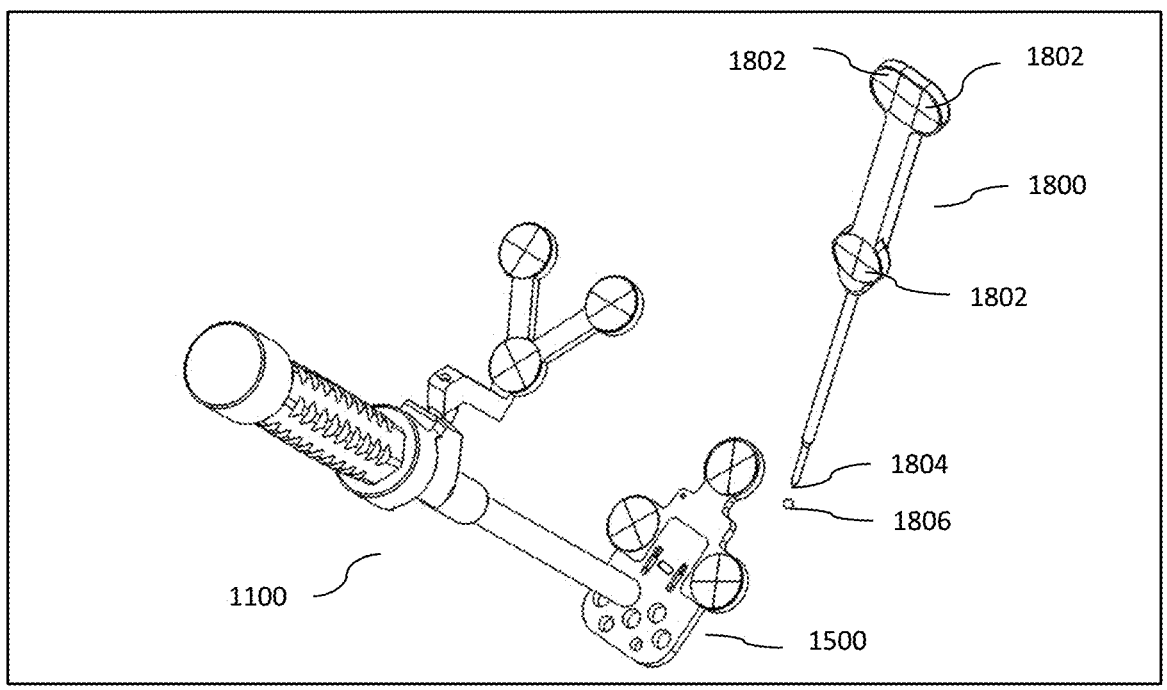
FIG. 18 shows a diagrammatic depiction of a MXUI provided by system of FIG. 1 during various calibration steps.

FIG. 18 depicts an exemplary embodiment of a MXUI shown to the user 106 via the display device 104 (e.g., the AR headset 3600) showing the calibration assembly 1500 being used for various calibration steps. First, the hip impactor assembly 1100 can be screwed into the appropriate hole of the plate 1502 so that the shoulder 1206 is seated squarely without play against the surface of the plate 1502. The cameras 3904 of the AR headset 3600 can then capture images which are processed by an algorithm to determine the relationship between the shoulder of the impactor on which the acetabular shell will seat and the marker 1104 of the hip impactor assembly 1100. A stylus 1800 is shown which contains a plurality of fiducials 1802 for tracking. The tip 1804 of the stylus 1800 may be inserted into the dimple 1508 of the plate 1502 allowing the coordinate of the tip 1804 relative to the marker of the stylus 1800 to be determined. A virtual guide point 1806 is shown which is projected into the user's 106 field of view at a specific location relative to the marker 1504. The user 106 places the tip 1804 of the actual stylus 1800 where the virtual guide point 1806 is located according to the user's 106 depth perception thereby connecting his actual view with the virtual view represented by the virtual guide point. An algorithm then applies a correction factor to account for variables such as the intraocular distance of the user 106. This is beneficial if the user's depth perception will be relied on in a mixed reality state for precise location of tools or implants.

Figure 19:
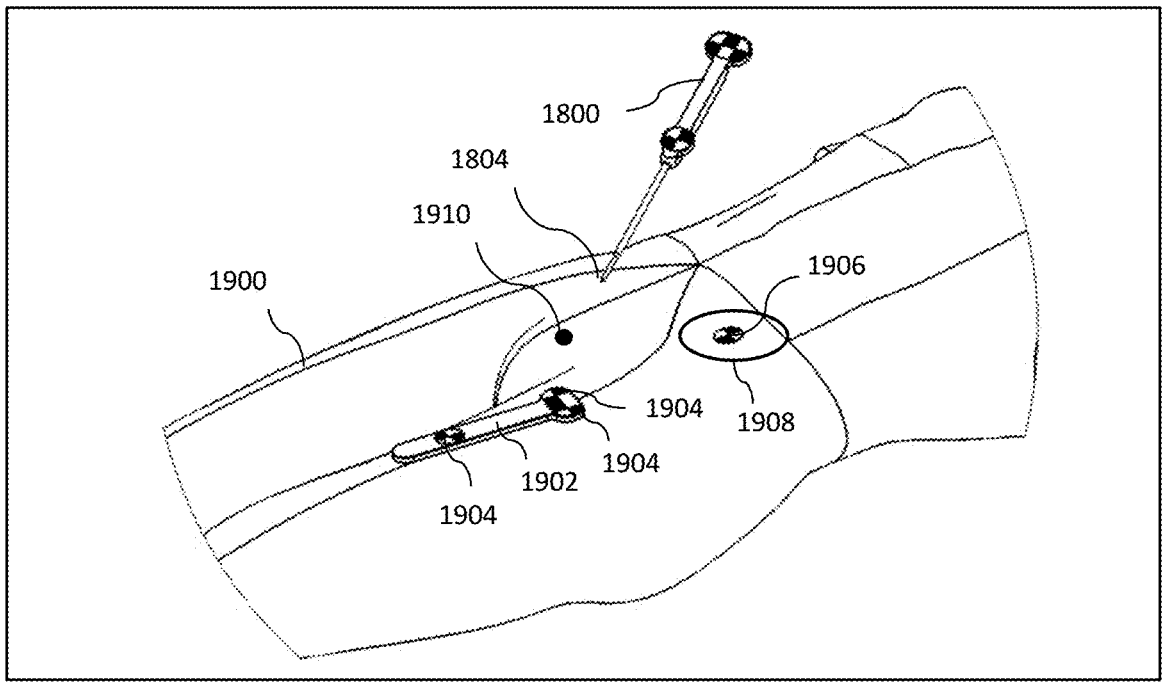
FIG. 19 is a diagrammatic depiction of a MXUI provided by system of FIG. 1 during a pelvic registration step of a hip replacement procedure.

FIG. 19 depicts an exemplary embodiment of a MXUI shown to the user 106 via the display device 104 of a patient 1900 at the beginning of a hip replacement procedure. A femur marker 1902, having a plurality of fiducials 1904 for tracking, is attached to the skin of the patient's 1900 thigh with adhesive tape such as Ioban. Alternatively, the femur marker 1902 could be fixated directly to the bone of the femur by use of pins and a clamp assembly like that depicted in FIG. 13B. The user 106 registers the anterior landmarks of the pelvis using the tip 1804 of the stylus 1800 to determine the location of the pelvis in the reference frame of the femur marker 1902 to establish a temporary pelvic reference frame. In another embodiment, this registration can be in the body reference frame defined by SLAM scanning of the visible surface of the patient. In another embodiment, the anterior landmarks of the pelvis can be registered by generating a surface map with SLAM and having the user 106 identify each point by positioning a virtual point 1910 on each landmark in turn by motion of his head. In another embodiment, a single fiducial 1906 can be placed at the location to be registered. A virtual circle 1908 can be used to define a mask whose position is controlled by the gaze of the user 106. The machine vision algorithm only looks for a single fiducial 1906 within the virtual circle 1908. Registration steps may be triggered with a voice command by the user 106 such as "register point." The user 106 may also register a point representing the distal femur such as the center of the patella or the medial and lateral epicondyles. When each point is registered, a virtual marker, such as a small sphere, may be positioned and remain at the location of the tip at the time of registration and beyond to provide the user 106 a visual confirmation to the user 106 and check on the quality of the registration.

Figure 20:
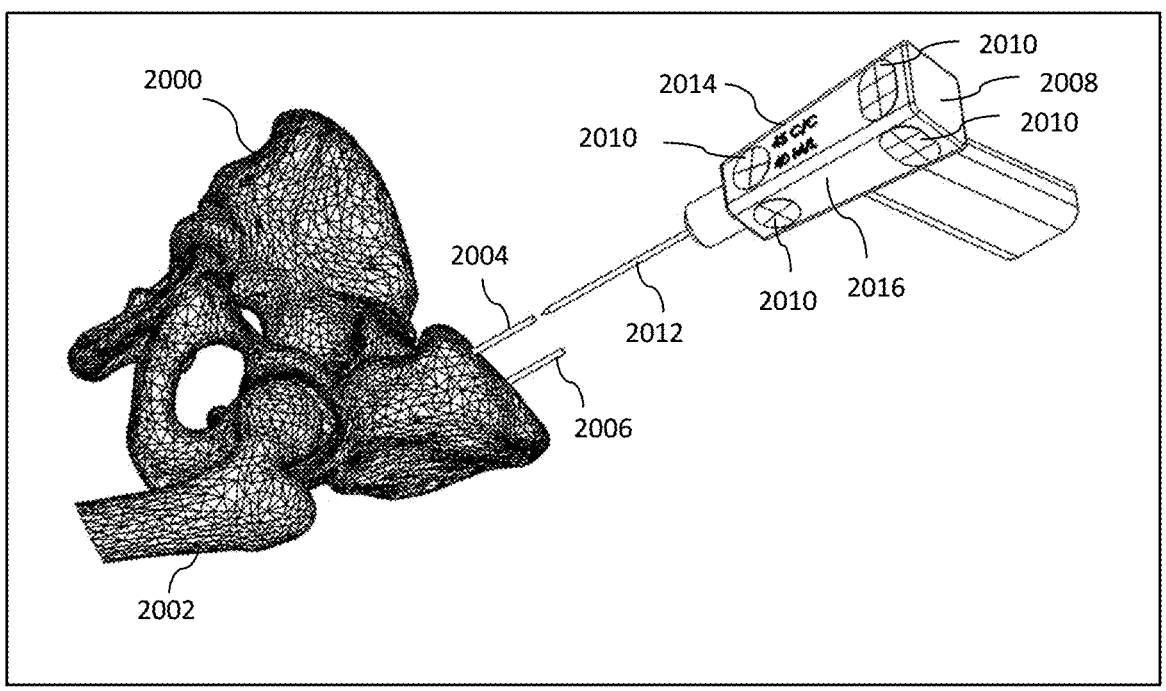
FIG. 20 is a diagrammatic depiction of a MXUI provided by system of FIG. 1 during insertion of a pin into a pelvis of a hip replacement procedure.

FIG. 20 depicts an exemplary embodiment of a MXUI shown to the user 106 via the display device 104 of a virtual pelvis 2000 and a virtual femur 2002 during a hip replacement procedure. If patient-specific models had been uploaded into the display device 104, then virtual models of these would be displayed along with any other virtual features of interest such as neurovascular structures. If not, the virtual pelvis and virtual femur could be gender-specific models, which have been scaled to best match the spacing of the registered landmarks. A first virtual trajectory 2004 and a second virtual trajectory 2006 for each of two fixation pins are displayed. In other embodiments, these may be tube-shaped or cone shaped. A drill 2008 is shown which includes a plurality of fiducials 2010 defining markers on a plurality of surfaces, which allows its pose to be tracked from various vantage points. Insertion of each pin can be guided either by lining up an actual pin 2012 with the virtual trajectory 2004 in the case where the drill is not tracked or by lining up a virtual pin (not shown) with the virtual trajectory in the case where the drill is tracked. If the drill is tracked, the angle of the drill relative to the pelvic reference frame is displayed numerically for additional augmentation. Virtual text 2014 is located on a surface 2016 of the actual drill and moves with the drill making it intuitive to the user the object to which the angles represented by the virtual text are associated.

Figure 21:
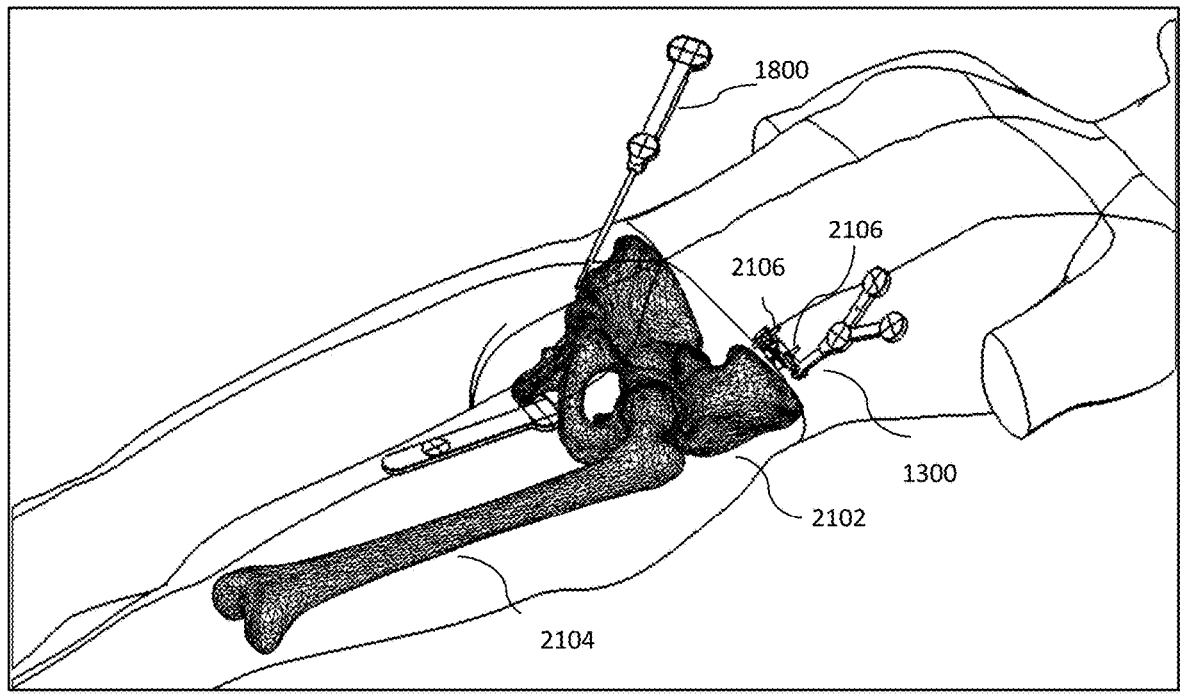
FIG. 21 is a diagrammatic depiction of a MXUI provided by system of FIG. 1 during a pelvic registration step of a hip replacement procedure.

FIG. 21 depicts an exemplary embodiment of a MXUI shown to the user 106 via the display device 104 during a hip replacement procedure with the anatomy marker 1300 attached to the patient's pelvis by way of clamping onto the pins 2106 inserted into the iliac crest. At this point, the reference frame relating to tracking the pelvis is transferred from the previous reference frame to that of the anatomy marker 1300. If desired, the pelvis may be re-registered to increase accuracy. The user 106 then makes an incision and exposes the femur using a virtual pelvis 2102, a virtual femur 2104, and virtual neurovascular structures (not shown) as a guide for the location of the incision and dissection of the muscles and joint capsule to expose the hip joint and neck of the femur. At this point, the user 106 places the leg in a reference position having approximately neutral abduction, flexion and rotation relative to the pelvis.

Figure 22:
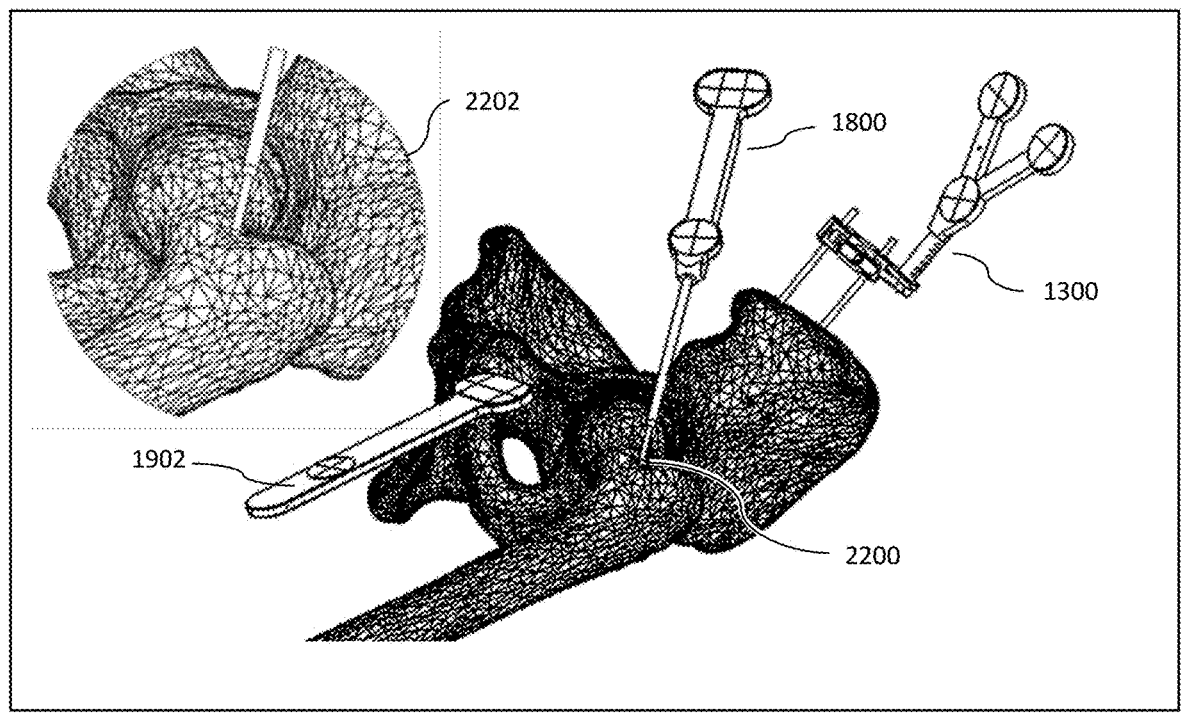
FIG. 22 is a diagrammatic depiction of a MXUI provided by system of FIG. 1 during a femoral registration step of a hip replacement procedure.

FIG. 22 depicts an exemplary embodiment of a MXUI shown to the user 106 via the display device 104 during femoral registration of a hip replacement procedure. The tip of the stylus 1800 is placed on a reference point 2200 on the proximal femur. At this time, the baseline orientation of the femur relative to the pelvis as defined by the relationship between markers 1902 and 1300 is determined and recorded. In addition, the coordinates of the reference point 2200 in the pelvic reference frame are recorded. The reference point 2200 may be enhanced by marking with a surgical pen, drilling a small hole in the bone or inserting a small tack. To improve the precision of the registration, a magnified stereoscopic image 2202 centered on the tip of the stylus is displayed as shown in FIG. 22. To aid the user 106 in finding the reference point later in the procedure, a baseline image, or images of the region around the point of the stylus may be recorded at the time of registration. These may be stereoscopic images. The user 106 then registers a point on the desired location of the femoral neck cut using the tip 1804 of the stylus 1800. This is typically the most superior/lateral point of the femoral neck. An optimum resection plane is calculated which passes through this point at the appropriate abduction and version angles.

Figure 23:
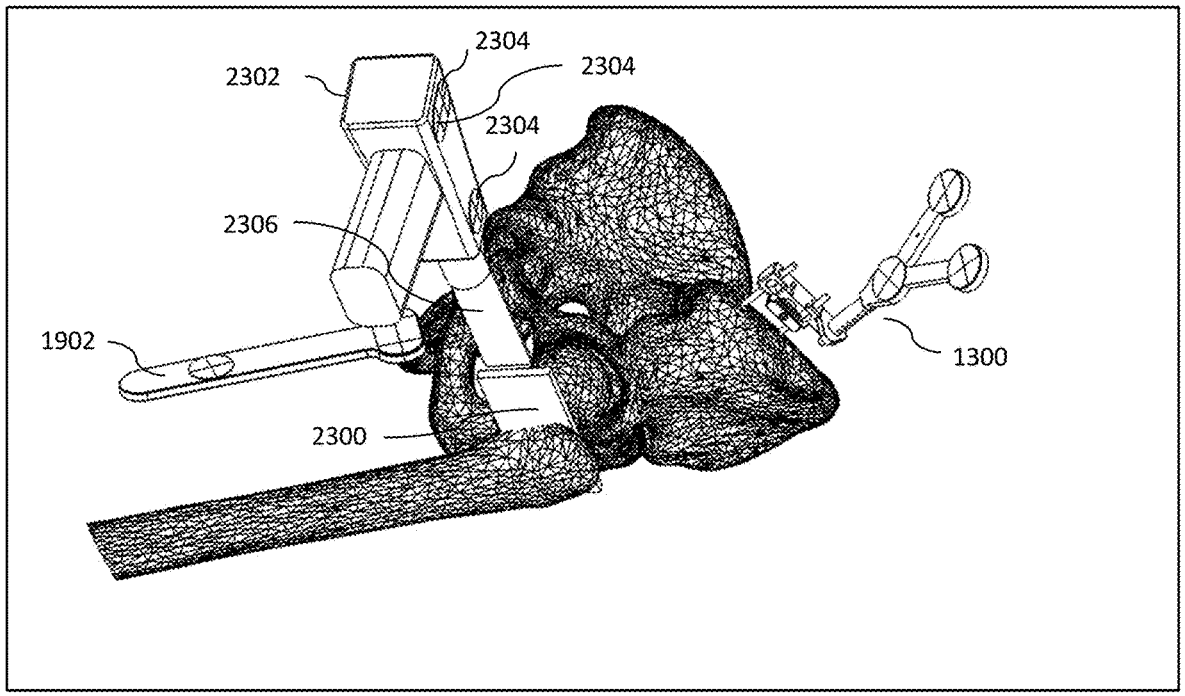
FIG. 23 is a diagrammatic depiction of a MXUI provided by system of FIG. 1 during resection of the femoral neck in a hip replacement procedure.

FIG. 23 depicts an exemplary embodiment of a MXUI shown to the user 106 via the display device 104 during resection of the femoral neck of a hip replacement procedure with a virtual resection guide 2300. A sagittal saw 2302 is shown having a plurality of fiducials 2304 defining a marker, allows the pose of the sagittal saw 2302 to be tracked. Resection of the femoral neck can be guided either by lining up the actual saw blade 2306 with the virtual resection guide 2300, in the case where the drill is not tracked, or by lining up a virtual saw blade (not shown) with the virtual resection guide 2300, in the case where the saw 2302 is tracked. As with the tracked drill shown in FIG. 20, the angles of the saw 2302 may be displayed numerically if the saw 2302 is tracked. These angles could be displayed relative to the pelvic reference frame or the femoral reference frame.

Figure 24:
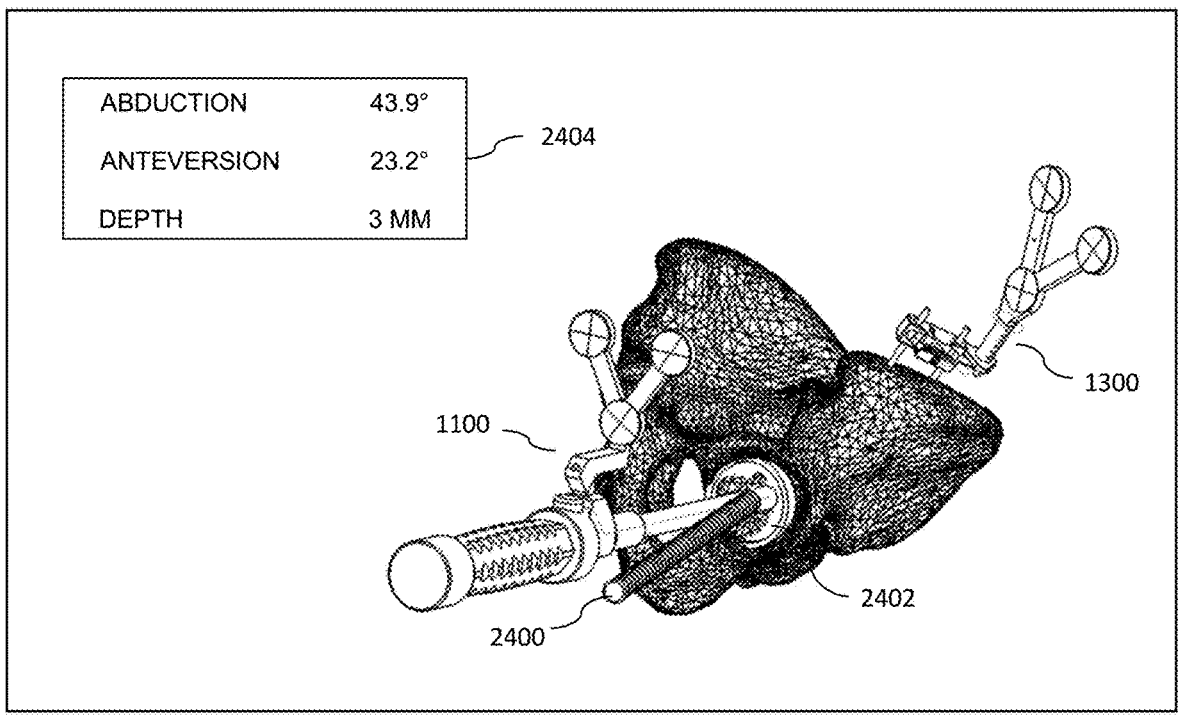
FIG. 24 is a diagrammatic depiction of a MXUI provided by system of FIG. 1 during positioning of an acetabular shell in a hip replacement procedure.

FIG. 24 depicts an exemplary embodiment of a MXUI shown to the user 106 via the display device 104 during positioning of the acetabular shell of a hip replacement procedure wherein a virtual target 2400 for the acetabular impactor assembly 1100 and a virtual shell 2402 are shown. Placement of the acetabular impactor assembly 1100 is guided by manipulating it to align with the virtual target 2400. The posterior/lateral quadrant of the shell portion of the virtual target may be displayed in a different color or otherwise visually differentiated from the rest of the shell 2402 to demarcate to the user 106 a target for safe placement of screws into the acetabulum. The numerical angle of the acetabular impactor and the depth of insertion relative to the reamed or un-reamed acetabulum are displayed numerically as virtual text 2404. A magnified stereoscopic image (not shown) similar to 2202 centered on the tip of the impactor may be displayed showing how the virtual shell interfaces with the acetabulum of the virtual pelvis 2102.

Figure 25:
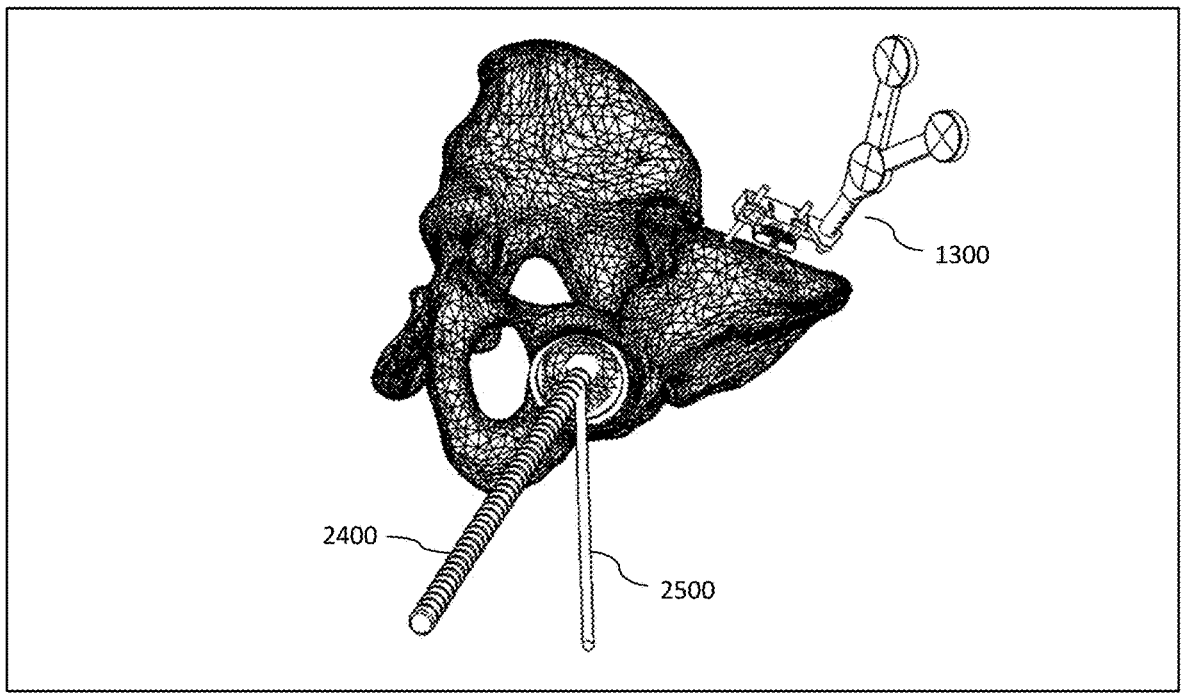
FIG. 25 is a diagrammatic depiction of a MXUI provided by system of FIG. 1 during positioning of an acetabular shell in a hip replacement procedure.

FIG. 25 depicts an exemplary embodiment of a MXUI shown to the user 106 via the display device 104 during positioning of the acetabular shell of a hip replacement procedure, wherein a virtual axis 2500 of the acetabular impactor and the virtual target 2400 are shown. Placement of the acetabular impactor is guided by manipulating it to align the virtual axis 2500 with the virtual target 2400.

Figure 26:
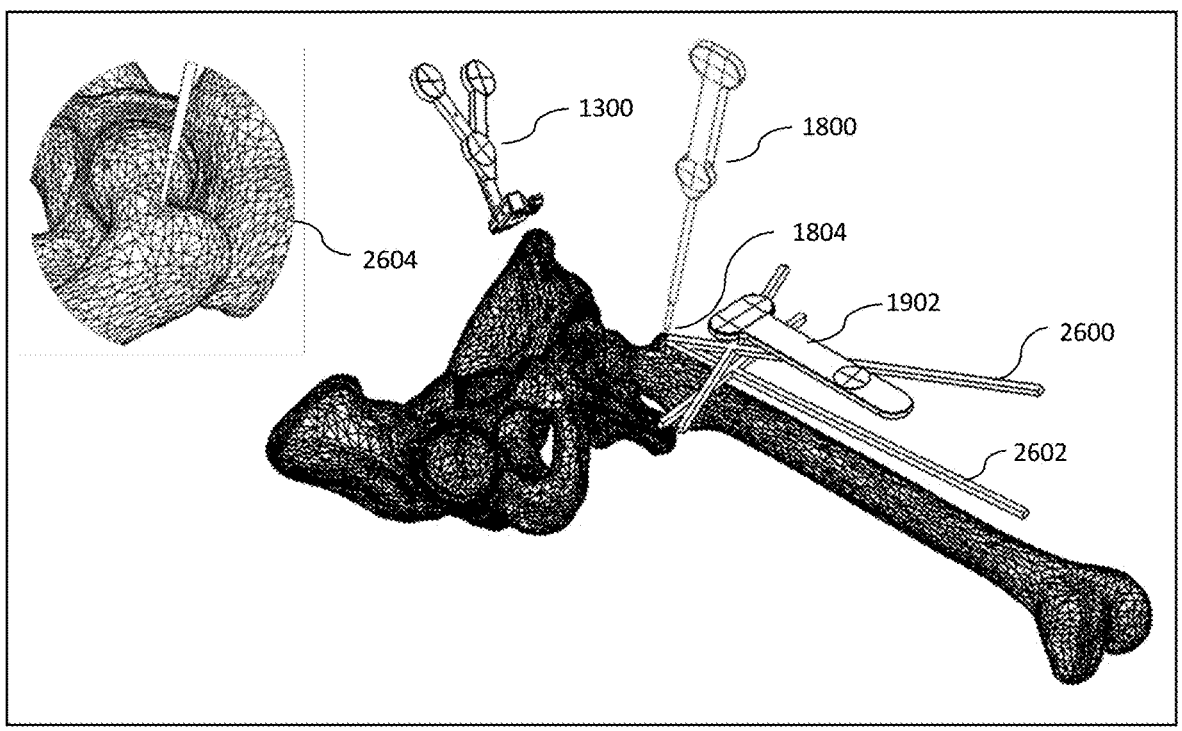
FIG. 26 is a diagrammatic depiction of a MXUI provided by system of FIG. 1 during repositioning of the femur in a hip replacement procedure.

FIG. 26 depicts an exemplary embodiment of a MXUI shown to the user 106 via the display device 104 during repositioning and registration of the femur of a hip replacement procedure. A virtual femur target 2600 is shown which represents the preoperative orientation of the femur relative to the pelvis during baseline femoral registration. The superior apex of this virtual femur target is placed near the reference point on the proximal femur. A virtual femur frame 2602 is shown which represents the current orientation of the femur. As the femur is moved, the virtual femur frame 2602 rotates about the superior apex of the virtual femur target 2600. Re-positioning the femur to the baseline orientation is achieved by manipulating the femur to align the virtual femur frame 2602 with the virtual femur target 2600 in abduction, flexion, and rotation. With the femur re-positioned in the baseline orientation, the user then uses the tip 1804 of the stylus 1800 to re-register a reference point on the proximal femur to determine the change in leg length and lateral offset from the baseline measurement. The baseline image 2604 recorded earlier during baseline femoral registration may be displayed to assist in precisely re-registering the same reference point.

IV. Tracking and Related Methods

Figure 64:
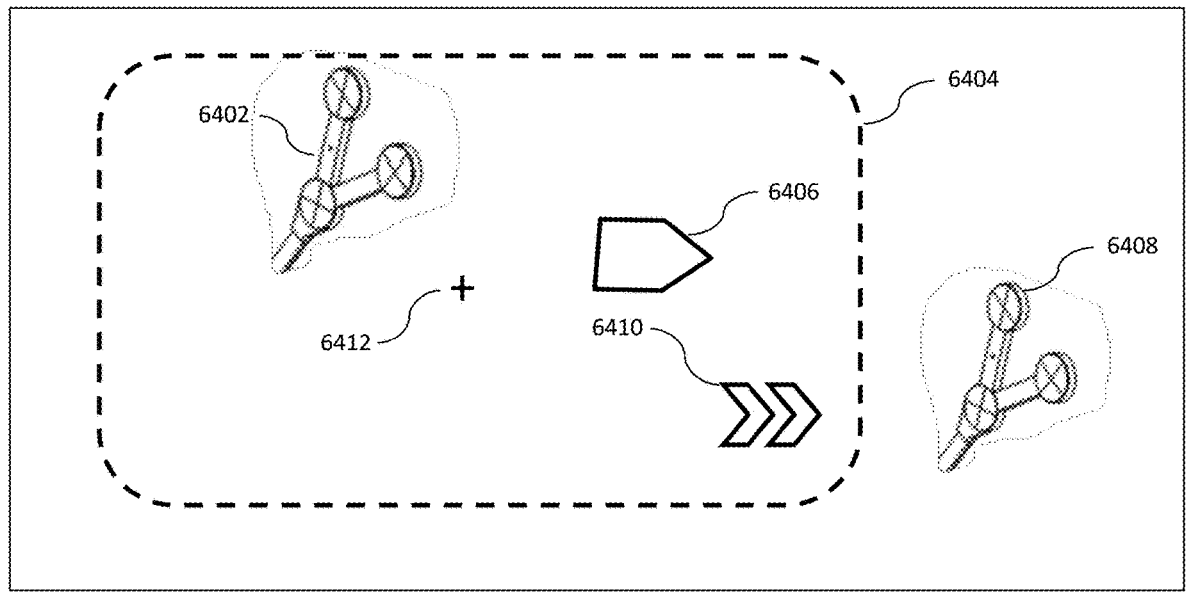
FIG. 64 is a diagrammatic depiction of a MXUI illustrating features to assist the user in positioning the camera FOV to encompass required markers.

In some applications, it may be advantageous to use cameras with a relatively small field of view to effectively decrease the size of the available pixels in order to maximize tracking accuracy. As a result, it becomes more difficult for the user to position the camera(s) so all required markers fall within the field of view, especially since it may not be obvious to the user which markers are or are not inside the field of view, or in which direction the camera(s) should be directed to capture all required markers. FIG. 64 depicts an exemplary embodiment of a MXUI with features designed to assist the user in positioning the field of view of the camera(s) to contain all required markers. In this embodiment, two markers 6402 and 6408 are required to be tracked by camera(s) to register a point or calculate navigation outputs. One marker 6402 is located within field of view 6404 of camera(s). A second marker 6408 is outside field of view 6404 of the camera(s). A virtual guide 6410 (e.g., head fixed object, as described elsewhere herein) is displayed to user 106 in display device 104, indicating the direction in which missing marker 6408 is likely to be found. Virtual guide 6410 may be a symbol, such as an arrow, or text indicating a direction. In one embodiment, the expected location of marker 6408 is based on the relative positions of markers 6402 and 6408, which were either previously recorded when both markers were visible, or estimated by the system based on typical marker placement. For many applications, markers can reasonably be expected to move only small distances once they are set up for a particular procedure. For example, two markers mounted on the pelvis and the thigh during a hip replacement surgery will stay in roughly the same relative positions throughout the surgery. In this case, the system, having once detected the two markers simultaneously (e.g., and their being inertially fixed objects, as described elsewhere herein) and measured their relative locations, can indicate to the user the direction of the missing marker if either marker is in the camera field of view 6404. Similarly, knowledge of typical anatomy informs the system about likely positions of markers. For example, markers placed by the user on the iliac crest on the pelvis and on the anterior aspect of the thigh of a hip replacement patient will always be roughly the same distance apart, and in roughly the same direction. In a simple example, an assumption that a second marker 6408 would be positioned approximately along the positive x-axis of a first marker 6402 would enable the system to generate a useful virtual guide 6410 directing the user to shift the camera field of view 6404 along that axis. In another embodiment, for example where no markers are in a camera field of view, inertial sensors in sensor suite are used to track the movement of the head of user (e.g., head angle) and calculate the relative position of marker 6408 based on its last known position (e.g., from the current head position and/or angle) when it fell within camera field of view 6404. In another embodiment, the system computes a 3D position and orientation value for a marker 6408 when it is in the field of view 6404 and successfully tracked. The system may track the position of the user in the room using Visual Inertial Odometry (VIO), SLAM, or other similar methods. The system also tracks the orientation of the user's head and therefore the field of view 6404. If the marker leaves the field of view 6404, the last known position of the marker 6408 can be propagated based on user position and orientation of the display field of view 6404 to produce an estimated location (but still outside the field of view). The estimated position and the current measured display field of view 6404 are used to present an indicator to the user indicating which direction to turn if the user wants to have marker 6408 in the field of view 6404. This approach can be used for multiple indicators representing multiple trackers, it is not limited to single marker cases. In one embodiment, a virtual control 6406 (e.g., an inertial fixed object, as described elsewhere herein) is shown to the user via the display device mounted on the head of user. The user must activate virtual control 6406 (for example, to register a point) by moving his or her head to align a fixed reticle or cursor or user input control 6412 (e.g., a head fixed object, as described elsewhere herein) with virtual control 6406. In this embodiment, virtual control 6406 is positioned by the system relative to marker 6402 to center it between the two required markers 6402 and 6408, and the position of the virtual control 6406 is adjusted as the user turns his/her head to align the user input control 6412 with the virtual control 6406 until they are aligned. As user turns his head to align user input control 6412 with virtual control 6406, camera field of view 6404 moves or adjusts to encompass both markers 6402 and 6408, thereby allowing tracking of the at least two markers in the field of view of the camera.

In another embodiment of any of the systems and devices described elsewhere herein, the system presents information screens or displays content that are locked to positions and/or orientations in inertial space (i.e., inertially fixed). In other words, as the user's head moves or rotates, the content will stay in place in inertial space, which may result in the content leaving the user's field of view and no longer being visible through the head-worn display. To reduce workflow changes and allow easier use by the surgeon, multiple methods are presented to allow automatic repositioning of the displayed content for the user.

For example, the system may recenter the displayed content in the yaw direction when the user tilts his/her head in a pre-determined manner. For example, tilting the head (and headset) down below an about −10 degree (+/−about 5 degrees) pitch angle would trigger a recenter of the displayed content. Further for example, tilting the head (and headset) to the left or right by about 3 degrees (+/−about 5 degrees), as if the user were touching his ear to his shoulder, would trigger a recenter of the displayed content. Further for example, tilting the head up by about 10 degrees (+/−about 5 degrees) and to the left or right by about 3 degrees (+/−about 5 degrees) in a combined gesture would trigger a recenter of the displayed content. This head tilt is not limited to pitch, and it is not limited to an angle only. Any head gesture that can be resolved by the inertial measurement system in the headset can be used to trigger this recenter activity.

Further for example, the system may recenter the display in the yaw direction when a tracking marker has been identified by the tracking system and is in the FOV of the tracking system. In some embodiments, the yaw position could be aligned with the marker or offset from it.

Referring to FIG. 82, further provided herein are methods of determining a marker in inertial space using a head-worn display and navigation system. For example, some procedures (e.g., reporting an acetabular cup placement adjusted to accommodate orientation in inertial space) require a measurement of the marker's relationship to inertial space (i.e., relate marker coordinate frame to inertial frame). The determination of the orientation of the reference marker attached to the hip of a patient with respect to gravity is measured with an inertial measurement unit (IMU) that is not located on the patient or marker but is instead located on any of the head-worn display and navigation systems described elsewhere herein. To accomplish this, the following method may be performed by the system: receiving, from an IMU, inertial data (e.g., acceleration data, rate data, etc.) from the head-worn display and navigation system at block S8200; determining a location of a gravity vector in a head-worn display IMU frame of reference using an attitude estimator at block S8210; acquiring, using one or more tracking cameras, an orientation in three-dimensional space of a reference marker with respect to a camera frame of reference at block S8220; generating a static transformation matrix from the camera frame of reference to the IMU frame of reference, which may optionally include intermediate frame transforms at block S8230; and transforming a unit vector in a Z direction of the inertial space, measured by the IMU and formed by the attitude estimate, from the IMU reference frame to the marker reference frame at block S8240.

As used herein, an "attitude estimator" combines accelerometer and rate sensor data using a Kalman filter, a complementary filter, or other techniques to produce a 3D orientation for the headset that can be in any output form (e.g., Euler angles, quaternions, or similar).

In some embodiments, the step of generating a static transformation matrix is based on a mechanical construction of the head-worn display, IMU, and camera calibration procedures.

In some embodiments, the step of transforming a unit vector includes:

$(R_{Camera}^{Marker} * R_{IMU}^{Camera})$. The resultant vector represents the gravity vector expressed in the marker reference frame. For example, this vector allows real time determination of the acetabular cup orientation in the inertial frame but could also be used to determine real time orientation of any body portion, tool, bone, or otherwise in the inertial frame.

Figure 50A:
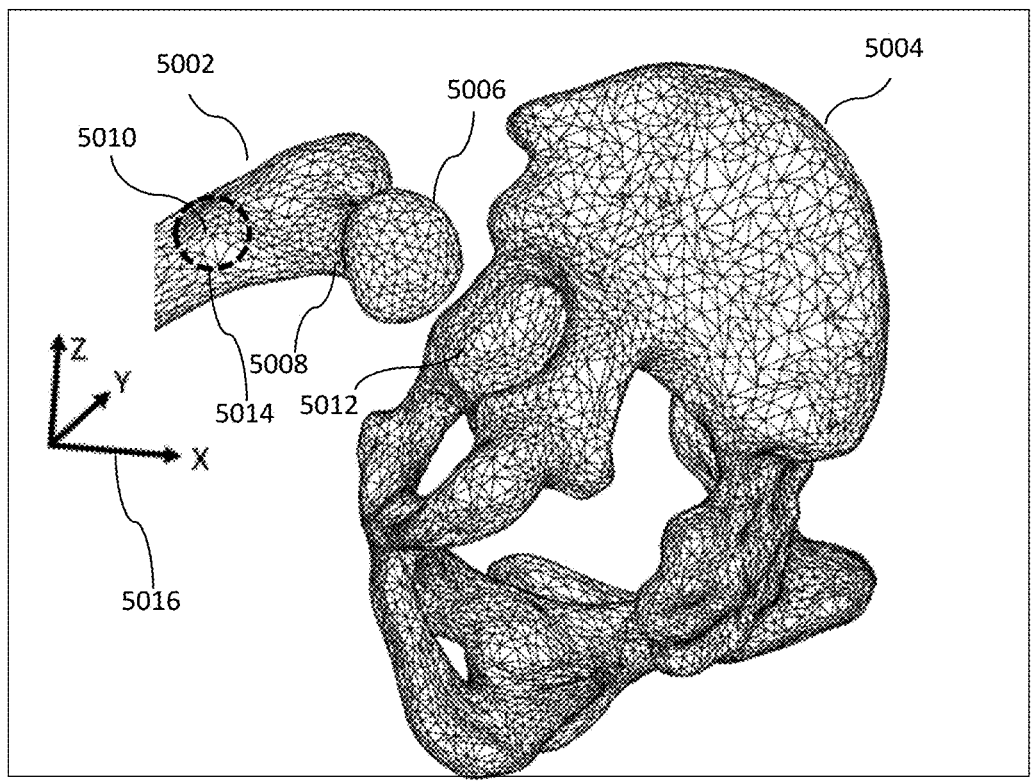
FIG. 50A is a diagrammatic depiction of exposed surfaces on the acetabulum and proximal femur in a reference position.
Figure 50B:
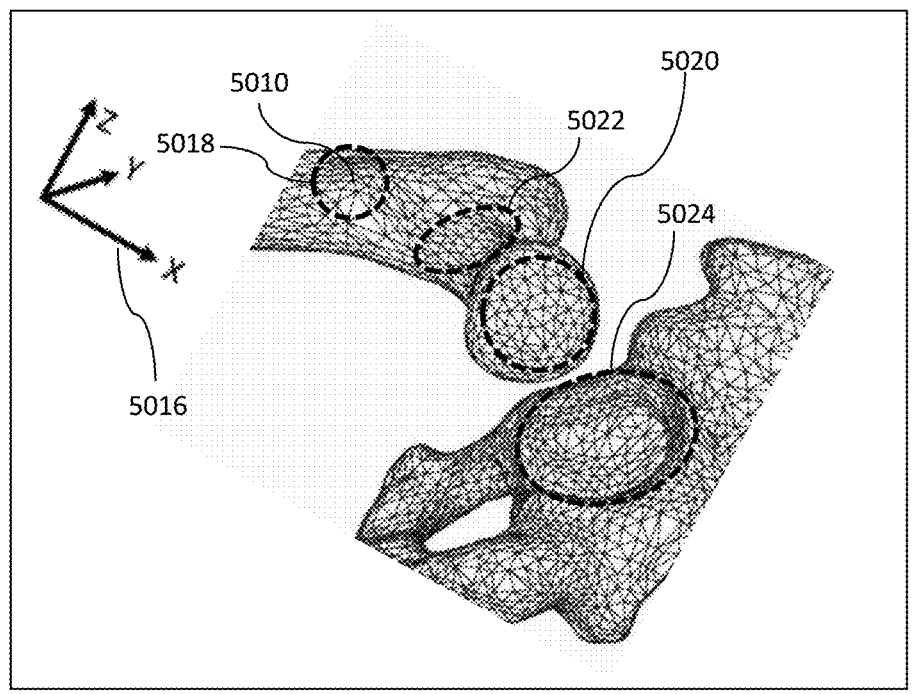
FIG. 50B is a diagrammatic depiction of exposed surfaces on the acetabulum and proximal femur in a displaced position.
Figure 51:
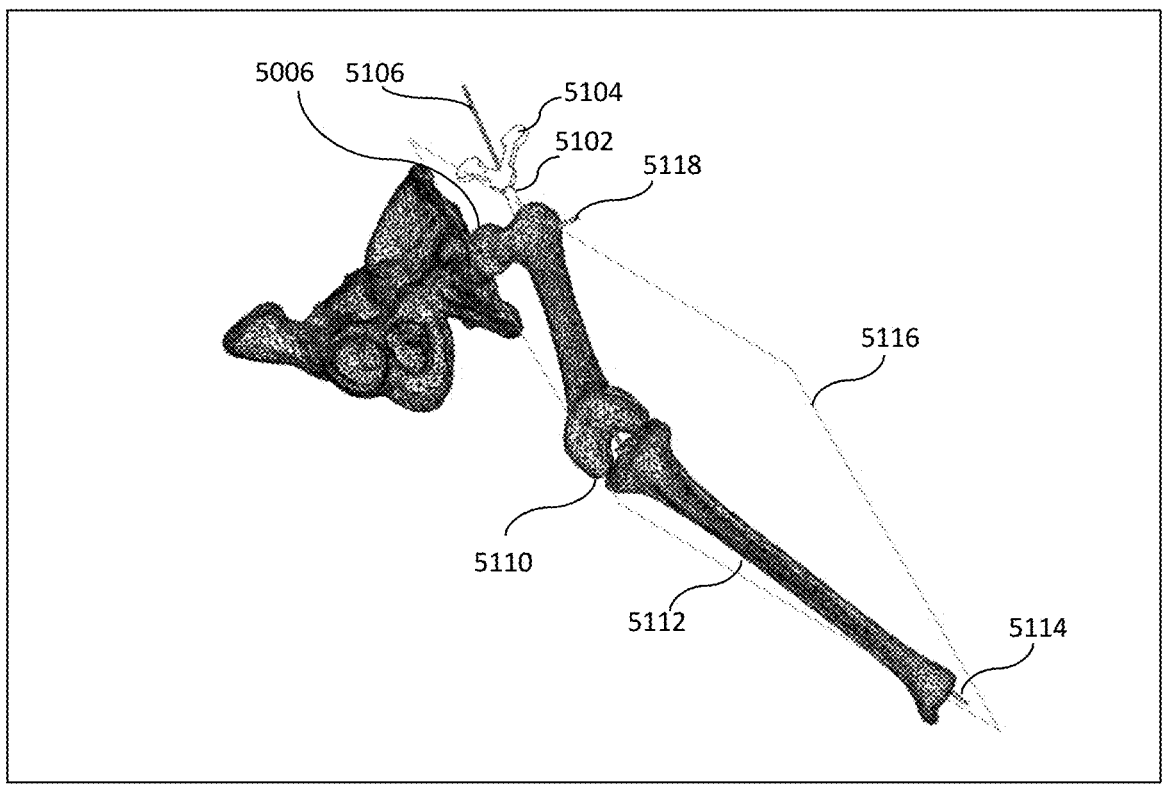
FIG. 51 is a diagrammatic depiction of a hip and leg, showing reference axes and planes for calculating femoral version.
Figure 52:
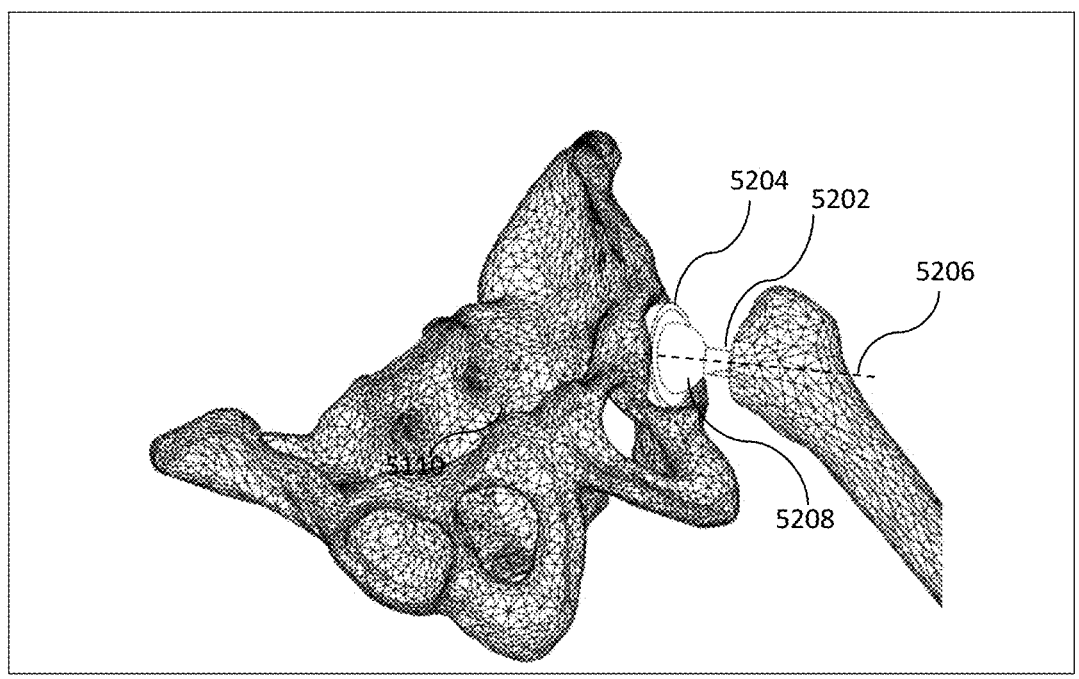
FIG. 52 is a diagrammatic depiction of a hip with implanted components.

Referring to FIGS. 50-52, the system 10 may optionally include a means for tracking anatomic structures without external fiducials fixed to the anatomy. FIGS. 50A-B depict an exemplary embodiment, in which the femur 5002 is dislocated, allowing the system 10, using sensor suite 210, to create a reference 3-dimensional surface map 5014 of the exposed surface of the lesser trochanter 5010. The surface of the lesser trochanter remains unchanged throughout the procedure and may be used by the system 10 to track the femur without additional fiducials. The boundary of the reference 3-dimensional surface map 5014 may optionally be indicated by the user by tracing a curve using a cursor or pointing device, which may operate by tracking the user's gaze. The system 10 may store the reference 3-dimensional map 5014 as a point cloud, as mathematical surfaces, or by other means. The system 10 may create a reference frame 5016 relative to the sensor suite 210 and record the initial pose of the surface map 5014 in reference frame 5016. The user 106 may register additional reference points or structures on the same bone or rigid body, such as the femoral head 5006, femoral neck 5008, and acetabulum 5012. The system may create additional 3-dimensional surface maps 5020, 5022, 5024 for the femoral head, femoral neck, and acetabulum, respectively, whose pose the system 10 records relative to the reference frame 5016. The system 10, using sensor suite 210, continuously re-scans the lesser trochanter 5010 and generates a displaced 3-dimensional surface map 5018 of the anatomy. Then comparing the displaced 3-dimensional surface map 5018 to the reference 3-dimensional surface map 5014 created for the same surface, the system 10 determines the geometric rotation and translation required to align the displaced surface map 5018 and reference surface map 5014 for best fit. The system 10 then applies the same rotation and translation to all stored reference points and structures on the rigid body of the femur 5002, calculating the current pose of all such points and structures relative to the reference frame of sensor suite 210. The system 10 may calculate diameter of the femoral head 5006 or acetabulum 5012 and display it to the user 106 as a guide for selecting an acetabular reamer size. The system 10 may calculate the center of the femoral head 5006 relative to the reference surface map 5014. The system 10 may also calculate the position of the center of the acetabulum 5012 relative to the pelvis 5004. The user 106 then inserts a broach or reamer 5102 with attached fiducial 5104 into canal of the femur, identifying a femoral axis 5106. The system 10 calculates a femoral neck axis 5118 between the femoral head 5006 and femoral axis 5106. With the knee 5110 flexed to approximately 90°, the cameras 206 scan the lower leg 5112, identifying its approximate central axis 5114, which is used with the femoral axis 5106 to define a reference plane 5116 from which the version angle of the native femoral neck axis 5118 is calculated. In the course of the procedure, the native femoral head 5006 and acetabulum 5012 are replaced with a femoral implant 5202 and acetabular implant 5204, respectively. The system 10 may detect the centers of the implanted acetabular shell 5204 and femoral head 5208, allowing the system 10 to calculate and display the change in distance from the femoral axis 5106 to the femoral head 5208 (femoral offset), or the change of position of the center of the acetabulum 5208, between the respective native and implanted conditions of each structure. Following replacement of the femoral head 5006, but prior to replacement of the acetabulum 5012, the system 10 may calculate and display the femoral version based on a new calculation of the femoral neck axis 5206 using the replaced femoral head 5208. The system 10 may calculate and display the additional anteversion required in the acetabular implant 5204 to achieve a target for combined anteversion of the femoral implant 5202 and acetabular implant 5204. The system 10 may calculate and display a change in distance between the femur 5002 and pelvis 5004 arising as a result of the procedure.

Figure 53:
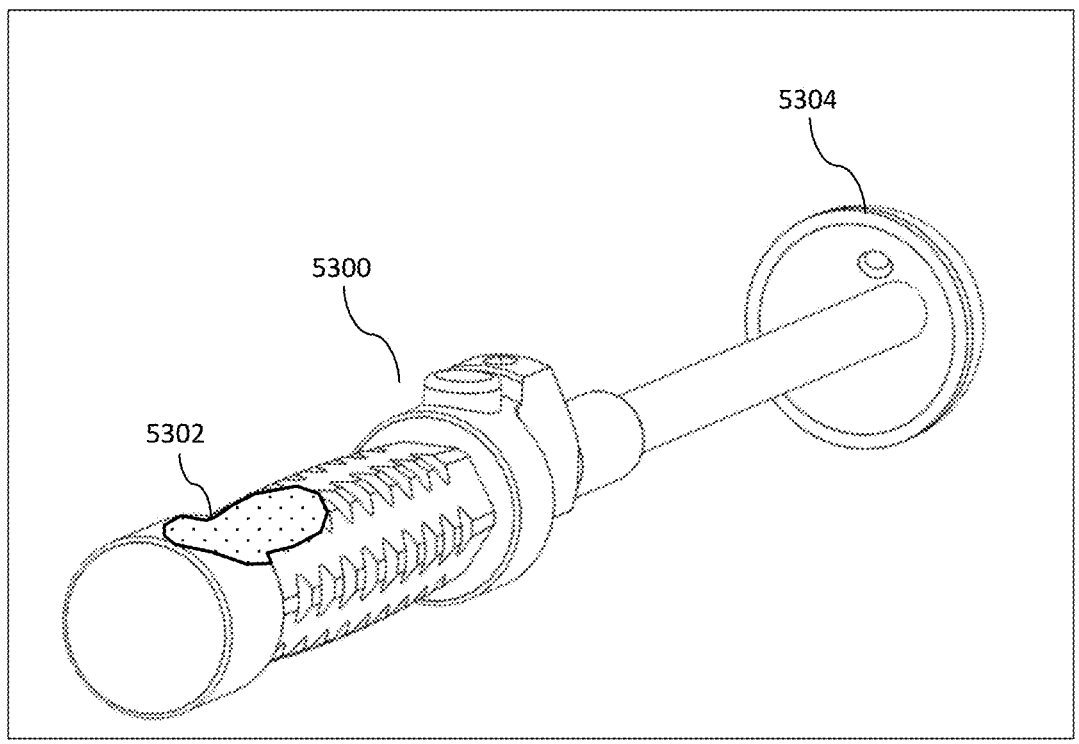
FIG. 53 is a diagrammatic depiction of a hip impactor and shell showing surfaces mapped on the impactor.

FIG. 53 depicts an exemplary embodiment of a hip impactor 5300 tracked via a 3-dimensional map of a portion of its exposed surface 5302, rather than by means of a supplementary fiducial. The system 10 may register an acetabular shell 5304 to this surface by simultaneously scanning the shell 5304 and impactor surfaces using the cameras 206.

Figure 59:
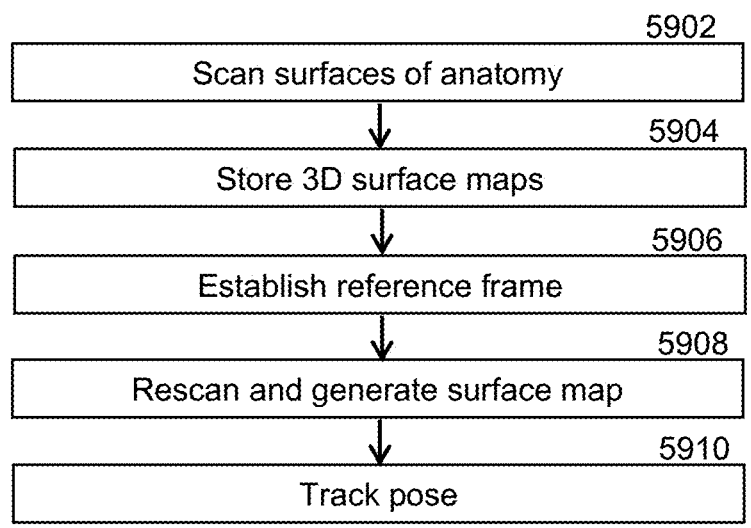
FIG. 59 is a flowchart showing an exemplary method of navigating a hip replacement procedure.

FIG. 59 depicts a flowchart showing how the system 10 and its sensor suite 210 can be used for navigation in a hip arthroplasty procedure. The sensor suite 210 can scan the lesser trochanter 5010 (5902). From this scan, reference 3-dimensional surface map 5014 can be stored (5904). The system 10 can then establish a reference frame 5016 for the femur 5002 relative to the sensor suite 210 (5906). Then, repeatedly scanning the exposed lesser trochanter 5010, the system 10 generates a displaced 3-dimensional surface map 5018 for each scan (5908). With each successive scan, the system can compare the displaced surface map 5018 to the reference surface map 5014 for the same region on the lesser trochanter 5010. Based on this comparison, the system 10 can track the pose of the femur 5002 relative to sensor suite 210 by determining the translation and rotation required to best fit the displaced surface map 5018 with the reference surface map 5014 (5910).

Figure 54:
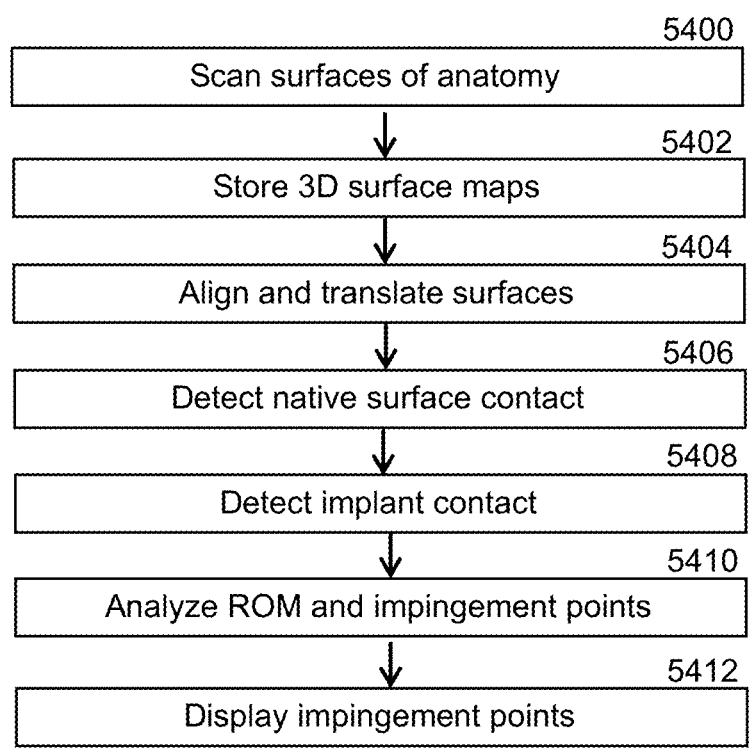
FIG. 54 is a flowchart showing how the system of FIG. 1 can be used to analyze hip kinematics in accordance with the principles of the present invention.

FIG. 54 depicts a flowchart showing how the system 10 and its sensor suite 210 can be used to analyze hip kinematics. The sensor suite 210 can scan exposed surfaces of the patient's anatomy, including the native femoral head 5006 and acetabulum 5012 (5400). From these surfaces, 3-dimensional maps 5020,5024 of each structure can be stored (5402).

The system 10 can then rotate the surfaces into the orientations expected in a standing patient and translate them together in the direction of body weight (5404). The system 10 can then calculate the contact point or patch between the two surfaces, which may be a more appropriate center of rotation than the centers of the approximately spherical surfaces (5406). Following replacement of the native anatomy with femoral implant 5202 and acetabular implant 5204, the system 10 can similarly identify the contact points for the implants (5408). Using the implant geometry, the system 10 can perturb the hip angle to calculate the angular range of motion allowed in each direction prior to impingement between implants, or between implants and bone (5410). The location of first impingement, which limits range of motion, can be highlighted in the display device 104 (5412). For example, the femoral neck 5008 may impinge on the exposed rim of the acetabulum 5012, or on the acetabular implant 5204. If at least one of the impinging surfaces is on native bone, the user 106 may elect to trim the bone to increase the range of motion. If at least one of the impinging surfaces is on an implant, the user 106 may elect to adjust the position or angle of the implant.

Figure 83:
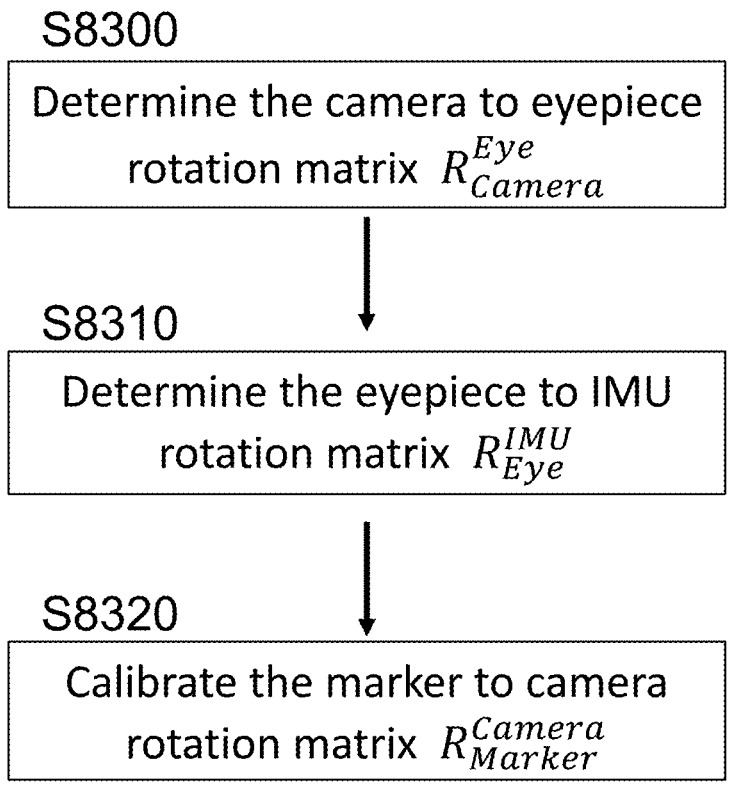
FIG. 83 shows one embodiment of a method of calibrating an IMU to a head-worn display vision system.

Referring to FIG. 83, in some embodiments, to provide the needed accuracy when a combination of inertial data and optical tracking is required, for example during surgical use, an end-to-end calibration of inertial to marker via the inertial and vision system needs to occur. For example, hip center determination on a knee procedure is one situation where inertial measurements and optical tracking can be used to provide data to the surgeon. Further for example, hip tilt angle determination in inertial space during hip acetabular cup placement is another example where inertia measurements and optical tracking can be used to provide data to the surgeon. A method, as shown in FIG. 83, of combining inertial data and optical tracking includes: determining the camera to eyepiece rotation matrix from mechanical design (shown as $R_{Camera}^{Eye}$) at block S8300; determining the eyepiece to IMU rotation matrix from the mechanical design (shown as $R_{Eye}^{IMU}$) at block S8310; and calibrating the marker to camera rotation matrix (shown as $R_{Maarker}^{Camera}$) at block S8320.

As used herein, a "mechanical design" refers to drawings showing how the camera and/or eyepiece was built, such that the angles between the cameras and the eyepiece/headset housing can be determined.

In some embodiments, calibrating includes using a precision fixture. Further, in some embodiments, calibrating includes positioning a reference marker with known coordinate system on the fixture; positioning an eyepiece on the fixture, with the reference marker in the field of view (FOV); and acquiring the rotation matrix from the reference marker to the camera $R_{Marker}^{Camera}$, for example using the tracking. For example, tracking includes tracking markers and receiving position and orientation information for each marker using the head-worn display and navigation system. In some embodiments, tracking is used to acquire a marker to camera rotation matrix.

In some embodiments, the method of FIG. 83, further includes calibrating the IMU, using a precision fixture. For example, the method may include positioning the head-worn system in a fixture that allows precise positioning in all three orthogonal positions, both directions (total of 6 positions); positioning the fixture on a level surface, with the system therein, such that an eyepiece Z axis of the head-worn system is aligned with a local gravity vector within a tolerance (i.e., an "eyes forward" position); acquiring accelerometer data (A1) from all three axes of the IMU output; acquiring rate sensor data (G1) from all three axes of the IMU output; repeating for all remaining 5 positions (i.e., acquiring A2, A3, A4, A5, and A6 along with G2, G3, G4, G5 and G6, corresponding to "eyes down", "eyes backward", "eyes up", "right ear down", "left ear down"); and calculating a bias and a scale factor of the IMU using one or more of the following equations or alternately, or additionally, a least squares or other approach:

Accelerometer Bias X=(A2.$x$+A4.$x$)/2
Accelerometer Scale Factor X=(A2.$x$−A4.$x$)/2
Accelerometer Bias Y=(A5.y+A6.$y$)/2
Accelerometer Scale Factor Y=(A5.y−A6.$y$)/2
Accelerometer Bias Z=(A1.$z$+A3.$z$)/2
Accelerometer Scale Factor Z=(A1.$z$−A3.$z$)/2

The method may further include averaging the rate sensor data to achieve a rate sensor bias value for each of the rate sensors using the equation:

Rate Bias X=(G1.$x$+G2.$x$+G3.$x$+G4.$x$+G5.$x$+G6.$x$)/6
Rate Bias Y=(G1.$y$+G2.$y$+G3.$y$+G4.$y$+G5.$y$+G6.$y$)/6
Rate Bias Z=(G1.$z$+G2.$z$+G3.$z$+G4.$z$+G5.$z$+G6.$z$)/6

The method may further include forming an attitude estimate, using the calibrated IMU data, that provides the rotation from IMU to inertial (shown as $R_{IMU}^{Inertial}$).

Calibration of these items allows reduction of error when transforming data from inertial to reference marker frames or vice versa. Reference marker to Inertial transform (shown as $R_{Marker}^{Inertial}$) is the combined transform matrix found from multiplying: $R_{IMU}^{Inertial} * R_{Eye}^{IMU} * R_{Camera}^{Eye} * R_{Marker}^{Camera}$. The inertial to reference marker transform is the inverse of $R_{Marker}^{Inertial}$ or $R_{Inertial}^{Marker}$.

As used in FIG. 83, "tolerance" refers to a threshold level of degrees in pitch and/or roll from an absolute gravity vector. In some embodiments, the tolerance may be about 1 degree; about 0.5 degrees to about 3 degrees; about 1 degree to about 2 degrees; about 0.75 degrees to about 5 degrees; about 2 degrees to about 4 degrees; etc.

Figure 86A:
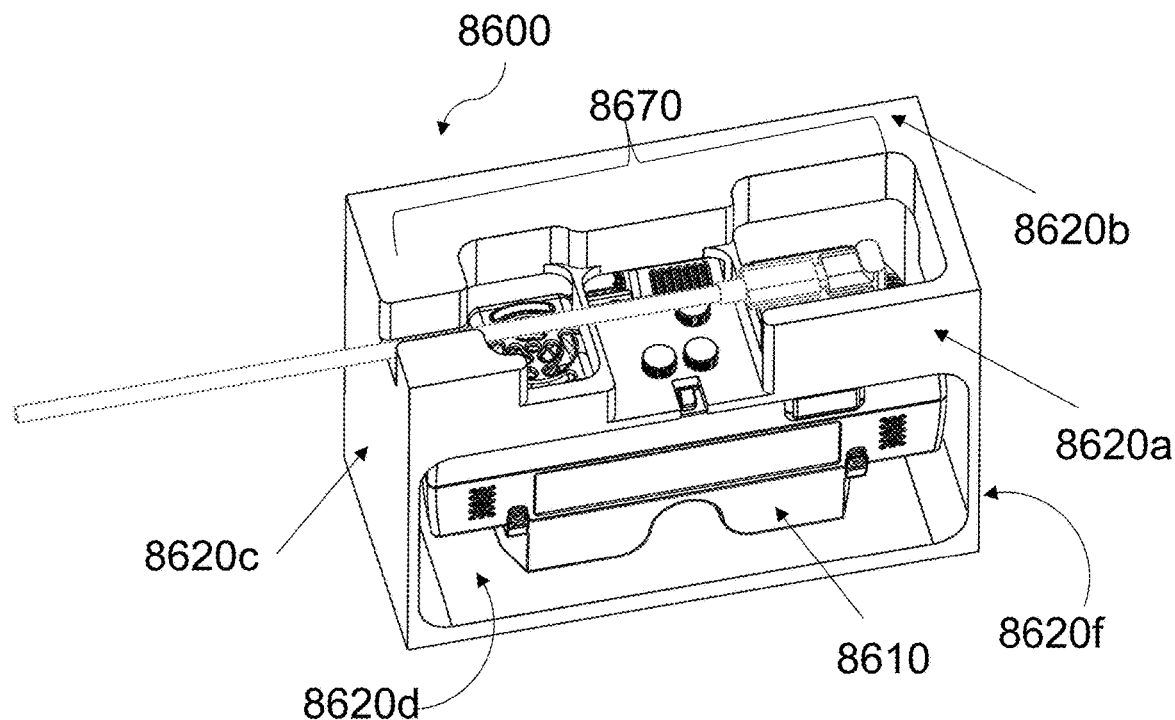
FIG. 86A shows a perspective view of one embodiment of a fixture for calibrating a head-worn navigation system.
Figure 86B:
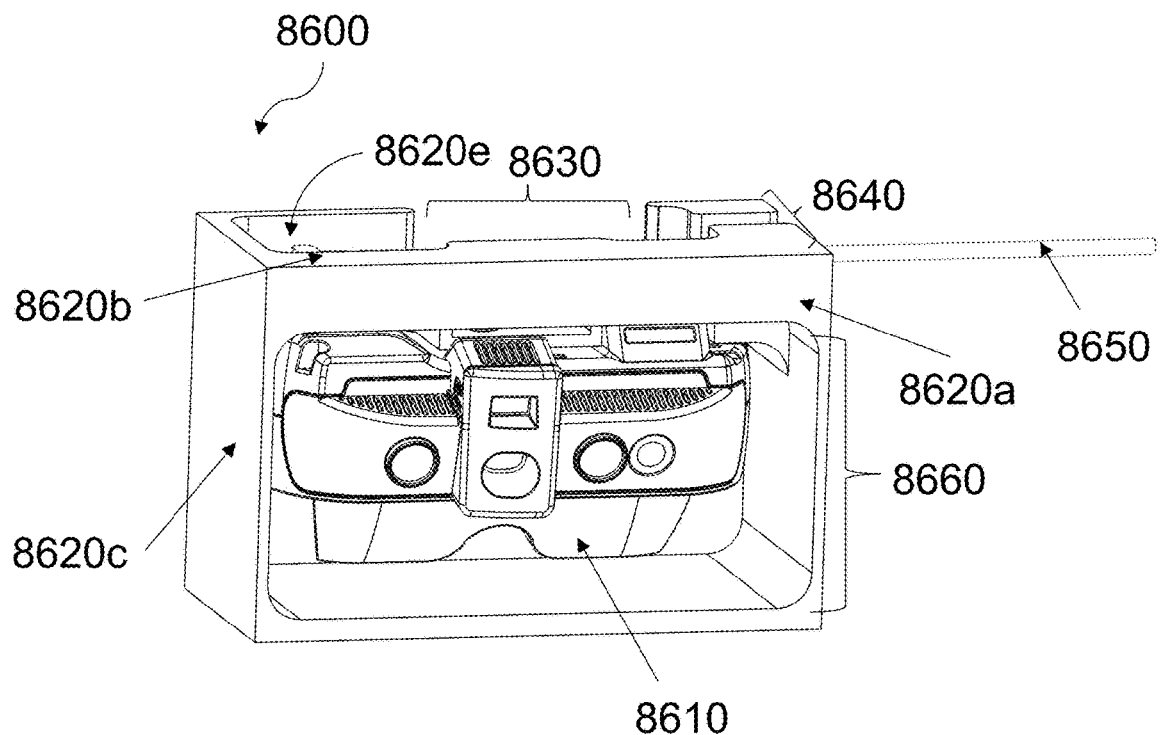
FIG. 86B shows a front view of the fixture of FIG. 86A.

Referring to FIGS. 86A-86B, an embodiment of a fixture 8600 for calibrating a head-worn display and navigation system 8610. The fixture 8600 functions to hold the head-worn display and navigation system 8610 so that the system can be calibrated. The fixture includes a plurality of sidewalls 8620 that are each orthogonal to adjacent sidewalls. In one embodiment, the fixture 8600 includes 6 sidewalls 8620a, 8620b, 8620c, 8620d, 8620e, 8620f; however, other sidewall numbers are also conceived herein: 1, 2, 3, 4, 5, 6, 7, 8, 9, 10. The fixture 8600 is fixedly connected to the system 8610 when the system is positioned therein, such that the fixture 8600 can be moved to rest on each of the sidewalls 8620 during a calibration method. One or more sidewalls 8620 of the fixture 8600, for example sidewall 8620e, 8620b, and/or 8620f, may define a cutout 8630 so that a cable 8650 may be connected to the system 8610 but not interfere with the fixture 8600 resting level on a surface when it's resting on any one of its sidewalls 8620. Any one or more of the sidewalls 8620 may additionally define an aperture 8660, 8670 through which the system 8610 is visible and/or accessible (e.g., for interacting with components, user input elements, etc.) when positioned in the fixture 8600.

V. Use of System in Conjunction with a C-Arm System

Figure 27:
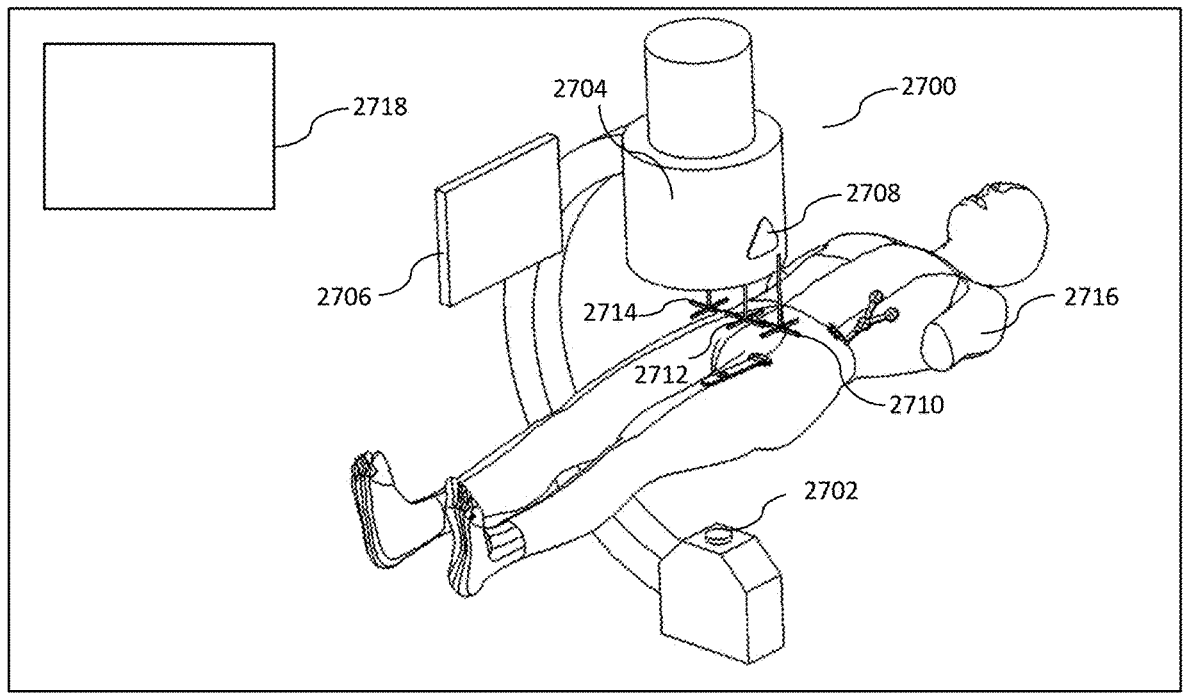
FIG. 27 is a diagrammatic depiction of a MXUI provided by system of FIG. 1 using a C-arm during a hip replacement procedure.

FIG. 27 depicts an exemplary embodiment of a MXUI shown to the user 106 via the display device 104 during imaging of a patient with a C-arm. A C-arm imaging system 2700 is shown having an X-ray source 2702, an imaging unit 2704 and a display unit 2706. A trackable label 2708 has been attached to the C-arm 2700. A virtual hip alignment guide 2710 and a virtual pelvis alignment guide 2712 are shown. These are perpendicular to the anterior pelvic plane and centered over the hip joint and pubic symphysis, respectively. Placement of the C-arm 2700 is guided by adjusting the surface of the imaging unit 2704 to be aligned with the appropriate virtual alignment guide. If the C-arm 2700 is trackable, then a virtual C-arm alignment guide 2714 may be displayed. In this case, placement of the C-arm 2700 is guided by adjusting the virtual C-arm alignment guide 2714 to be aligned with the appropriate virtual alignment guides 2710 or 2712. The positional and angular misalignment relative to the target can also be displayed numerically as virtual text 2718.

Figure 28:
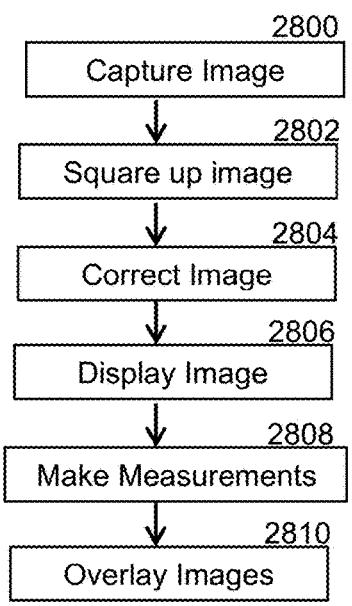
FIG. 28 is a flowchart showing how the system of FIG. 1 can be used in conjunction with a C-arm in a surgical procedure in accordance with the principles of the present invention.

FIG. 28 depicts a flowchart showing how the system 10 and its display device 104 (e.g., the AR headset 3600) can be used in conjunction with the C-arm 2700 in a surgical procedure. The camera 3904 (e.g., a high definition camera or the like) incorporated in the AR headset 3600 can be used to capture the image displayed on the C-arm monitor (2800). The image can be adjusted to "square it up" so that it matches what would be seen if the camera 3904 had been perfectly centered on and normal to the image on the monitor (2802). The knowledge of the position of the imager and source relative to the anatomy being imaged can be used to correct images for magnification and parallax distortion due to divergence of the X-ray beam from the source (2804). The corrected image can then be displayed in the AR headset 3600 (2806). This can then be used to allow the user 106 to make measurements relevant to the procedure such as acetabular cup placement or leg length (2808). Other images can be simultaneously displayed, overlaid, mirrored, or otherwise manipulated to allow the user 106 to make comparisons as shown, at least for example, in block 2810 of FIG. 28.

In another embodiment, image capture can also be achieved by wireless communication between the C-arm 2700 and the AR headset 3600, for example by transfer of file in DICOM format. Alternatively, algorithms incorporating machine vision could be employed to automatically make measurements such as the inclination and version of an acetabular shell. Edge detection can be used to trace the outline of the shell. The parameters of an ellipse, which optimally matches the outline, can be determined and used to calculate the anteversion of the shell from the ratio of the length of the minor and major axes of the optimum ellipse. The inclination can be calculated, for example, by placing a line tangential to the most inferior aspects of the pubic rami and calculating the angle between the major axis of the shell ellipse and the tangential line. Similarly, the comparative leg length and lateral offset of the femur can be determined and could be corrected for changes or differences in abduction of the femur by recognizing the center of rotation from the head of the femur or the center of the spherical section of the shell and performing a virtual rotation about this point to match the abduction angles. This type of calculation could be performed almost instantaneously and save time or the need to take additional radiographic images. Furthermore, and in another embodiment, an algorithm could correct for the effect of mispositioning of the pelvis on the apparent inclination and anteversion of the shell by performing a virtual rotation to match the widths and aspect ratios of the radiolucent regions representing the obturator foramens.

In yet another embodiment, C-arm imaging can be used to register the position of anatomy, such as the pelvis. For this, the anatomy marker 1300 would incorporate radio-opaque features of known geometry in a known pattern. The C-arm image is captured and scaled based on known marker features and displayed in the AR headset 3600. A virtual model of the anatomy generated from a prior CT scan is displayed to the user 106. The user 106 can manipulate the virtual model to position it in a way that its outline matches the C-arm image. This manipulation is preferably performed by tracking position and motion of the user's 106 hand using SLAM. Alternatively, the user 106 can manipulate a physical object, which incorporates a marker with the virtual model moving with the physical object. When the virtual model is correctly aligned with the C-arm image, the relationship between the patient's anatomy and the anatomy marker 1300 can be calculated. These steps and manipulations could also be performed computationally by the software by using edge detection and matching that to a projection of the profile of the model generated from the CT.

Due to the limited size of available C-arms, it may be difficult or impossible for the user to position the C-arm in such a way as to image the entire anatomy of interest. For example, the user may want to capture an image of a pelvis 14 inches wide, but only has access to a C-arm capable of imaging a 10-inch diameter field of view. This problem is compounded by distortion near the edges of C-arm images, effectively reducing the usable image size. Although algorithms exist to stitch together multiple images based on identifying and aligning shared features in each image, these techniques depend on overlap between images to create shared features for registration. For example, a user with a 10-inch C-arm would need to acquire at least four (and very likely more) overlapping images to create an image showing two anatomic features 36 inches apart in their correct anatomic alignment. In another embodiment of the present invention, the system can be used to digitally stitch multiple images from C-arm 2700 to create an image of a larger portion of the patient 2716 without overlap between images. For each image captured by C-arm 2700, AR headset 3600 measures the corresponding position of C-arm 2700 relative to patient 2716 using a tracker such as label 2708. The system then displays the collected images on display 2706 or AR headset 3600 with each image in its correct position and alignment relative to the common reference frame, allowing the user 106 to view and make measurements on a virtual image including a larger portion of patient 2716 than could fit in a single image, such as imaging a complete pelvis with a C-arm 2700 whose image size is less than the extent of a complete pelvis, or viewing a single image of a hip and a single image of an ankle in anatomic alignment. This feature is useful for evaluating alignment and/or length of limbs, spine, etc. while minimizing radiation from the imaging system.

VI. Spinal Procedures

Figure 31:
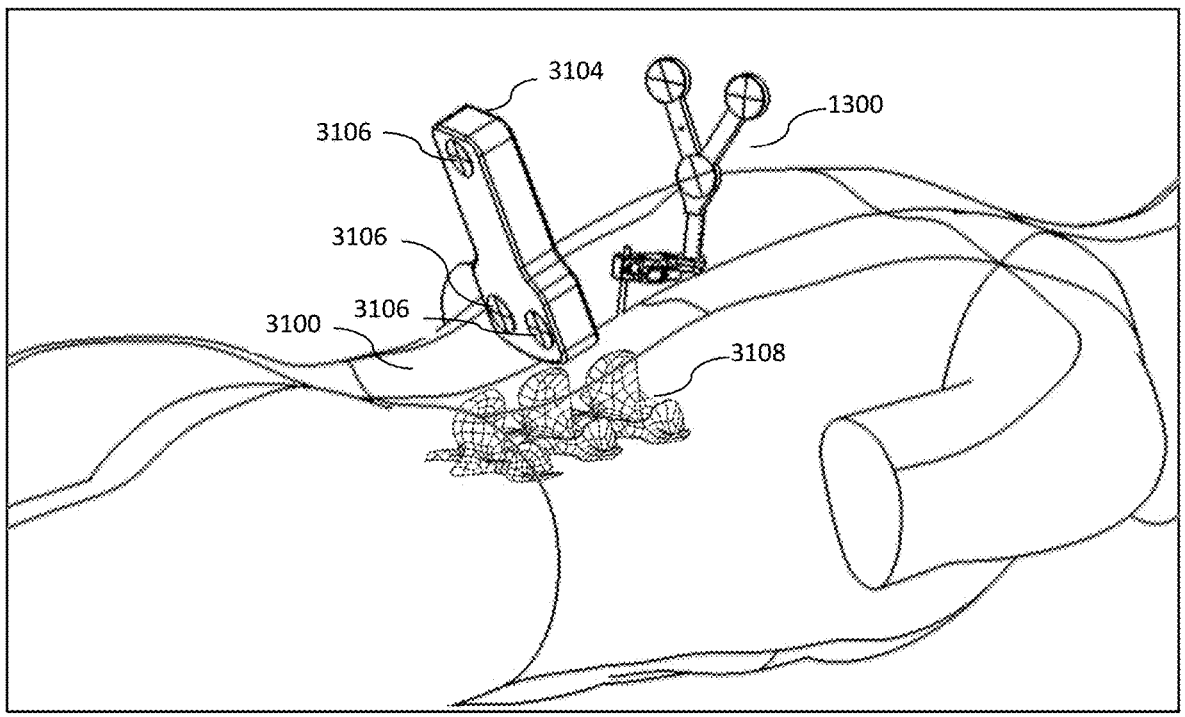
FIG. 31 is a diagrammatic depiction of a MXUI provided by system of FIG. 1 during registration of a spine with an ultrasound transducer in a spinal fusion procedure.

FIG. 31 depicts an exemplary embodiment of a MXUI shown to the user 106 via the display device 104 during registration of a spine with ultrasound. An anatomy marker 1300 is fixated to a vertebra adjacent to the operative site. An ultrasound transducer 3104 which includes a plurality of fiducials 3106 defining a marker is provided. In one embodiment, the ultrasound transducer 3104 is battery operated, cordless, and can communicate with the AR headset 3600 via radio. The software has geometric and other information necessary to be able to position and scale the 2D ultrasound image relative to the marker's 1300 position. The ultrasound transducer 3104 is moved over the surface of the patient 3100 to scan the region of interest. The software combines the 2D image data with the six degree of freedom pose information of the ultrasound transducer 3104 relative to the anatomy marker 1300 to generate a virtual model 3108 representing the surface of the vertebrae of interest. The ultrasound transducer 3104 may be rotated relative to anatomy of interest to get a more complete 3D image. The posterior contour of the spinous process and the left and right mammillary processes can be matched to the same features of a CT generated 3D model of the vertebra to register and subsequently position the virtual model of the vertebra in a mixed reality view. Alternatively, any appropriate features which are visible on an ultrasound scan can be utilized or the position of the virtual model can be relative to the surface of the patient as determined by SLAM. The latter is appropriate for procedures in which the patient anatomy of interest is stationary for the duration of the procedure and attachment of a marker would be unnecessarily invasive or burdensome. Ultrasound can similarly be used in this way to generate models of anatomy of interest such as, but not limited to, bony structures, nerves and blood vessels. Registration of any anatomy can be achieved. For example, a pelvic reference frame can be established using ultrasound to locate the proximal apex of the left and right ASIS and the pubis. The same method can be used to track the position of tools or implants percutaneously.

Figure 32:
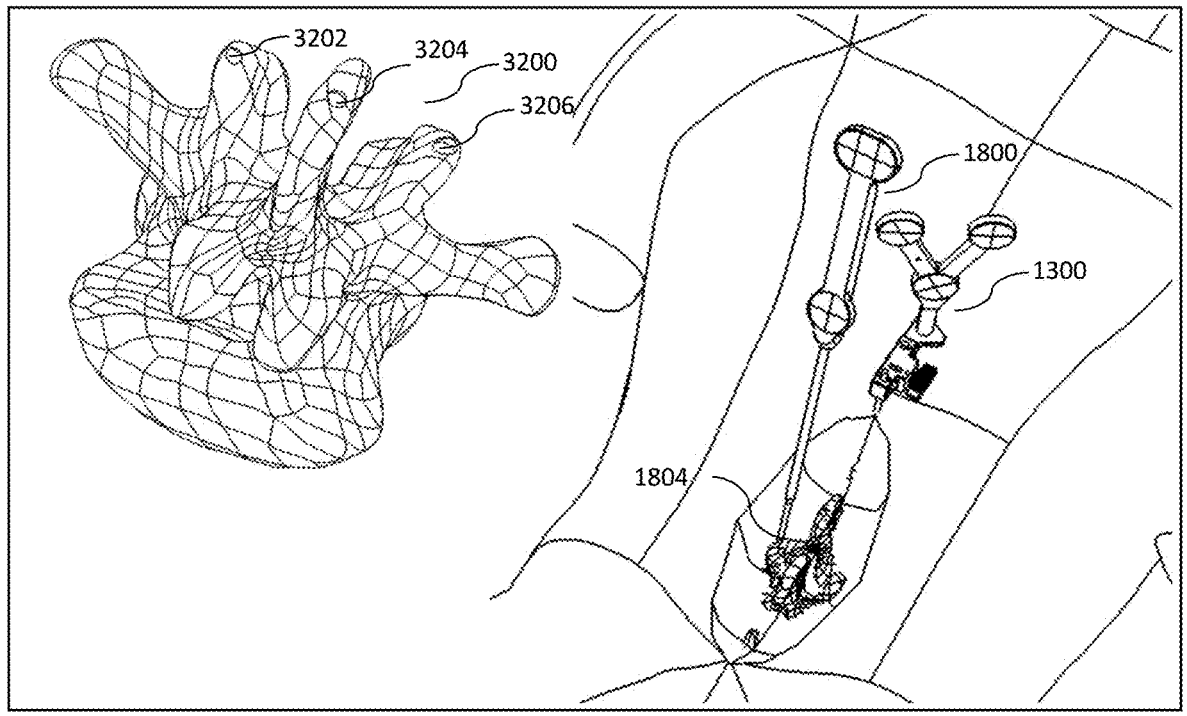
FIG. 32 is a diagrammatic depiction of a MXUI provided by system of FIG. 1 during registration of a spine with a stylus in an open spinal fusion procedure.
Figure 33:
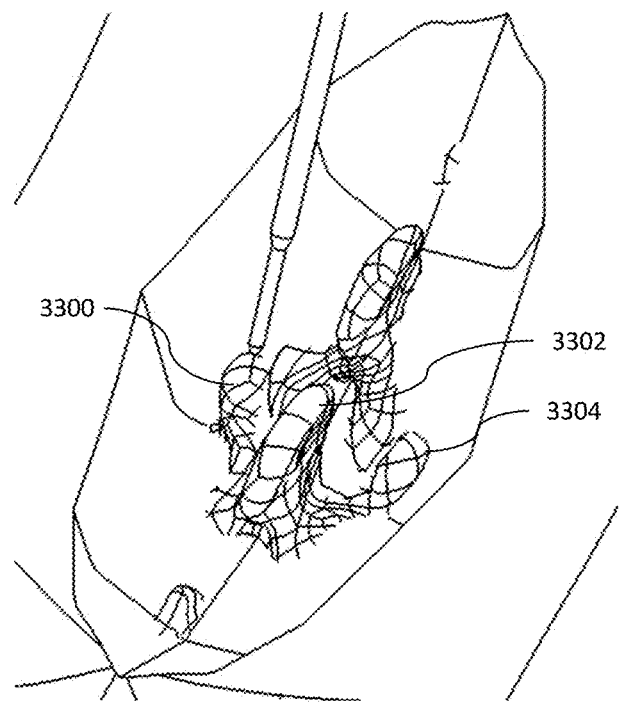
FIG. 33 is a close-up front view of the surgical exposure portion of FIG. 32.

FIG. 32 depicts an exemplary embodiment of a MXUI shown to the user 106 via the display device 104 during registration of a spine with a stylus 1800. The anatomy marker 1300 is fixated to a vertebra adjacent to the operative site. A virtual model 3200 of the patient's vertebra generated from pre-operative imaging is displayed. This virtual model includes a first landmark 3202, a second landmark 3204, and a third landmark 3206. FIG. 33 depicts a close-up view of the exposed anatomy shown in FIG. 32. The soft tissues of the patient have been dissected sufficiently to expose a first bony process 3300, a second bony process 3302, and a third bony process 3304, which contain the three landmarks. The user 106 registers the three landmarks by placing the stylus tip 1804 at the points on the actual vertebra that best match the location of the landmarks shown on the virtual model. The software then re-positions the virtual model 3200 in the user's view to best align these points. The user 106 visually verifies the quality of the registration by comparison of the virtual model to the actual exposed regions of the vertebra. If necessary, the user 106 may make adjustments by using the tip 1804 of the stylus 1800 to reposition the virtual model. In an alternative embodiment, the landmarks are arcs traced over the most posterior aspect of each process. In another embodiment, the contours of the exposed processes are established with SLAM, and the software performs a best fit on the position of the virtual model to match these contours.

Figure 34:
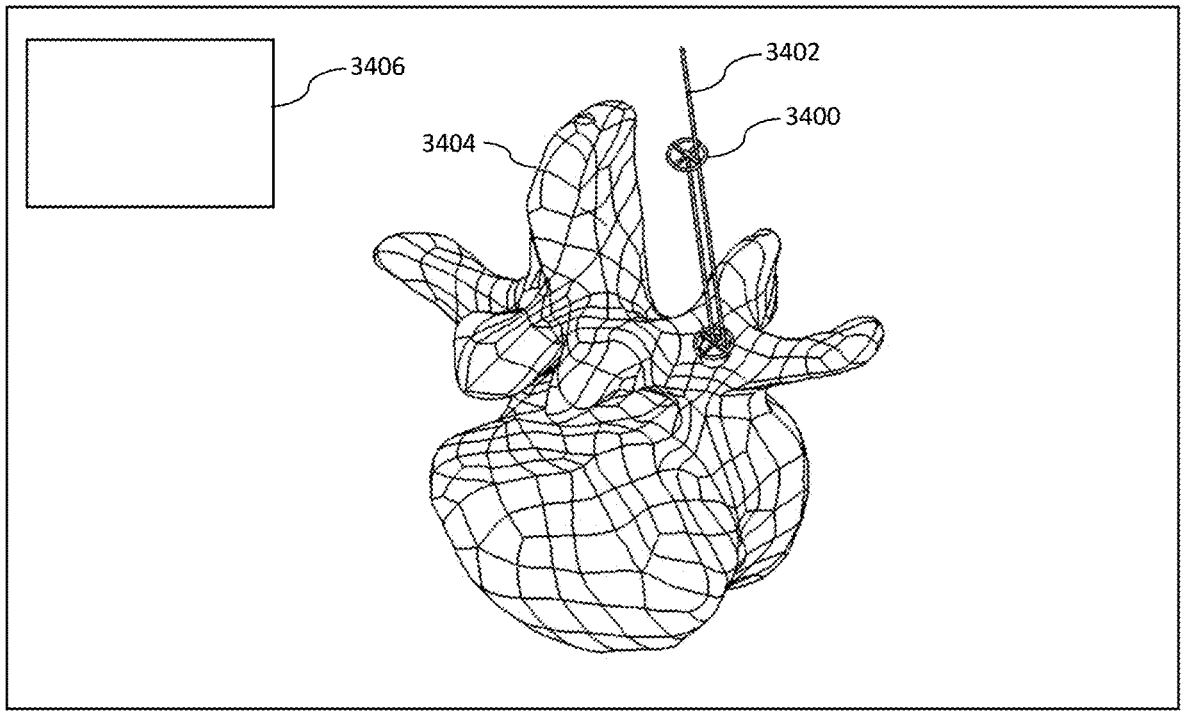
FIG. 34 is a diagrammatic depiction of a MXUI provided by system of FIG. 1 during drilling of a pedicle in a spinal fusion procedure.
Figure 35:
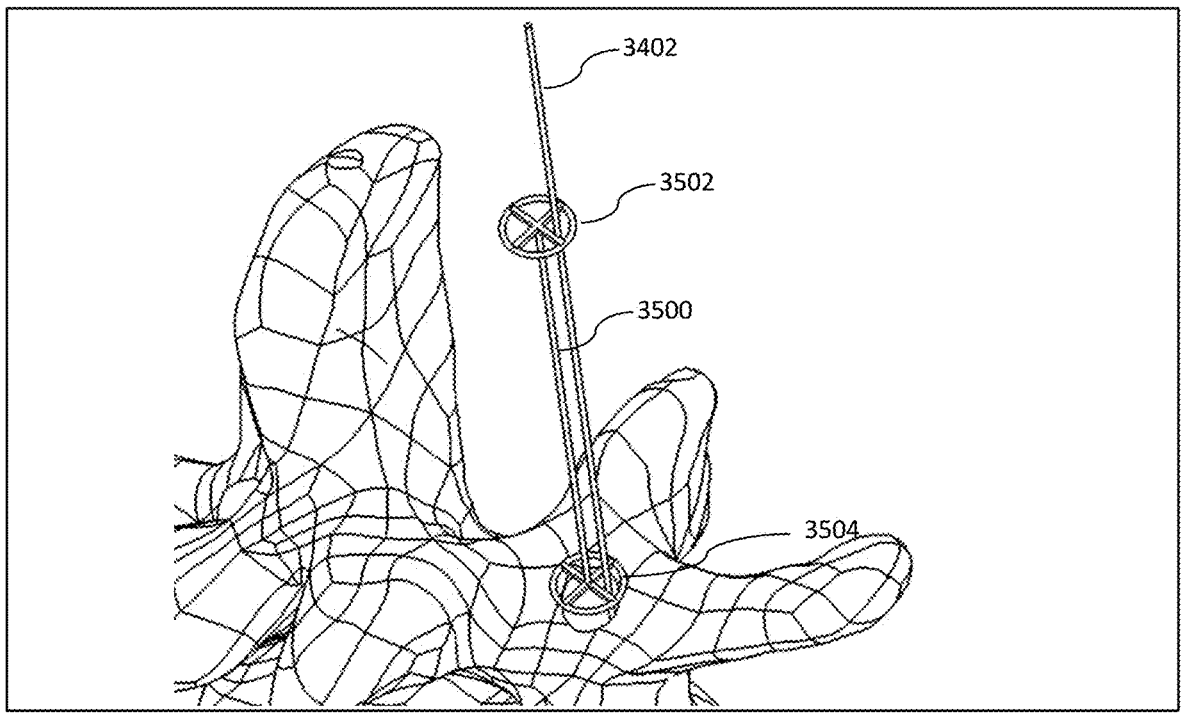
FIG. 35 is a close-up view of the virtual drill and target portion of FIG. 34.
Figures 36A, 36B:
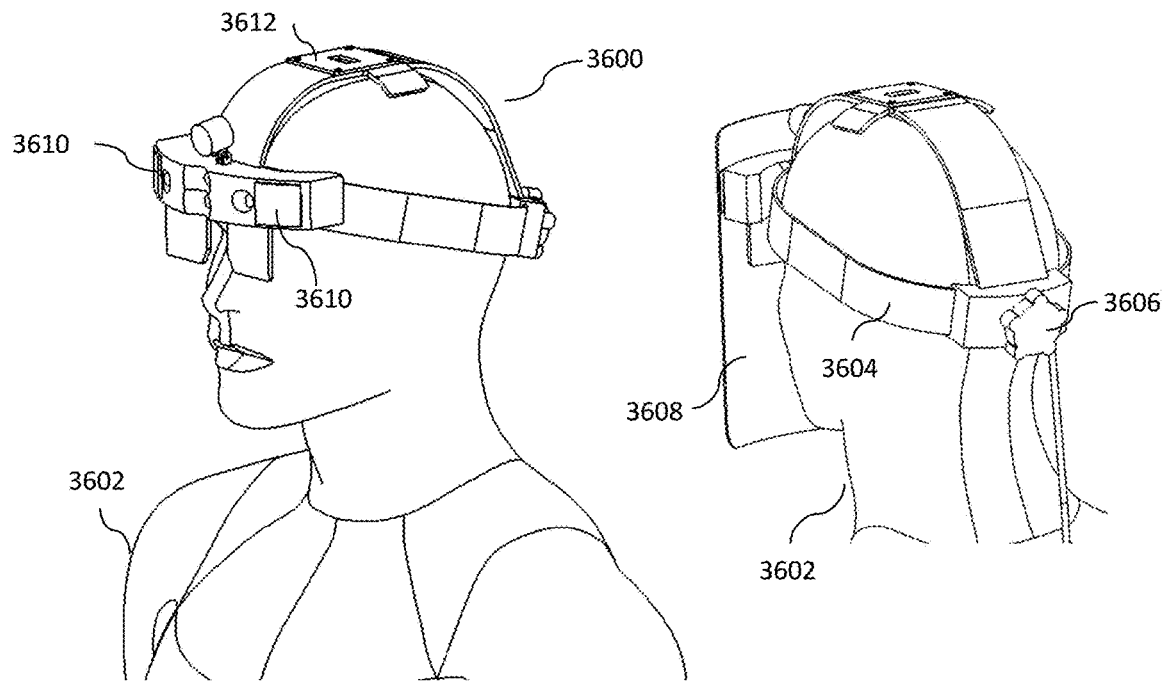
FIG. 36A shows a perspective front view of a diagrammatic depiction of a user wearing an AR headset of the system of FIG. 1.
FIG. 36B shows a perspective back view of a diagrammatic depiction of a user wearing an AR headset of the system of FIG. 1 having a protective face shield.
Figures 37A, 37B:
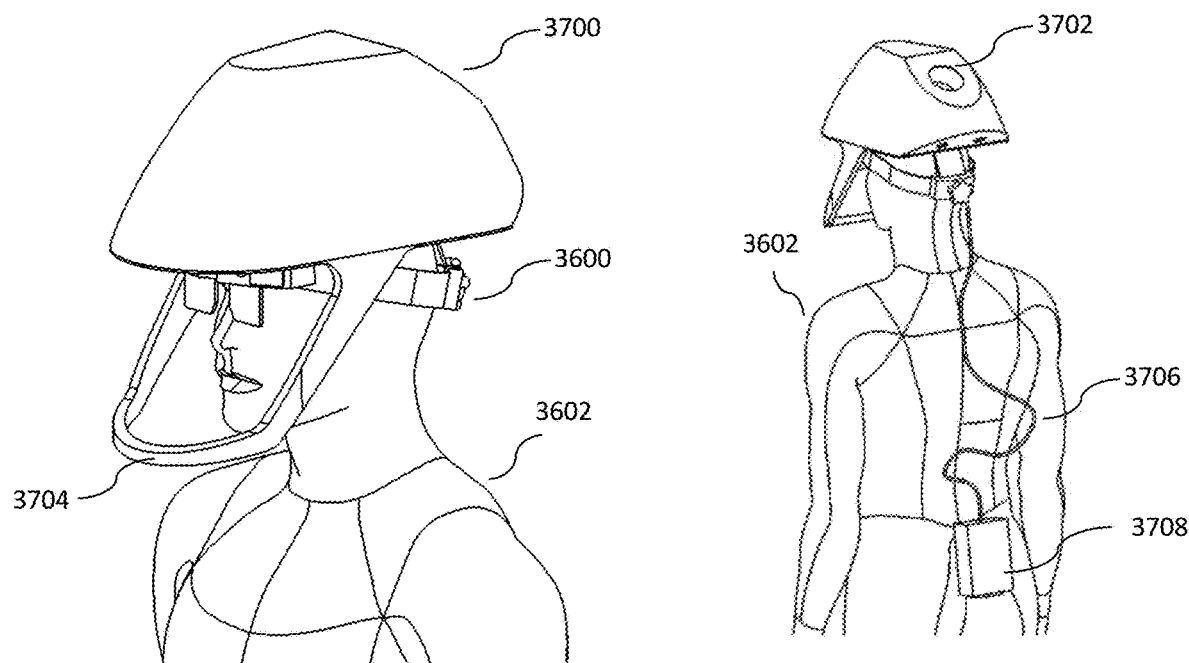
FIG. 37A is a perspective front view of diagrammatic depiction of a user wearing an AR headset of the system of FIG. 1 having a surgical helmet.
FIG. 37B is a perspective back view of the items shown in FIG. 37A.
Figures 38A, 38B:
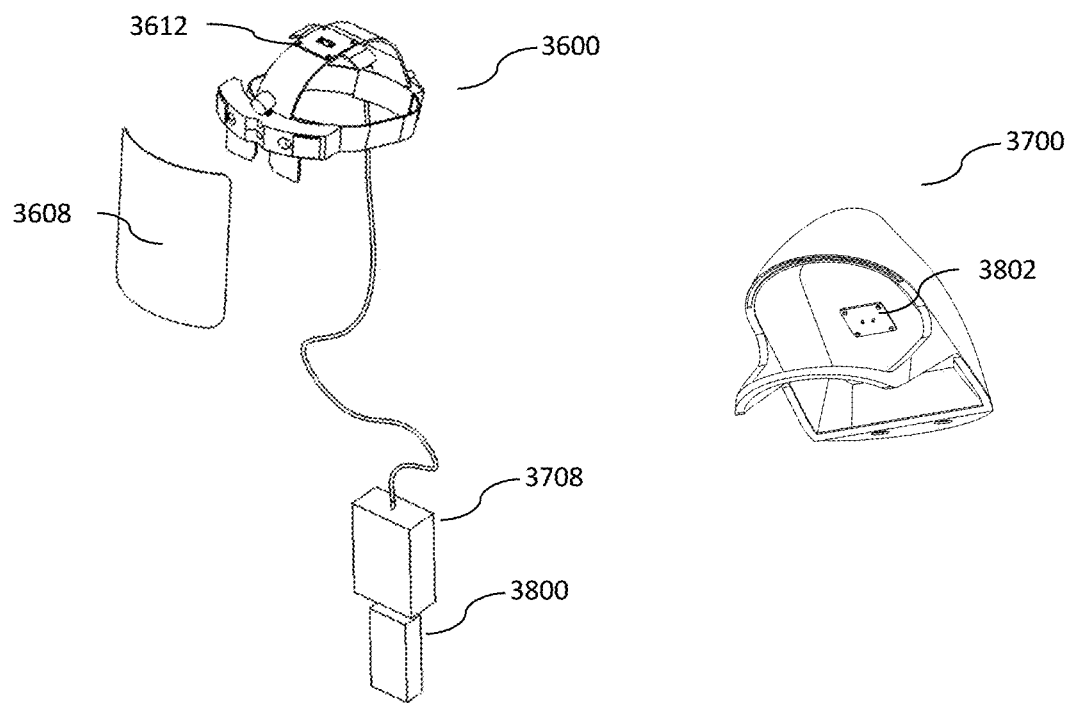
FIG. 38A is a perspective front view of diagrammatic depiction of various components of the system of FIG. 1.
FIG. 38B is a perspective back view of the surgical helmet shown in FIG. 37A.

FIG. 34 depicts an exemplary embodiment of a MXUI shown to the user 106 via the display device 104 during a spinal fusion procedure. A virtual target 3400 for the drill bit and a virtual drill bit 3402 are shown. A virtual vertebra 3404, rendered to be transparent relative to the virtual target 3400 and virtual drill bit 3402 are shown. The numerical angle of the drill bit and the depth of penetration or distance from the tip of the drill bit to the maximum safe depth of insertion are displayed numerically as virtual text 3406. FIG. 35 depicts a close-up view of the virtual target 3400 and virtual drill bit 3402 shown in FIG. 34. The virtual target 3400 is shown in the form of a rod 3500 which has a proximal crosshair 3502 and a distal crosshair 3504. To maintain the actual drill bit in a safe target trajectory, the user must maintain a position in which the virtual drill bit 3402 passes through the rings of both crosshairs of the virtual target 3400. The ideal trajectory is achieved when the virtual drill bit 3402 passes through the center of both crosshairs. If the actual drill bit moves outside a safe target trajectory, the color of the virtual target 3400 changes to alert the user and an audible warning is emitted. The distal crosshair 3504 is positioned at the planned starting point on the surface of the bone. The axial length of the virtual target 3400 and the virtual drill bit 3402 are scaled so that their proximal ends are coincident when the drill reaches its maximum planned depth. The scaling for motions of displacement of the virtual drill bit 3402 is 1:1 when it is far from the virtual target 3400 but expands to a higher magnification for greater precision when closer, allowing greater precision.

Although this is described in the context of drilling with a drill bit, this mixed reality view can be used for multiple steps including tapping of a pedicle or driving in a pedicle screw or use of a trackable awl to find the canal of the pedicle screw. As a quick means to re-calibrate the axial location of the tip of the drill, tap or screw as they are swapped out, the user places the tip into a dimple of a marker. Implants can be introduced less invasively by AR guidance, for example an interbody cage can be positioned during a PLIF, XLIF or TLIF procedure.

In another embodiment, a surgical drill could be equipped to communicate wirelessly with the headset to provide two-way communication. This could facilitate various safety and usability enhancing features including the following, for example: automatically stopping the drill or preventing operation if the drill is not within the safe target trajectory or reaches the maximum safe depth; and/or providing a convenient user interface to specify appropriate torque setting parameters for a torque limiting application. For example, a maximum insertion torque for a pedicle screw of a given size or a seating torque for the set screw of a pedicle screw. Actual values used could be recorded within the patient record for documentation or research purposes for example, the torque curve during drilling, the final seating torque of a pedicle screw or set screw, the implanted position of a pedicle screw, or the specific implants used.

In another embodiment, the AR headset 3600 could be connected wirelessly to a neuromonitoring/nerve localization system, to provide the user 106 (e.g., spine surgeon) real-time warnings and measurements within his field of view, particularly during minimally invasive procedures such as XLIF. Further, when used in conjunction with pre-operative imaging in which the patient's actual nerves have been imaged and reconstructed into 3D models, if the system detects that a particular nerve has been stimulated or is being approached by the stimulating probe, the hologram representing that nerve structure can be highlighted to the user 106 to make it easier to avoid contact with or injury to the nerve structure.

VII. Knee Replacement Procedures

Figure 42:
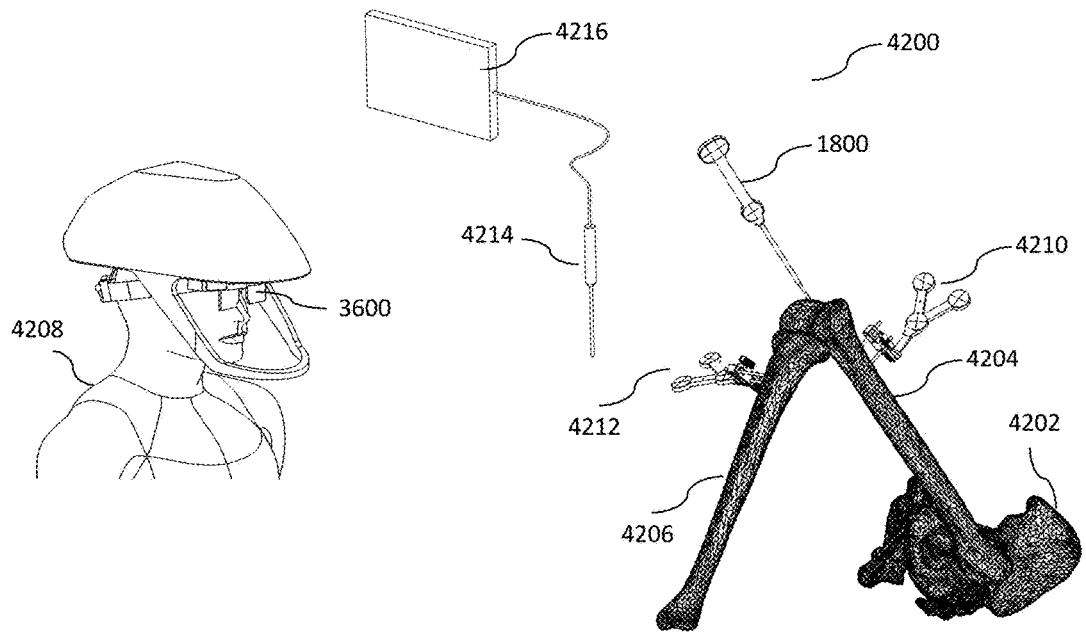
FIG. 42 is a perspective front view of components of the system shown in FIG. 37A used in a knee replacement procedure.

In another exemplary embodiment of the present invention and referring to FIG. 42, the system 10 is used for knee replacement surgery. A pelvis 4202, femur 4204, and tibia 4206 of a knee replacement patient are shown in FIG. 42, the surgeon 4208 (i.e., the user 106) is shown wearing the AR headset 3600. A femur marker 4210 and tibia marker 4212 are fixated to the femur and tibia, respectively, with pins. The femur is moved through a range of motion to determine the center of rotation as a proxy for the center of the hip in the reference frame of the femur marker 4210.

In some embodiments, any of the head-worn display devices described herein give the user the ability to move such that obstructions to the navigation system can be avoided. This allows a larger and/or different range of motion for the femur for a knee replacement procedure versus a static navigation system, for example using fixed cameras in a surgical suite. To determine the joint center (e.g., hip center), a center of rotation least squares fit (or similar) can be performed that requires one or more trackers fixed in inertial space and one or more trackers attached to the bone (e.g., femur). In one example, as shown in FIG. 81, a method for determining the joint center using a head-worn display and navigation device includes: optionally (shown with dashed lines) attaching one or more reference trackers to a bone and a stationary marker that is fixed with respect to the joint at block S8100; registering points on the bone in the reference coordinate frame at block S8110; creating a bone coordinate frame (e.g., femoral coordinate frame) based on the registered points at block S8120; transforming from the reference coordinate frame to the bone coordinate frame at block S8130; acquiring points of the stationary tracker in the reference frame using head fixed head-worn display and navigation system at block S8140; and determining a joint center in the bone coordinate frame at block S8150. Any of the head-worn display systems or navigation systems may be used herein for the method of FIG. 81.

In some embodiments, only new points are acquired if they are separated from previous points by some nominal distance or other measure to limit the number of points or limit the number of duplicate points. For example, the navigation system outputs a three-dimensional location for each point, such that the system is configured to determine a distance of a point from any other points.

In some embodiments of the method, the head-worn display and navigation system may be moved during acquisition to allow tracking of the reference tracker over a larger range of motion as the user can adjust the field-of-view of the system by moving his or her head.

In some embodiments, points may be transformed into the femoral coordinate system, used to compute the location of the hip center in the femoral coordinate system, processed substantially continuously through a real-time optimal estimation filter to determine hip center, and/or processed as a batch process after final acquisition of all points to determine hip center. For example, processing substantially continuously through a real time estimation filter could provide feedback to a user, for example a surgeon, that he is getting closer to a valid solution. In some embodiments, batch processing occurs after a number of points are collected and tried, and if the processing is insufficient, prompting the user to try again.

The knee is then flexed through a range of motion to determine the baseline, pre-operative flexion axis of the knee. The surgeon 4208 then makes an incision to expose the knee joint. A stylus 1800 is used for registration of the center of the distal femur, based on a landmark, such as the most distal point of the sulcus of the trochlea. The proximal center of the tibia is defined by registration of the footprint of the ACL with the tip of the stylus. For certain minimally invasive procedures, bony landmarks may be registered arthroscopically by insertion of the stylus through one port into the joint capsule and visualizing it with an arthroscope 4214 inserted through a second port. Further, the arthroscopic image 4216 from the arthroscope may be communicated wirelessly to the AR headset 3600 and displayed as part of a MRUI. In an alternative embodiment, a stylus tip could be incorporated in a trackable arthroscope, allowing landmark registrations to be performed through a single port. The stylus 1800 may then be used to register the medial and lateral malleoli and determine the center of the ankle in the reference frame of the tibia marker 4212 by interpolation of these points. At this point a femoral reference frame is established with its origin at the center of the distal femur, with a first axis extending toward the center of the hip, a second axis defined by the flexion axis of the knee and a third axis defined as the normal to the first and second axes. A tibial reference frame is defined with its origin at the center of the proximal tibia, with a first axis extending toward the center of the ankle, a second axis defined by the flexion axis of the knee and a third axis defined as the normal to the first and second axes. These reference frames may be presented as virtual images in a MRUI.

Figure 43:
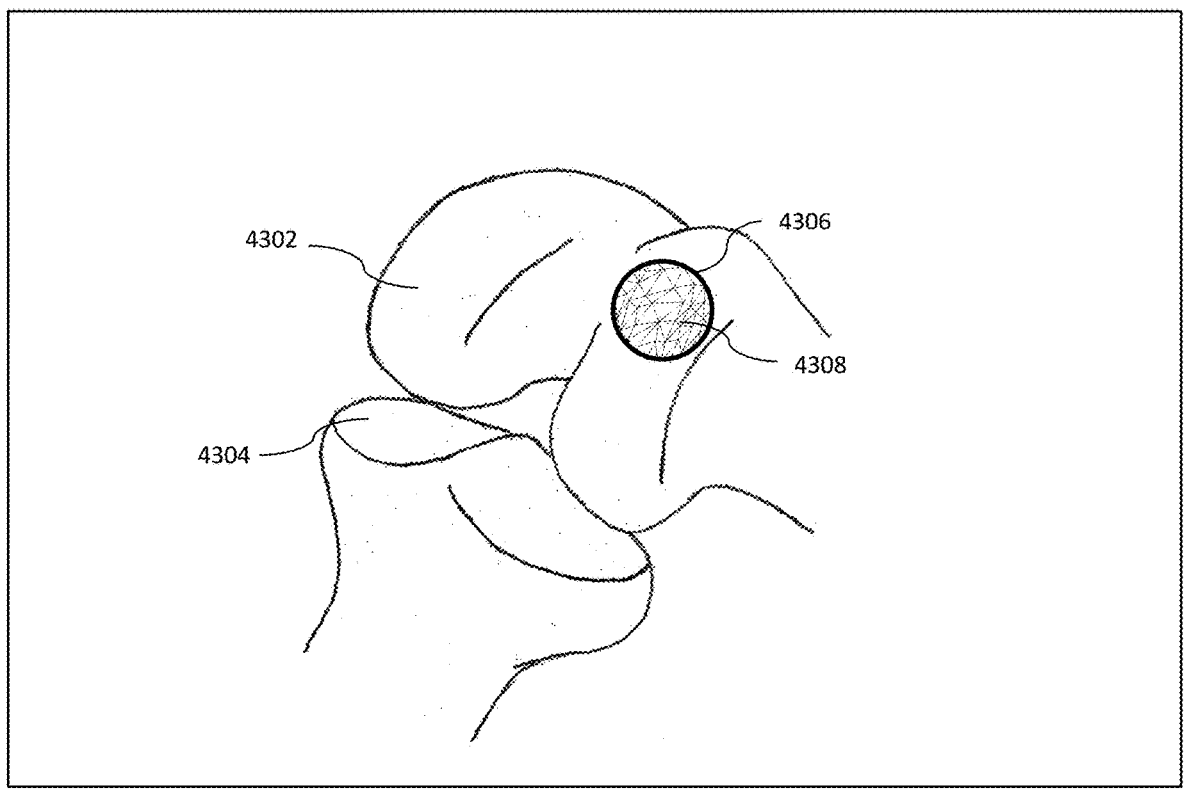
FIG. 43 is a diagrammatic depiction of a MXUI provided by system of FIG. 1 during registration of a distal femur in a knee replacement procedure.

FIG. 43 shows an exemplary embodiment of a MXUI shown to the surgeon 4208 via the AR headset 3600 during a knee replacement surgery with the knee exposed. A topographical map of the femoral condyles 4302 and tibial plateau 4304 can be generated by scanning with the depth sensor 3906 in the AR headset 3600 or by use of the stereoscopic cameras 3904 and SLAM. The knee would be flexed through a range of motion and the surgeon 4208 would adjust his vantage point to allow as much visualization of the condyles as possible. A circle 4306 at the center of the field of view is used by the surgeon 4208 to "paint" the condyles during the registration process and is used as a mask for the mapping algorithm. This circle may be coincident with the projection field of a structured light projector used to enhance the speed and precision of mapping. As surfaces are mapped, a virtual 3D mesh 4308 of mapped areas may be projected onto the articular surfaces to guide the surgeon 4208 and provide a visual confirmation of the quality of the surface registration. An algorithm is then used to determine the lowest point on the articular surfaces of the distal femur and the proximal tibia to determine the depth of the distal femoral and proximal tibial resections. The ideal implant sizes can be determined from the topographical map.

Figure 58A:
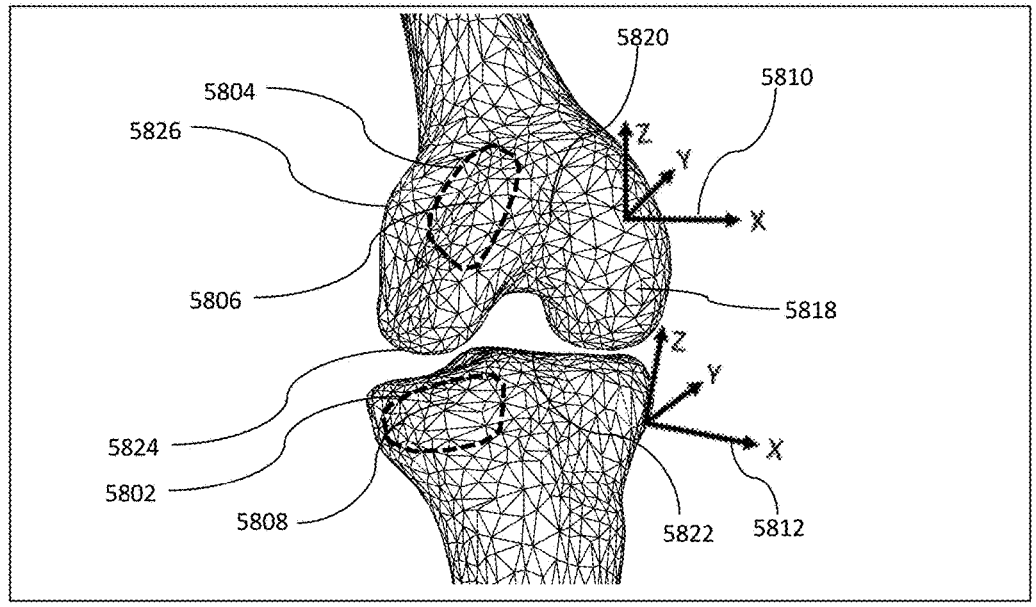
FIG. 58A is a diagrammatic depiction of a knee showing exemplary regions for surface mapping in a reference position.
Figure 58B:
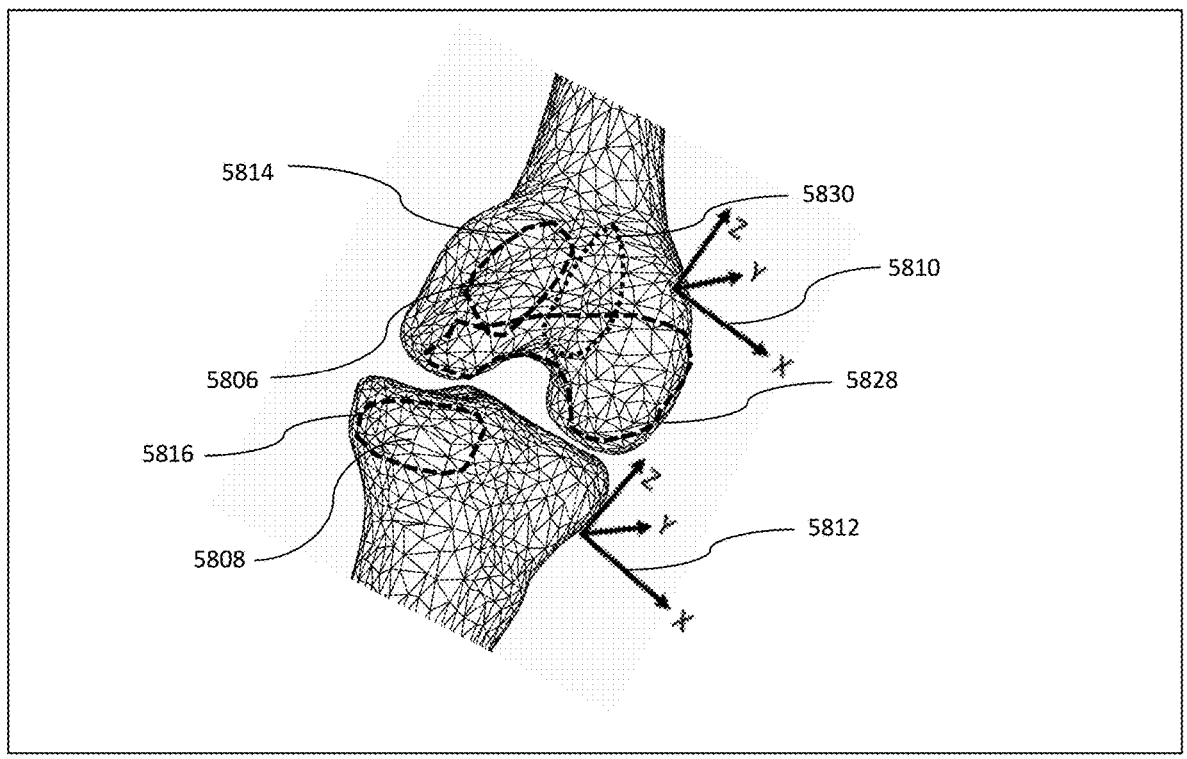
FIG. 58B is a diagrammatic depiction of a knee showing exemplary regions for surface mapping in a displaced position.
Figure 58C:
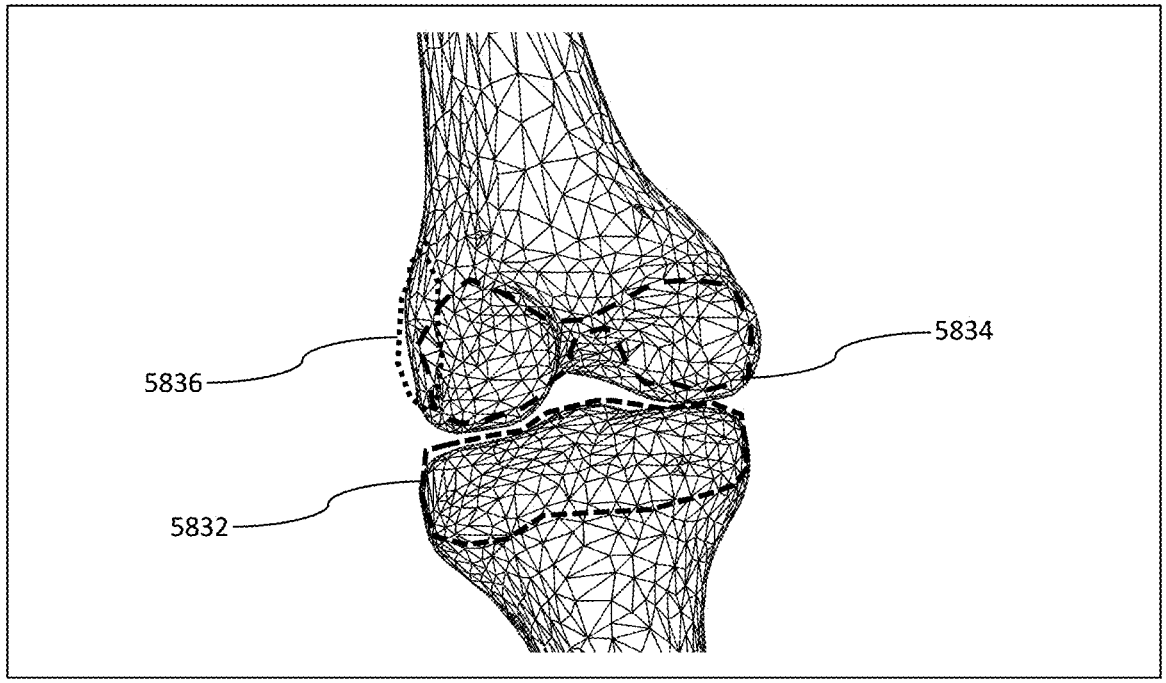
FIG. 58C is a diagrammatic depiction of a knee showing exemplary regions for surface mapping.

In another exemplary embodiment, the system 10 may use the topographical maps of the femur 4204 and tibia 4206 to track the poses of the respective bones (4204, 4206) in lieu of attaching a fiducial marker to the bones (4204, 4206). In one embodiment, the user 106 may select regions of the bones (4204, 4206) that will remain visible as the knee is flexed and extended. Referring to FIGS. 58A-C, the user 106 may select to map the antero-medial aspect of the tibia 5808 or the antero-medial aspect of the distal femur 5806, creating reference 3-dimensional surface maps 5802 and 5804, respectively. These regions are visible through the typical skin incision. Customary retracting instruments and techniques may be used to maintain visibility. The system 10 may store the reference 3-dimensional maps 5802 and 5804 as point clouds, as mathematical surfaces, or by other means. The system 10 may create tibial reference frame 5812 and femoral reference frame 5810 relative to the sensor suite 210 and record the initial pose of the surface maps 5802 and 5804 to reference frames 5812 and 5810, respectively. The user 106 may register additional reference points or structures on the same bone or rigid body, whose pose the system 10 records relative to the reference frame 5812 or reference frame 5810. The system 10, using sensor suite 210, continuously re-scans the same sections of the anatomy and creates displaced 3-dimensional surface maps 5816 and 5814 for the tibia and femur, respectively. Then comparing each displaced surface map 5816, 5814 to the corresponding reference surface map 5802, 5804 created for the same surface, the system 10 determines the geometric rotation and translation required to align the displaced and reference surface maps for best fit. The system 10 then applies the same rotation and translation to all stored reference points and structures on the rigid body of the femur 4204 or tibia 4206, calculating the current pose of all such points and structures relative to the reference frame of sensor suite 210.

Figure 55:
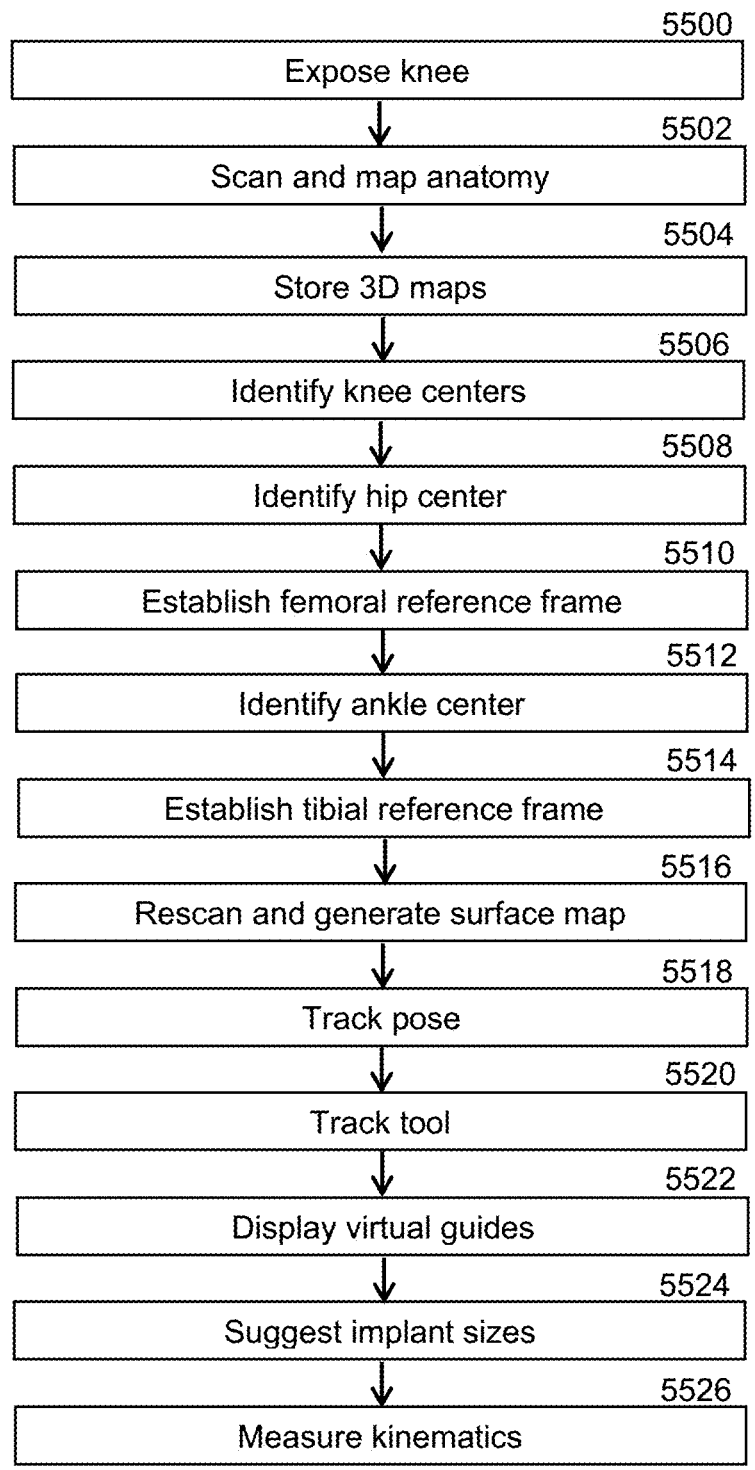
FIG. 55 is a flowchart showing an exemplary method of navigating a knee replacement procedure.

FIG. 55 depicts a flowchart showing an exemplary method for using the system to navigate a knee replacement procedure. The user (106) first exposes the knee to visualize the bony anatomy (5500). The sensor suite 210 then scans the antero-medial aspect of the distal femur 5806 and the antero-medial aspect of the proximal tibia 5808 (5502). From these surfaces, reference 3-dimensional surface maps 5802, 5804 are stored (5504). The system may optionally scan and map larger regions of the femoral condyles 5818, trochlea 5820, tibial plateau 5822, posterior condyles 5824, or epicondyles 5826. From these expanded surface maps 5828, 5830, 5832, 5834, 5836 respectively, and optionally using external anatomic data, the system 10 identifies the center on the distal femur 4204 and the center of the proximal tibia 4206 (5506). The femur is moved through a range of motion whilst scanning the distal femur 5806 to determine the center of rotation of the femur about the hip as a proxy for the center of the hip relative to the mapped distal femoral anatomy 5804 (5508). The user 106 then positions the knee at 90° flexion by arranging the lower leg 5112 approximately perpendicular to the femur 4204. With the knee flexed, the system 10 uses its sensor suite 210 to scan the distal femur 5806 and lower leg 5112, identifying its approximate central axis 5114. Alternatively, the system 10 uses its sensor suite 210 to scan the distal femur 5806 and proximal tibia 5808 as the knee is flexed through a 90-degree range of motion to identify an average flexion axis of the knee. The system 10 then establishes a reference frame 5810 for the femur 4204 relative to the sensor suite 210 with its origin at the center of the distal femur, with a first axis extending toward the center of the hip, a second axis parallel to the axis of the lower limb 5114, and a third axis defined as the normal to the first and second axes (5510). Alternatively, the system establishes a reference frame 5810 for the femur 4204 relative to the sensor suite 210 with its origin at the center of the distal femur, a first axis extending toward the center of the hip, a second axis parallel to the flexion axis of the knee, and a third axis defined as the normal to the first and second axes. The locations of the posterior condyles relative to the tibia are recorded, and an axis is constructed between them. The system 10 generates a surface map of a section of the dorsal surface of the foot for the purpose of tracking its pose. In alternative embodiments, the foot may be tracked via a marker affixed to the skin or overlying drapes, wrappings, or boot. The foot is moved through a range of motion to determine its center of rotation as a proxy for the center of the ankle relative to the mapped proximal tibial anatomy (5512). The mechanical axis of the tibia is then constructed between the proximal tibia and ankle centers and establishes a reference frame 5812 for the tibia 4206 relative to the sensor suite 210 with its origin at the center of the proximal tibia, with a first axis extending toward the center of the hip, a second axis parallel to the axis of the lower limb 5114, and a third axis defined as the normal to the first and second axes (5514). Alternatively, the system establishes a reference frame 5812 for the tibia 4206 relative to the sensor suite 210 with its origin at the center of the proximal tibia, a first axis extending toward the center of the ankle, a second axis parallel to the flexion axis of the knee and a third axis defined as the normal to the first and second axes. Then, repeatedly scanning the exposed distal femur 5806 and proximal tibia 5808, the system 10 generates displaced surface maps 5814 and 5816 for each scan (5516). With each successive scan, the system can compare the displaced surface maps 5814 and 5816 to the original surface maps 5804 and 5802 for the corresponding region on the distal femur 5806 and proximal tibia 5808, respectively. Based on this comparison, the system 10 can track the pose of the femur 4204 and tibia 4206 relative to sensor suite 210 by determining the translation and rotation required to align the displaced surface maps 5814 and 5816 with the reference surface maps 5804 and 5802 (5518). The system 10 then calculates and displays the angles and depths of resection on the distal femur and proximal tibia by simultaneously tracking the respective mapped anatomic surface and a cutting tool or guide (5520). The system 10 may then display virtual guides to assist the user 106 in aligning the cutting tool or guide with a user-defined target angle or depth (5522). The system 10 may suggest implant sizes to the user 106 based on external implant data (5524). Following placement of implants or trial implants, the system 10 may track the femur and tibia throughout a range of flexion and measure the relative rotation of the femur and tibia about one or more axes, representing, for example, axial rotation or *varus*/valgus rotation (5526).

Optionally, the system 10 may use the mapped topography to automatically determine the respective centers of the distal femur 5804 (e.g., by identifying the most distal point on the trochlea or the center of a line through the widest part of the condyles) or proximal tibia 5802 (e.g., by calculating the centroid of the plateau). Optionally, the identification of the center point may be supplemented by external data such as a library of anatomic topographical maps in which the center had been identified, allowing the system 10 to calculate the center point in cases in which the anatomy was partly obscured, preventing mapping of the entire surface.

Figure 56:
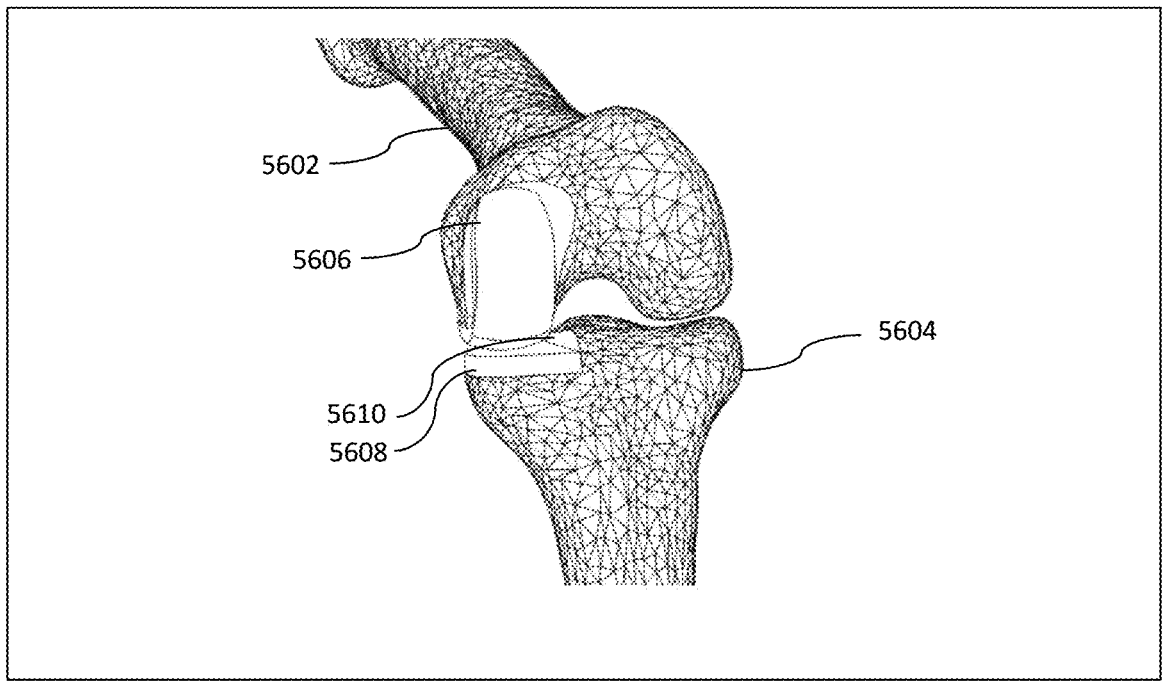
FIG. 56 is a diagrammatic depiction of a knee with unicondylar implants.

FIG. 56 depicts a knee with implanted unicondylar components. One compartment of each of the femur 5602 and tibia 5604 has been resected. A femoral implant 5606 and a tibial implant 5608 have been implanted. In one exemplary embodiment, the system 10 tracks and records the relative motion of the native femur 5602 and tibia 5604. Then, scanning and mapping the surfaces of the implants (5606, 5608) using cameras 206, the system 10 may calculate the paths of the implant surfaces following the recorded tibio-femoral motions. The system 10 may also map the remaining exposed bone 5610 and detect impingement between implants (5606, 5608) and bone 5610. The volume representing the overlap between interfering bodies may be calculated and overlaid as a virtual model in the display device 104. The system 10 may also highlight impingement sites in the display device 104. For example, the femoral implant 5606 may impinge on the ridge of tibial bone adjacent to the sagittal resection plane 5610, or this ridge may impinge on the femoral bone adjacent to the femoral implant 5606. If at least one contacting surface is a bone, the user 106 may elect to trim the bone to change the contact point. If at least one contacting surface is on an implant, the user 106 may elect to adjust the position of the implant to reduce impingement.

Figure 57:
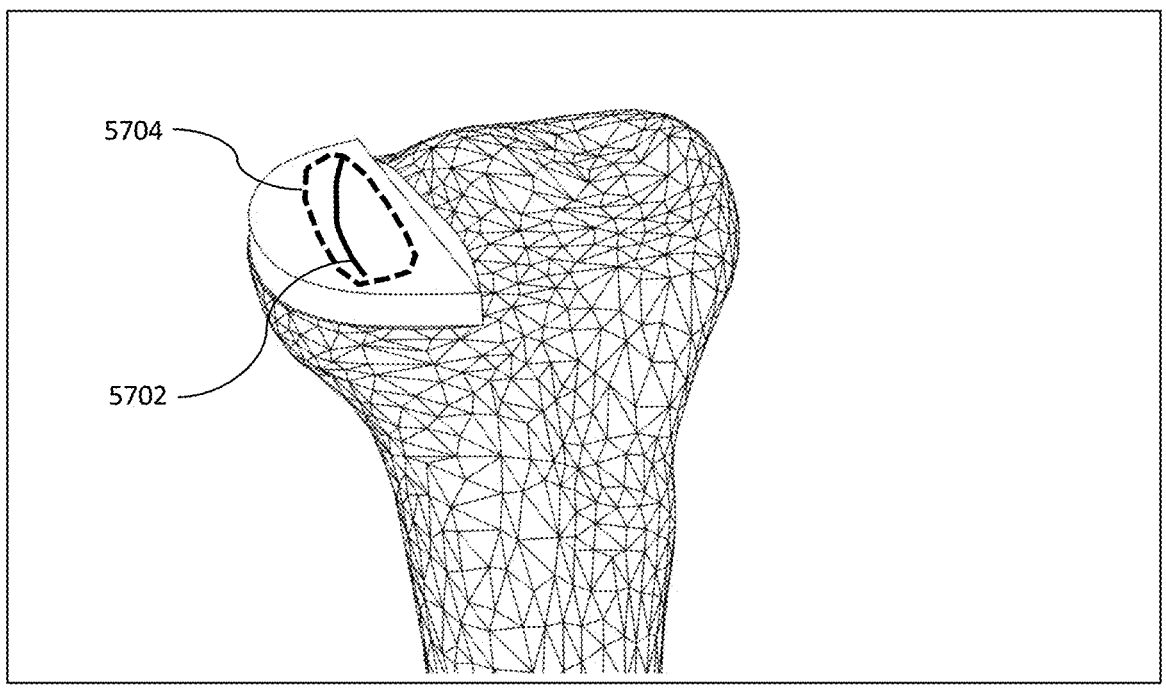
FIG. 57 is a diagrammatic depiction of a tibia with unicondylar implant.

Referring to FIG. 57, the system 10, having recorded the native tibio-femoral kinematics, may display to the user 106 the locus of the inter-implant contact point 5702 and a pre-defined safe zone 5704, projected onto the surface of the implant.

Figure 44:
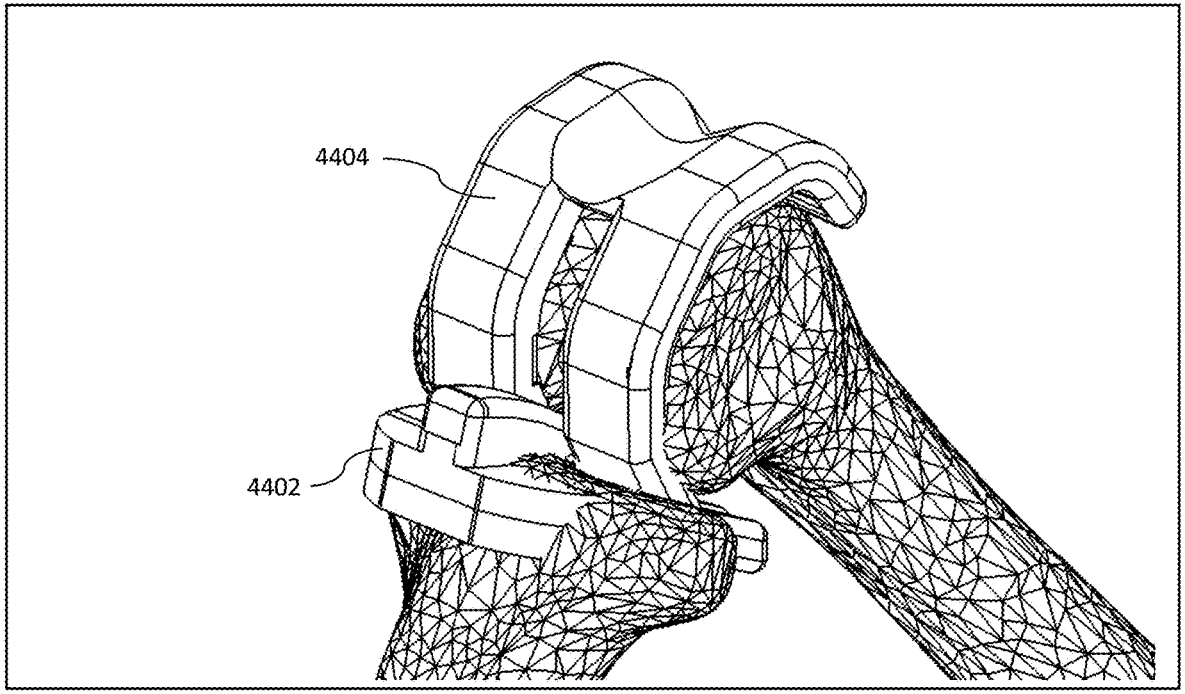
FIG. 44 is a diagrammatic depiction of a MXUI provided by system of FIG. 1 during resection plane planning in a knee replacement procedure.

Referring to FIG. 44, a virtual tibial implant 4402 and virtual femoral implant 4404 can be displayed in a MXUI shown to the surgeon 4208 via the AR headset 3600. The surgeon 4208 may switch the sizes and adjust the position of these virtual models until satisfied. In another embodiment, the virtual tibial implant may be displayed during preparation of the tibia for broaching to provide a guide for the rotational alignment of the tibial component.

Figure 45:
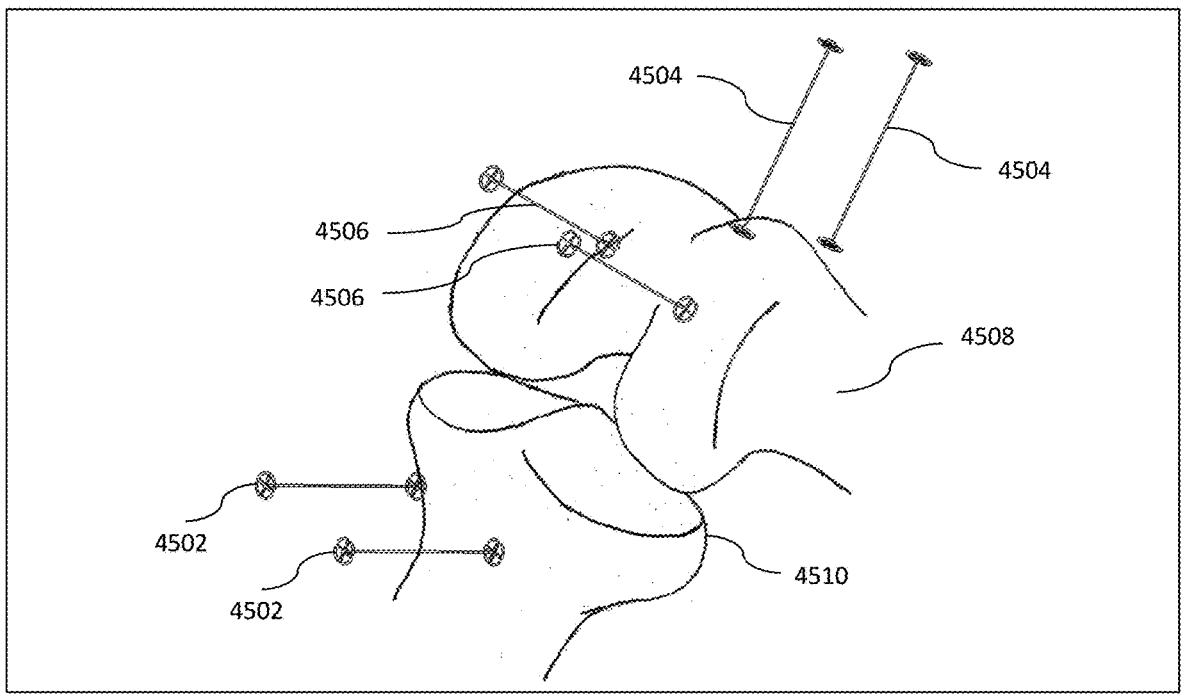
FIG. 45 is a diagrammatic depiction of a MXUI provided by system of FIG. 1 during placement of pins for location of cutting blocks in a knee replacement procedure.

Referring to FIG. 45, virtual guides 4502 for location of pins for the tibial cutting block are displayed in a MXUI shown to the surgeon 4208 via the AR headset 3600. Virtual guides 4504 for location of pins for the distal femoral cutting block are displayed. Virtual guides 4506 for location of pins for the 4 in 1 cutting block are displayed. Placement of the actual pins is guided by aligning them with the virtual guides 4502, 4504 or 4506. The femur 4508 and tibia 4510 may then be resected by placing cutting blocks on these pins.

Figure 46:
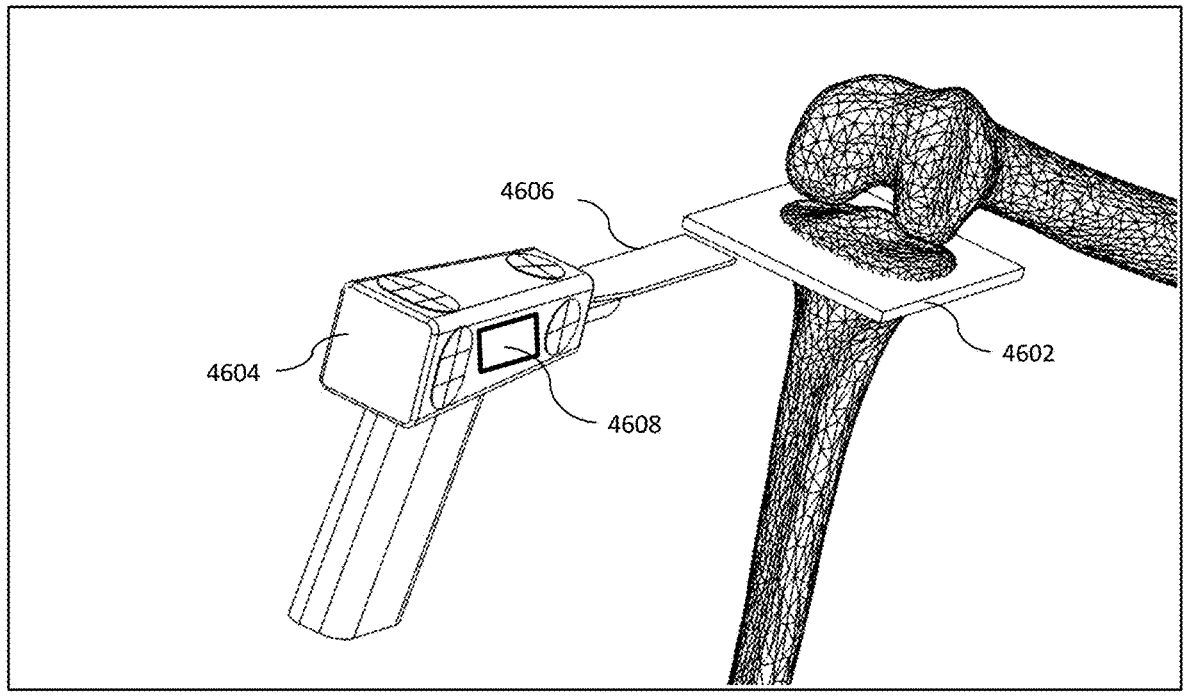
FIG. 46 is a diagrammatic depiction of a MXUI provided by system of FIG. 1 during tibial resection in a knee replacement procedure.

FIG. 46 depicts an alternative embodiment of the MXUI shown in FIG. 45 wherein a virtual guide 4602 is used to display the ideal plane of resection and the surgeon 4208 may resect the bone directly by alignment of the actual saw blade with the virtual guide 4602. Alternatively, in the case of a tracked saw 4604, the surgeon 4208 may resect the bone by alignment of a virtual saw blade 4606 with the virtual guide 4602. Virtual text 4608 showing the *varus*/valgus angle, flexion angle and depth of each resection may be displayed numerically when relevant.

Figure 47:
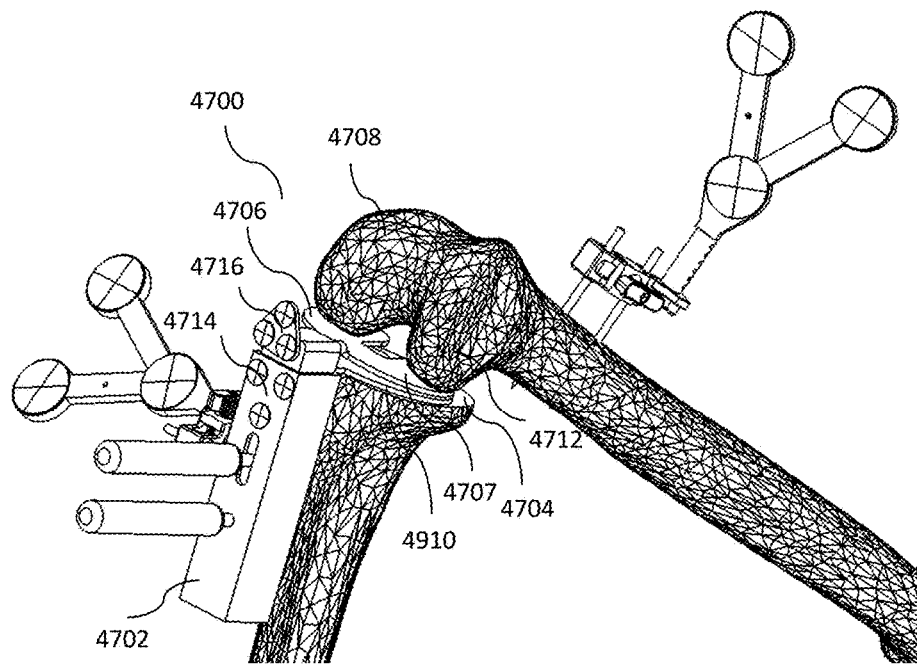
FIG. 47 is a perspective front view of a diagrammatic depiction of a knee balancing device that is optionally included in the system of FIG. 1 in use during a knee replacement procedure.
Figure 49:
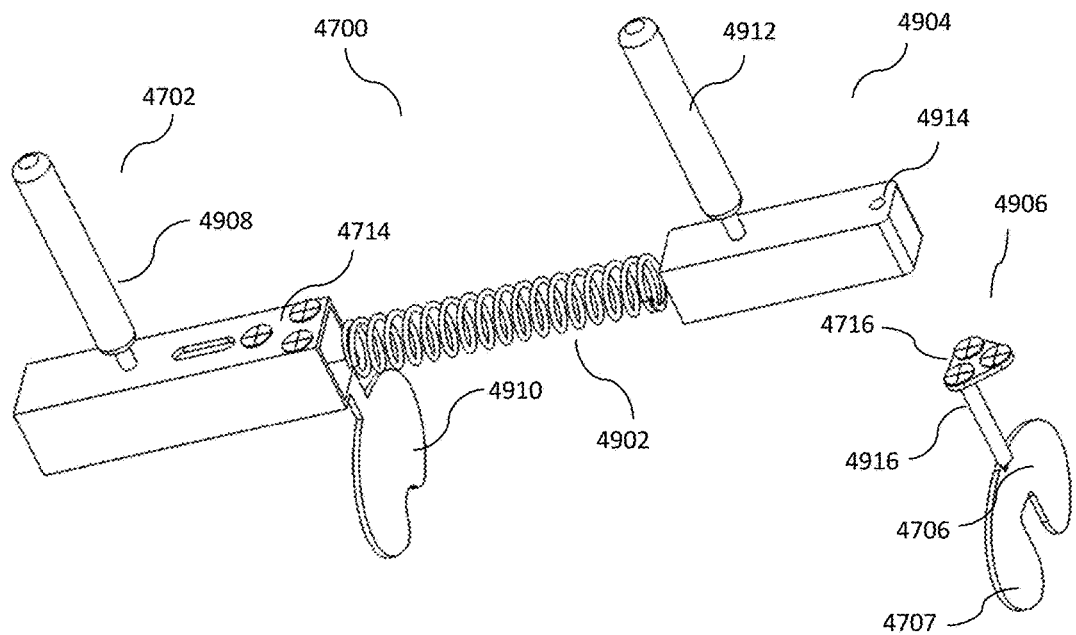
FIG. 49 is a perspective front view of the knee balancing device shown in FIG. 47.

FIGS. 47 and 49 depict a knee balancing device 4700 that may be optionally included in the system 10 having a base element 4702, a spring 4902, a condylar element 4904, and a condylar plate 4906. The base element 4702 includes a handle 4908, a target 4714 and a tibial plate 4910. The condylar element 4904 includes a handle 4912 and a cylindrical bearing hole 4914. The condylar plate 4906 includes a cylindrical bearing shaft 4916, a target 4716, and two paddles 4706 and 4707. The condylar plate 4906 pivots about a cylindrical bearing 4916, which allows medial/lateral tilt of the condylar plate 4906 relative to the base plate 4910. In an alternative embodiment, the bearing 4916 may be a ball-type allowing medial/lateral and flexion/extension tilt of the condylar plate 4906. In another embodiment, the condylar plate 4906 may be contoured to match the topography of the bearing surface of a tibial implant. In another embodiment, the design could include two fully independent condylar elements each with a rigidly integrated distraction paddle and a marker.

Referring to FIG. 47, the tibial plate 4910 is seated on the resected tibia 4704, and the distraction paddles 4706 and 4707 maintain contact with the medial femoral condyle 4708 and the lateral femoral condyle 4712, respectively. The distraction paddles 4706 and 4707 are pushed by the spring 4902 and pivot about an anteroposterior axis to provide a nearly equal and constant distraction force between each femoral condyle (4708, 4712) and the tibia 4704. The base element 4702 and distraction paddles (4706, 4704) include optical markers (4714, 4716) which allow the software to measure the degree of distraction of each femoral condyle (4708, 4712).

Figure 48:
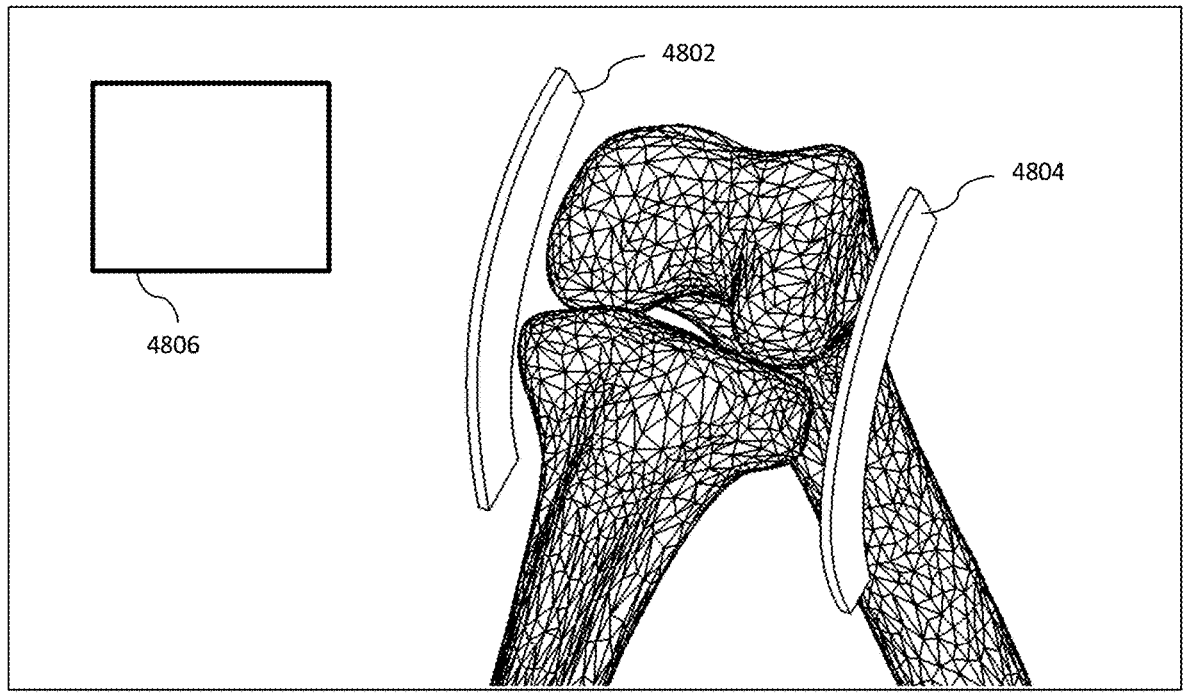
FIG. 48 is a diagrammatic depiction of a MXUI provided by system of FIG. 1 during a balancing assessment in a knee replacement procedure.

As the knee is flexed through a range of motion, the position of each target is tracked, as is the pose of the tibia and femur. This data is used to generate a plot of medial and lateral laxity as a function of flexion angle. This information is used to calculate the ideal location of the distal femoral cutting block location pins to achieve balance through the range of motion of the knee or to guide the user in removing osteophytes or performing soft tissue releases to balance the knee through its range of motion. This plot may be displayed in a MXUI as shown in FIG. 48 in which a first three-dimensional arc 4802 represents the medial laxity and a second three-dimensional arc 4804 represents the lateral laxity through the range of motion of the knee. The numerical values at the current flexion angle of the actual knee can be displayed as virtual text 4806.

Figure 66A:
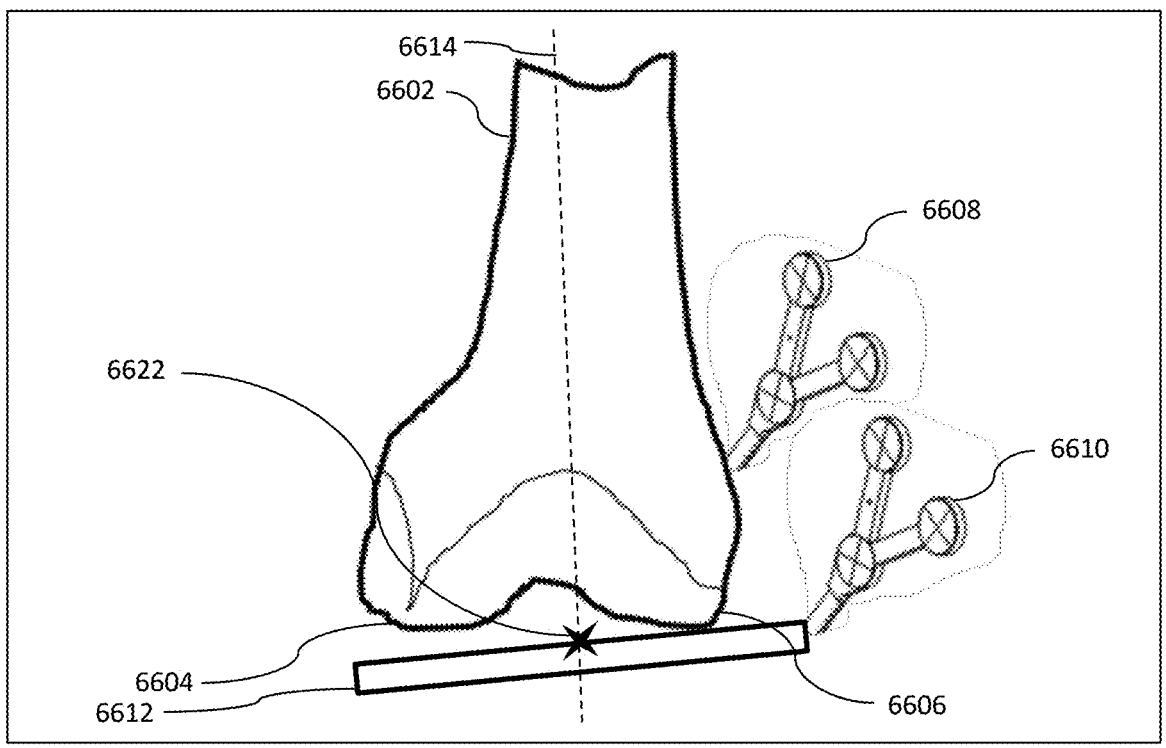
FIG. 66 shows components of a system to measure resection depth in knee surgery.
Figure 66B:
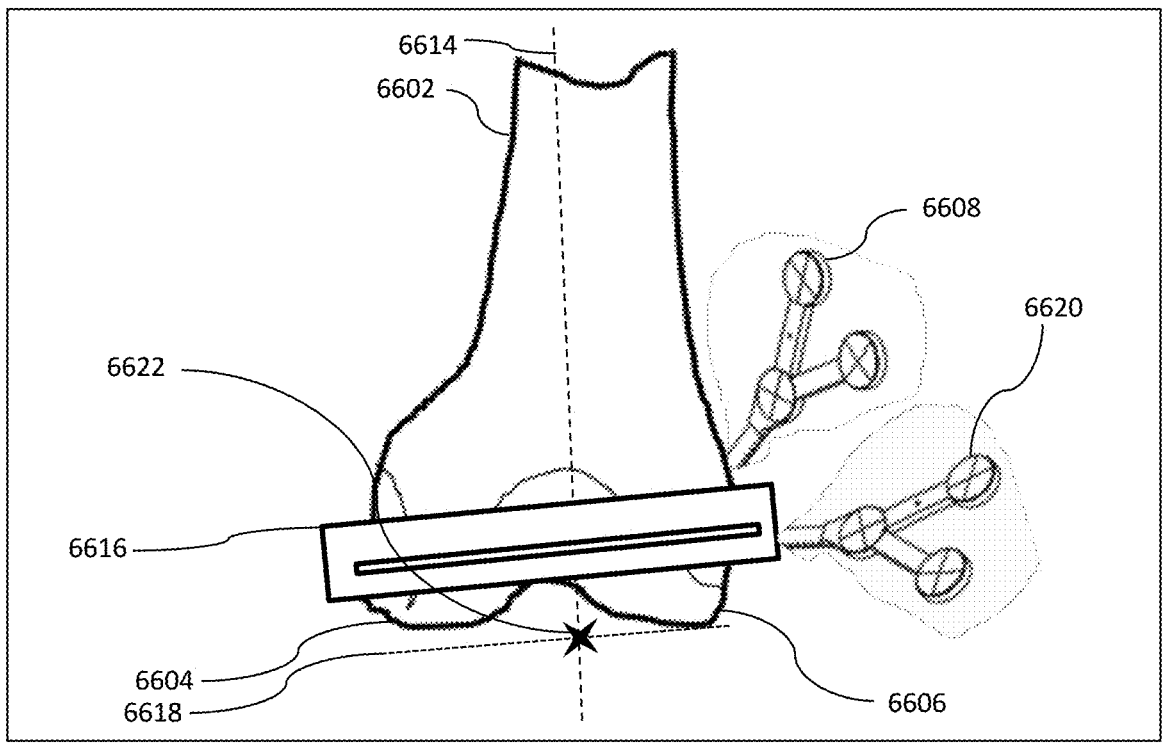

FIGS. 66A and 66B depict one embodiment of the system 10 used for measuring resection depth in knee surgery. Distal femur 6602 comprises condyles 6604 and 6606, and mechanical axis 6614. Markers 6608 and 6610 are rigidly fixed to femur 6602 and condylar guide 6612, respectively. Marker 6620 is rigidly fixed to cutting guide 6616.

Figure 67:
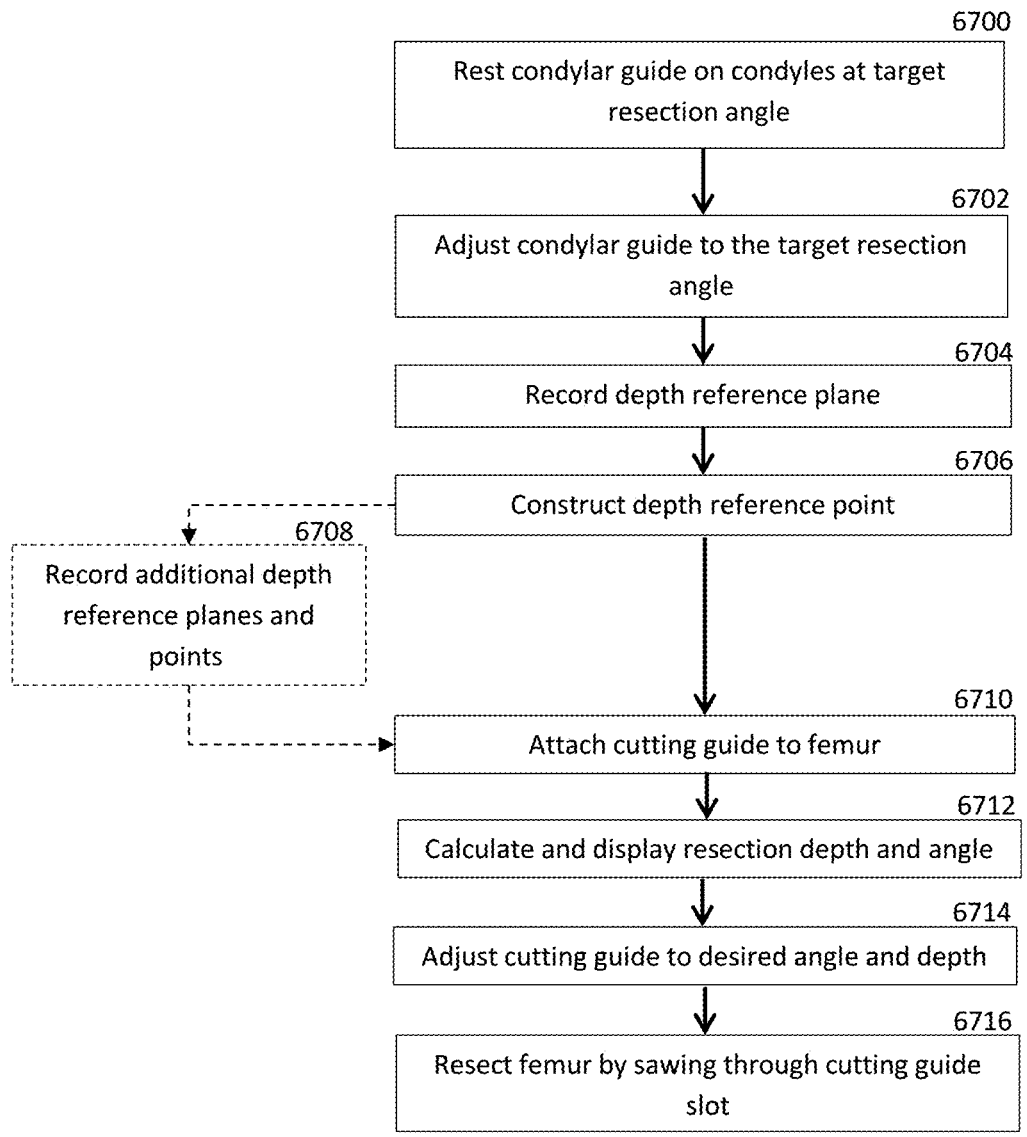
FIG. 67 is a flowchart showing an exemplary method of measuring resection depth on a femur.

A challenge in measuring resection depth is that the femoral condyles, which are used as a depth reference, are shaped irregularly such that their most prominent point changes depending on the angle of the resection plane. A common solution is to map the condylar surface by registering many points on the surface, which is time-consuming but allows a computer to calculate the depth at a particular angle by calculating the distance to the most prominent point along a perpendicular path. FIG. 67 depicts a flowchart illustrating a method of using a system 10 to register the anatomy of the distal femur and measure depth in a knee surgery without mapping the condylar surface. User 106 rests condylar guide 6612 on the condyles 6604, 6606 (block 6700). Following the guidance of the system 10, user 106 adjusts the angle of condylar guide 6612 to the target resection angle while maintaining contact between condylar guide 6612 and at least one of condyles 6604, 6606 (block 6702). The system 10, using sensor suite 210 to track markers 6608 and 6610, measures the pose of condylar guide 6612 relative to femur 6602 and records a depth reference plane 6618 coincident with the surface of condylar guide 6612 in contact with one or more of condyles 6604 and 6606 (block 6704). The system 10 then constructs and records a depth reference point 6622 at the intersection of mechanical axis 6614 and depth reference plane 6618 (block 6706). Optionally, the system 10 may direct user 106 to adjust the condylar guide 6612 to multiple orientations, still maintaining the condylar guide 6612 in contact with at least one of condyles 6604 or 6606, to record additional depth reference planes 6618 and depth reference points 6622 (block 6708).

Figure 74:
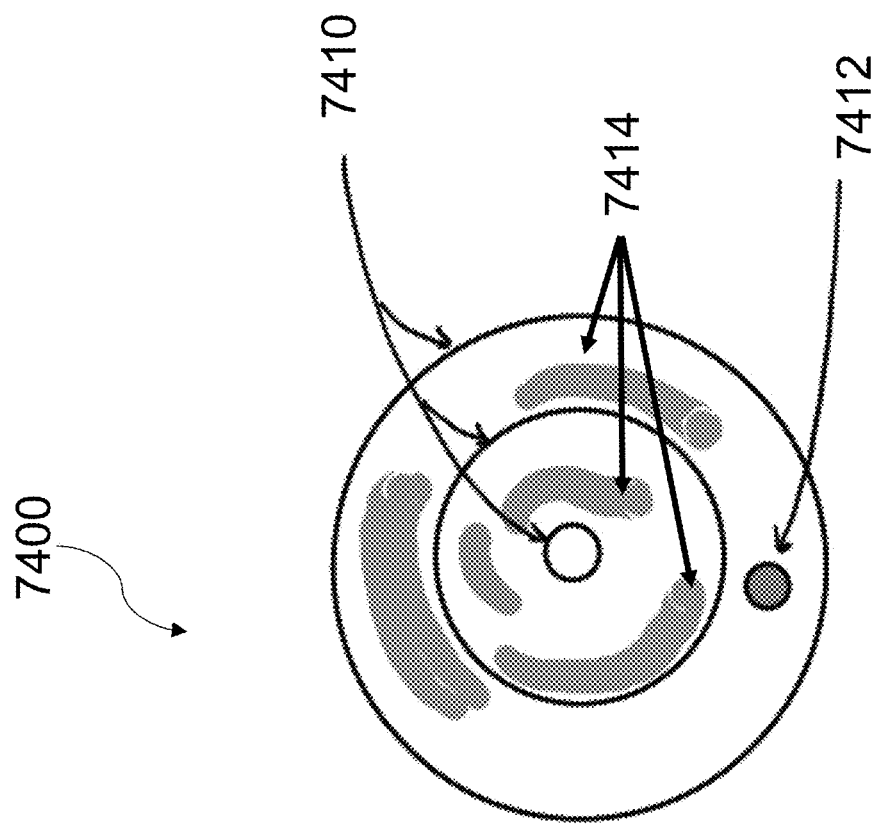
FIG. 74 shows one embodiment of a method of guiding a user to adjust a condylar guide.

In some embodiments, there are additional or alternative methods for guiding the user to different orientations for depth reference point capture. In one embodiment, as shown in FIG. 74, a target 7400 (e.g., a bullseye), for example comprising one or more regions 7410, is presented showing a movable icon 7412 that represents one or more angles from the condylar guide. Although a circular target is shown, one of skill in the art will appreciate that any style or shape (e.g., square, rectangular, two dimensional, three dimensional, etc.) is included herein. In this embodiment, the system outputs instructions to a user to move the guide relative to the condyle and virtually paint or mark or highlight 7414 the target 7400 using the movable icon 7412 to capture valid depth reference points. At angles where valid depth reference points are recorded, the system displays or outputs an indicator or marker on the target (shown by painted areas 7414) to inform the user that they do not have to move the movable icon in that area again because a valid depth reference point has been acquired for the indicated area. In other embodiments, the system restricts the user from virtually painting previously captured valid depth reference points. During the movement of the guide on the condyle, a database is formed from all or a subset of the valid depth reference points acquired for use in the cutting step.

Figure 75:
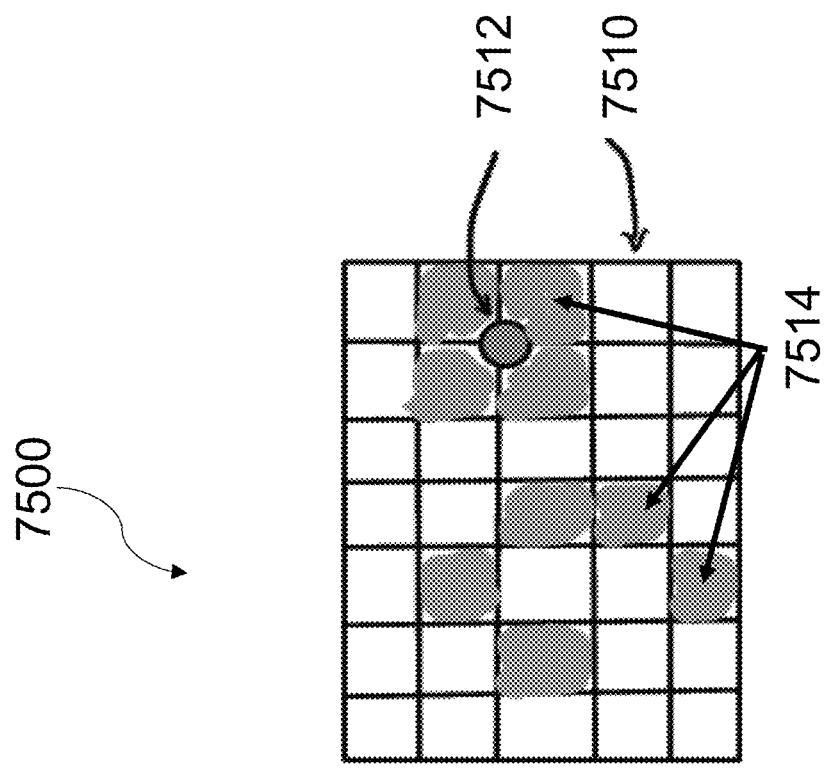
FIG. 75 shows another embodiment of a method of guiding a user to adjust a condylar guide.

In another embodiment, as shown in FIG. 75, a grid 7500 comprising one or more regions 7510 is presented showing a movable icon 7512 that represents the angles from the condylar guide. In this embodiment, the system displays outputs instructions to the user to move the guide relative to the condyle and virtually paint 7514 the target 7500 using the movable icon 7512. At angles where valid depth reference points are recorded, the system outputs or displays an indicator or marker (shown by painted areas 7514) on the target 7500 to inform the user that they do not have to move the movable icon in that area again because a valid depth reference point data has been acquired for the indicated area. During the movement of the guide on the condyle, a database is formed from all or a subset of the valid depth reference points acquired for use in the cutting step.

Figure 76:
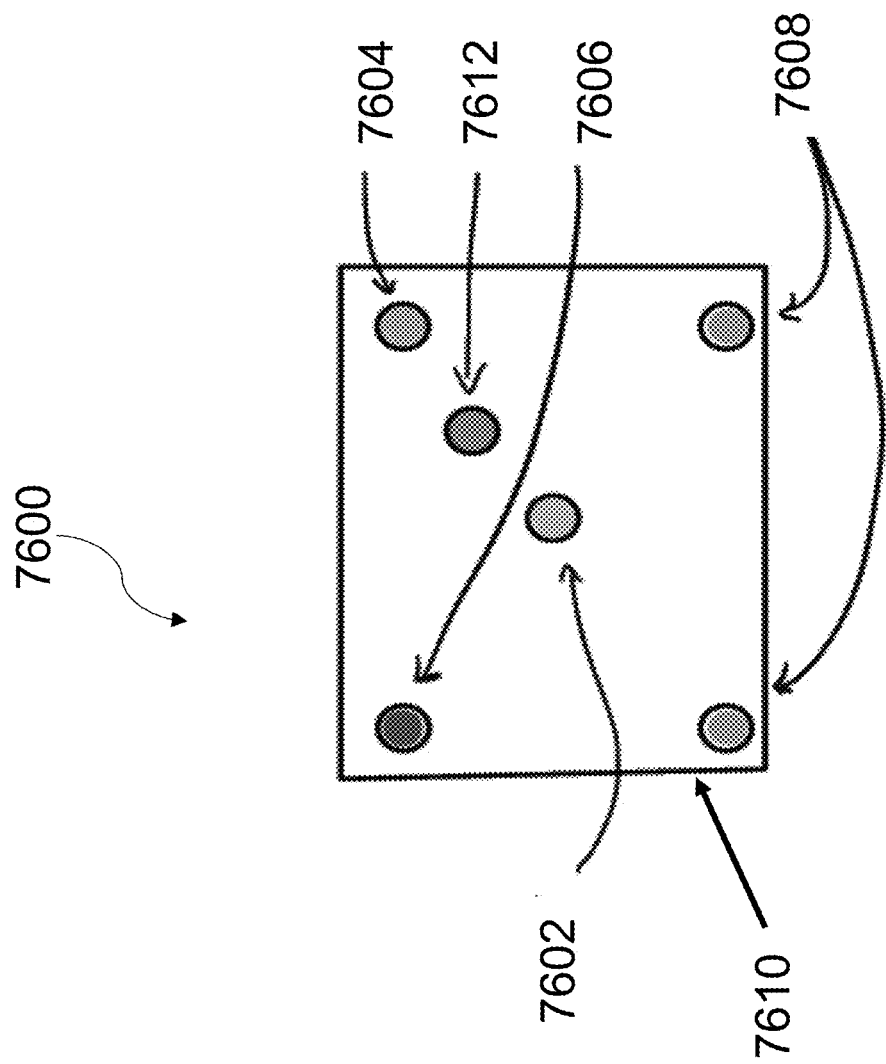
FIG. 76 shows another embodiment of a method of guiding a user to adjust a condylar guide.

In still another embodiment, as shown in FIG. 76, a target 7600 is displayed including one or more regions 7602, 7604, 7606, 7608. For example, one or more regions may be positioned near, adjacent to, or proximate to a perimeter 7610 of the target 7600. One of these outer regions, for example region 7606, is highlighted (e.g., changes color, becomes activated, becomes lighted, flashes or blinks, audibly beeps, shakes, etc.) while the others, for example regions 7608 are inactivated, (e.g., greyed out). A movable icon 7612 that represents the angles from the condylar guide is present. In this embodiment, the system outputs or displays instructions to the user to move the guide relative to the condyle until the movable icon at least partially overlaps or at least partially lays on top of the highlighted region 7606. When this is achieved, the currently highlighted region 7606 is inactivated and the next, subsequent, or adjacent region, for example region 7604, is highlighted. This repeats for all regions 7604, 7606, 7608, and then the system outputs or displays instructions to the user to move the movable icon to a region 7602 in a center of the target 7600. During this activity, depth reference points are acquired in the background. During the movement of the guide on the condyle, a database is formed from all points acquired for use in the cutting step.

In a still further embodiment, the system displays or presents to the user a moving target and outputs or displays instructions to the user to move the guide relative to the condyle until the movable icon at least partially overlaps or lays on top of the target highlighted by the system. The speed and pattern of the moving target may be varied by the software with the purpose of acquiring data in areas that are preferential to the accuracy of the device. During the movement of the guide relative to the condyle, a database is formed from all points acquired for use in the cutting step.

The user 106 then removes condylar guide 6612 from the femur and attaches cutting guide 6616, which is configured to allow user 106 to adjust its angle and depth on femur 6602 (block 6710). As cutting guide 6616 is adjusted, the system 10 measures the position of the cutting guide 6616 relative to femur 6602 by tracking markers 6620 and 6608, respectively. The instantaneous resection depth is calculated as the normal distance from the current resection plane defined by cutting guide 6616 to the depth reference point 6622 corresponding to the depth reference plane 6618 most nearly parallel to the angle of cutting guide 6616 (block 6712). In another embodiment, the depth reference point 6622 corresponding to the depth reference plane 6618 may be determined through either interpolation or extrapolation of reference planes and/or other depth reference points acquired at different orientations if the current orientation of the cutting guide was not one that was recorded during condyle navigation. User 106 adjusts cutting guide 6616 to the desired resection angle and depth, following feedback from system 10 (block 6714). Depth measurement accuracy decreases as the angle from the depth reference plane increases, due to the irregular shape of the condyles and uncertainty in identifying the most prominent point on the condylar surface. To minimize the depth error due to misalignment, the system 10 does not display depth measurements if cutting guide 6616 is more than a specified angular limit (e.g., 1 degree) away from the most nearly parallel depth reference plane 6618. Once the cutting guide 6616 is at the desired angle and depth, the user 106 resects the femur by sawing through a slot or against a face of cutting guide 6616 (block 6716). The angular limit may be selected based on a desired resolution. For example, a one-degree angular limit may result in about or substantially 1 mm of error.

In some embodiments, the system needs to store reference depth points (i.e., three-dimensional point) at multiple points in the background without forcing the user to select many points manually. To solve this technical problem, one or more reference depths are stored, arranged, and related in a database. The reference depth points are the minimum amount of information needed in the database to solve the technical problem. One exemplary, non-limiting embodiment of a database includes a matrix as a grid (e.g., from about −3 to about +3 at about 0.5 intervals on both axes) having an indicator representing a measured value of a reference depth point of, for example a VV angle, FE angle or 2.4, 1.7, respectively, overlaid on it. The database would be configured to determine or show that the closest index or known value in the database to the measured value is 2.5, 1.5 and represent that distance (calculated as sqrt((2.5−2.4)^2+ (1.5−1.7)^2 or the root-sum-square (RSS) distance) as the figure of merit (FOM) for that reference depth point. In other words, the RSS distance is the FOM for that reference depth point. When the reference depth point and associated FOM is stored in the database, a flag or other indicator marks the database indices at the known value or closest index, in this example being 2.5, 1.5. If a new, lower FOM is calculated for a newly measured reference depth point, the new lower FOM and the newly measured depth point will overwrite the previous entries in the database. If a new, equal or higher FOM is calculated for a newly measured reference depth point, the new equal or higher FOM is not recorded in the database.

One exemplary embodiment is shown in FIG. 77. The method of FIG. 77, performed by any of the systems described herein, includes: creating a database including N×M entries at block S7700. Before a condylar guide is used, the system creates an empty database or two-dimensional matrix. The database comprises N×M entries, where N is the number of *varus/valgus* (VV) angles that are to be acquired and M is the number of flexion/extension (FE) angles to be acquired. One method to determine N and M is to subtract the minimum desired target angle from the maximum desired target angle and divide by the resolution needed for accuracy, while maintaining the maximum points in the array. An example for *varus*/valgus would be about a −3 degree minimum, about a +3 degree maximum with resolution of about 0.5 degrees. Further for example, a VV of about −3.5 degree minimum, about +2 degree maximum with a resolution of about 0.25 degrees, resulting in an N value of 24, including maximum and minimum endpoints. This would provide an N value of 14 including the maximum and minimum endpoints.

The method further includes, at block S7710, initializing the database with: a target VV angle, a target FE angle, any value (e.g., can be an arbitrary value, without specific units) for a measured VV angle, any value (e.g., can be an arbitrary value, without specific units) a measured FE angle, an artificially large figure of merit (FOM), a reference point depth vector of (0,0,0), and a reference depth valid flag indicating that a reference depth has been entered already set to false (i.e., false meaning that no data has been stored at this point in the 2D array or matrix). Block S7710 may be based on adjustment of a condylar guide by a user to a target condylar angle, using any of the methods described elsewhere herein. As shown in FIGS. 74-75, the virtually painted areas 7414, 7514 indirectly show the valid flags that are stored in the system.

Turning to block S7720, the method includes outputting one or both of a current VV angle or a current FE angle of a guide positioned at a target condylar angle.

In some embodiments, the method includes, at block S7730, determining a closest position to the target VV angle and/or target FE angle in the database. For example, the system may compute a figure of merit (FOM) that represents the root-sum-square (RSS) distance of the current VV and FE angles to the target angles calculated at block S7700. In some embodiments, this computation can be performed through a binary search or a linear method. The FOM is equal to SQRT((VV_current−VV_i)^2+(FE_current−FE_j)^2) where i and j are varied to compute a FOM for every point in the database. The smallest FOM represents the closest point in the database or 2D array or matrix that the reference depth point should be stored at. The i and j indices in the database are stored for the subsequent steps.

The method further includes, at block S7740, when a reference depth was not previously recorded in the database, computing: a FOM, a current VV angle, a current FE angle, and a depth reference point to store in the database at these indices and setting the reference depth valid flag to true. This flag indicates that data for this point in the 2D array or matrix has been stored successfully.

Alternatively, at block S7750, when a reference depth was previously recorded in the database, comparing one or both of a FOM for the current VV angle or a FOM for the current FE angle to the FOM in the database, and when the current FOM is less than the previously recoded reference depth, overwriting the reference depth in the database. If the current FOM is larger than that which is stored, the reference depth is not overwritten.

When a cutting guide has been attached and a reference depth point is required for depth calculations, a method, as shown in FIG. 78 is used to retrieve the reference depth point. As shown in FIG. 78, the method includes, at block S7800, determining one or both of a current VV angle or a current FE angle of a cutting guide positioned at one or both of a desired depth or a desired angle. For example, this may be based on user adjustment of a cutting guide relative to the femur.

The method of FIG. 78 further includes, at block S7810, determining a closest position to one or both of a target VV angle or a target FE angle in the database, as described above in FIG. 77. Block S7810 may include computing a FOM that represents the root-sum-square (RSS) distance of the current VV and FE angles to the target angles in the database. In some embodiments, this can be performed through a binary search or a linear method. The FOM is equal to SQRT ((VV_current−VV_i)^2+(FE_current−FE_j)^2), where i and j are varied to compute a FOM for every point in the database. The smallest FOM represents the closest point in the database array that the reference depth point should be stored at. The i and j indices in the database are stored for subsequent steps.

In some embodiments, the method further includes, at block S7820, when a valid reference depth point is not recorded in the database or the valid reference depth point cannot be interpolated (e.g., using local reference points near the position in the database), outputting an indicator that no reference point is available.

Alternatively, as shown at block S7830, when a valid reference depth point was recorded in the database or was interpolated, outputting an indicator that the valid reference point is available. The indicator of blocks S7820 and S7830 may be a visual indicator (e.g., displayed on the display of the head-worn display, flashing signal, lighted indicator, text indicator, pop-up, etc.), an audible indicator (e.g., beep, specific tone, specific sound, etc.), or a haptic indicator (e.g., haptics or feedback in head worn display, support module, helmet, etc.).

Figure 79A:
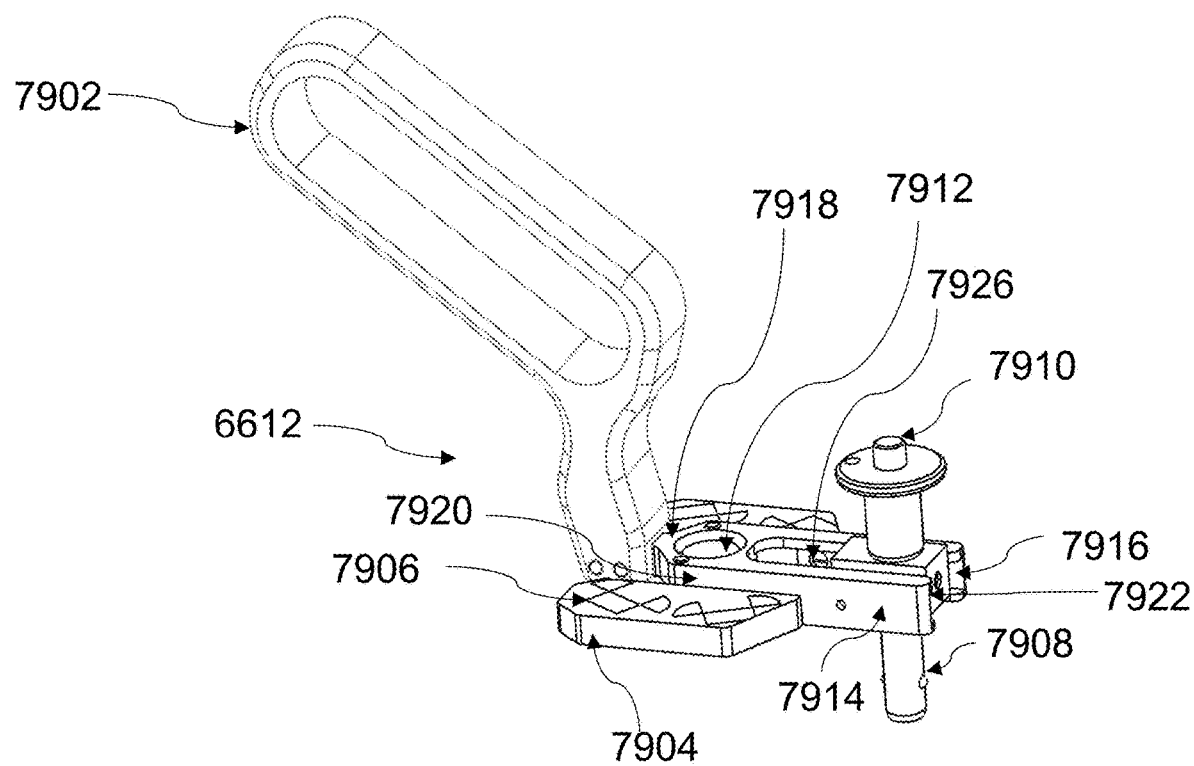
FIG. 79A shows one embodiment of a condylar guide.
Figure 79B:
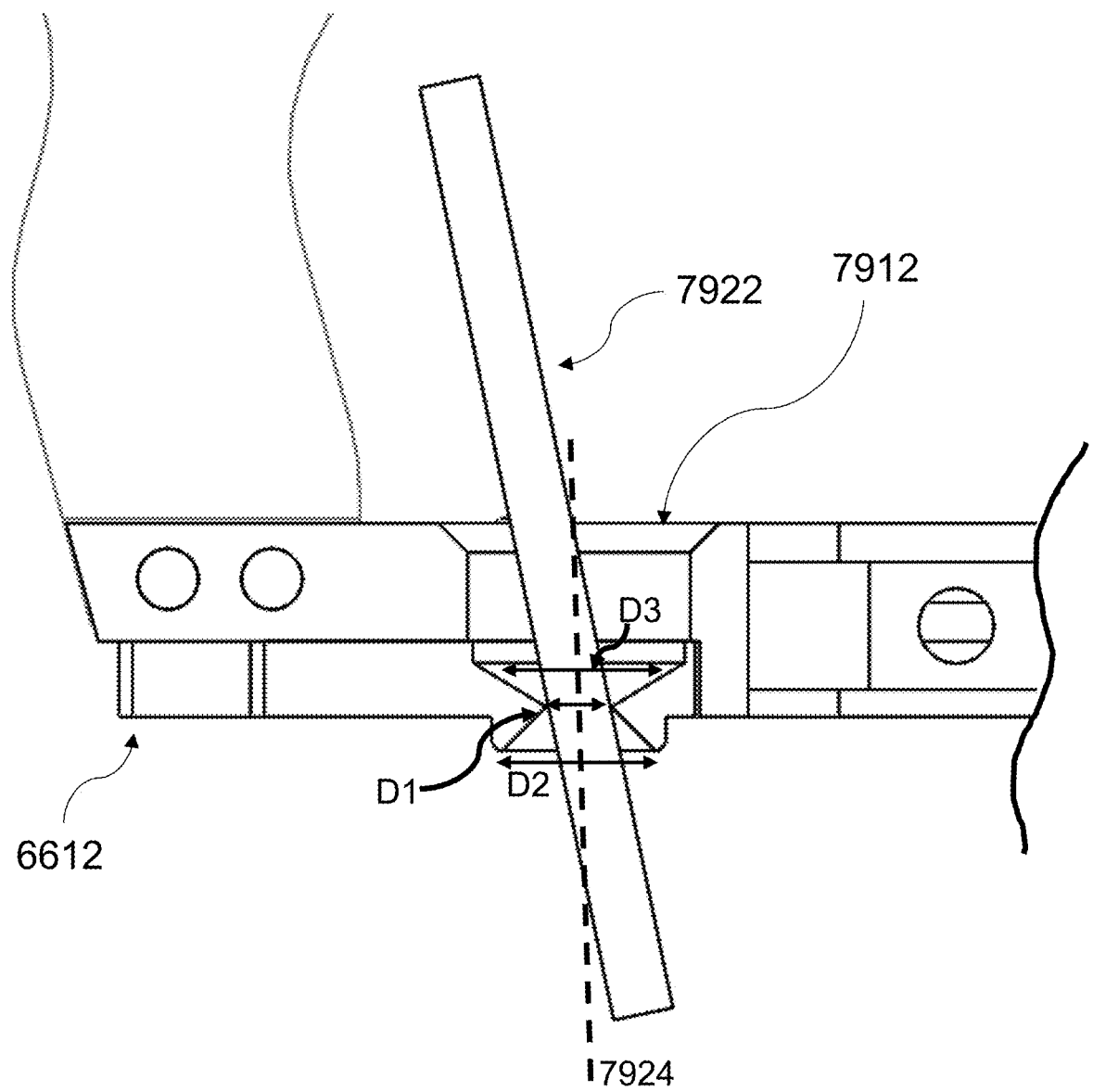
FIG. 79B shows a zoomed in view of an aperture defined by a body of the condylar guide of FIG. 79A.

FIGS. 79A-79B depicts one embodiment of a condylar guide 6612. Condylar guide 6612 comprises a body 7914 having a first end 7918 and a second end 7916. An elongate handle 7902 extends from the first end 7918 of the body 7914. User 106 holds handle 7902 to control the position of condylar guide 6612. Handle 7902 is made suitably long to allow user 106 to make fine angular adjustments and to resist external forces applied to condylar guide 6612, for example, from pinning cutting guide 6616 to femur 6602. The condylar guide 6612 further includes at least one planar surface 7904 (but in some embodiments more than one) extending from a side region 7920 of at least a portion of the first end 7918. The planar surface 7904 is configured to rest on one or more femoral condyles 6604, 6606 and construct a zero-depth plane for calculating a resection depth. In some embodiments, the planar surface is configured to simulate a plane tangent to a femoral condyle. The condylar guide 7914 includes at least one tracker positioned on the planar surface 7904 for tracking a pose of the condylar guide 6614. Tracker markings 7906 are made directly on condylar guide 6612 to allow system 10 to track the pose of the condylar guide 6612. In another embodiment, tracker markings 7906 are made on a separate component rigidly attached to condylar guide 6612. The tracker positioned on the planar surface or on a separate component is used to determine one or more valid depth reference points.

Figure 80:
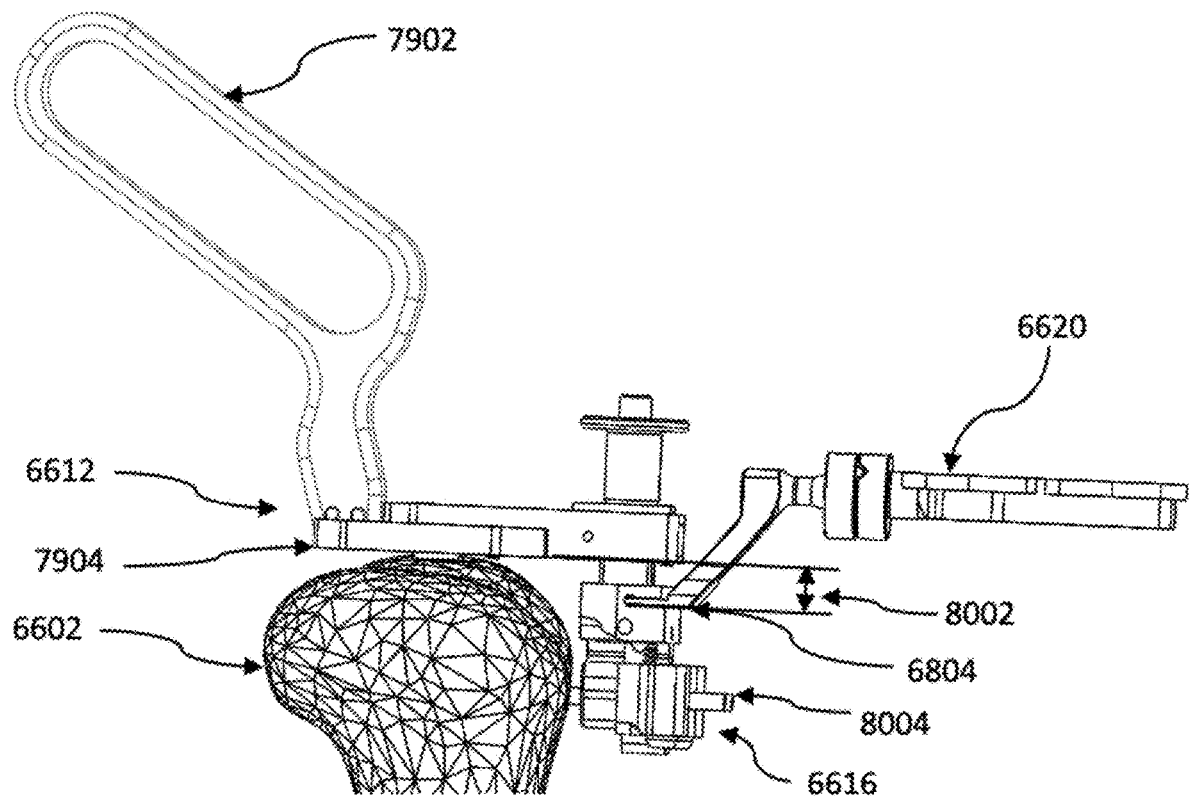
FIG. 80 shows one embodiment of a cutting guide.

The condylar guide 6612 further includes a connector 7908 extending from the second end 7916 of the body 7914 and is configured to couple to a cutting guide 6616, as shown in FIG. 80. In some embodiments, the connector is removable.

In some embodiments, the body 7914 further defines an aperture 7912 that is configured to receive a pin 7922 therethrough for insertion into a bone, for example a femur. The aperture 7912 is configured or a diameter D2, D3 of the aperture 7912 is sized such that it allows the condylar guide 6612 to be tilted when a pin 7922 is inserted through the aperture 7912, as shown in FIG. 79B. Aperture 7912 is oversized to allow condylar guide 6612 to be tilted with the pin 7922 in place. The amount of oversize can be changed to allow more or less angular tilt of the guide 6612 about the pin axis. For example, a diameter D1 of the aperture 7912 at a first position may be substantially equal to a diameter of the pin 7922. Diameters D2, D3 of the aperture 7912 at a second and third position, respectively, may be larger than a diameter of the pin 7922 to allow angular tilt of the guide 6612 about the pin axis 7924 by about +/−15 degrees; about +/−10 degree; about +/−5 degrees; about +/−2 degrees; etc.

In some embodiments, the condylar guide 6612 includes a release mechanism 7910 extending from the second end 7916 of the body 7914 in a direction opposite of the connector 7908. The release mechanism 7910 is configured to couple the condylar guide 6612 to the bone before pinning the cutting guide 6616 to the bone and to remove the condylar guide 6612 after cutting guide 6612 has been pinned to femur 6602.

In some embodiments, at least a portion of the second end 7916 of the body 7914 of the condylar guide 6612 defines a slot 7926 configured to receive a slider 7922 into which the connector 7908 and the release mechanism 7910 are inserted on opposing sides of the slider 7922. Slider 7922 allows the cutting block, after the user has moved the guide 6612 to the correct angle, to slide posteriorly (backwards) toward the femur to contact it prior to pinning Contact with the femur supports the cutting guide 6616 during pinning and minimizes its tendency to get pushed away from the desired angle.

In some embodiments, pinning the cutting guide 6616 only occurs after using the condylar guide 6612 coupled to the cutting guide 6616 to determine the one or more valid depth reference points.

Figure 68A:
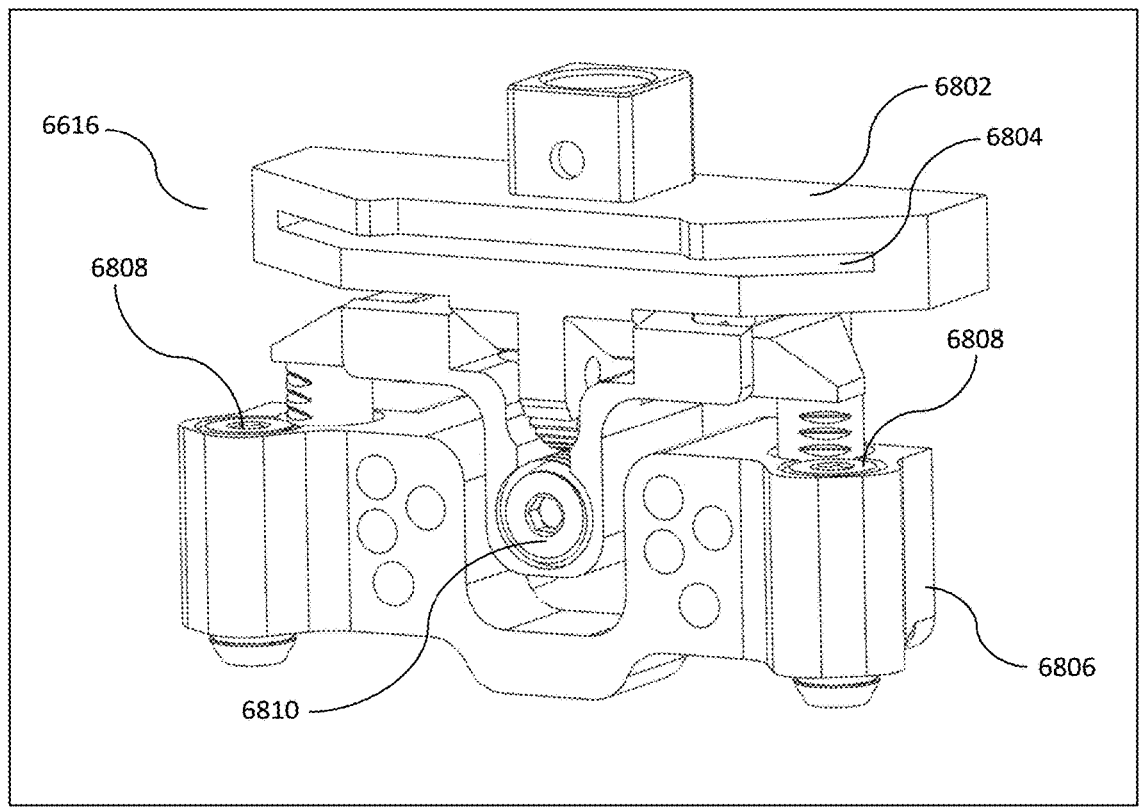
FIG. 68A shows a diagrammatic depiction of an adjustable cutting block.
Figure 68B:
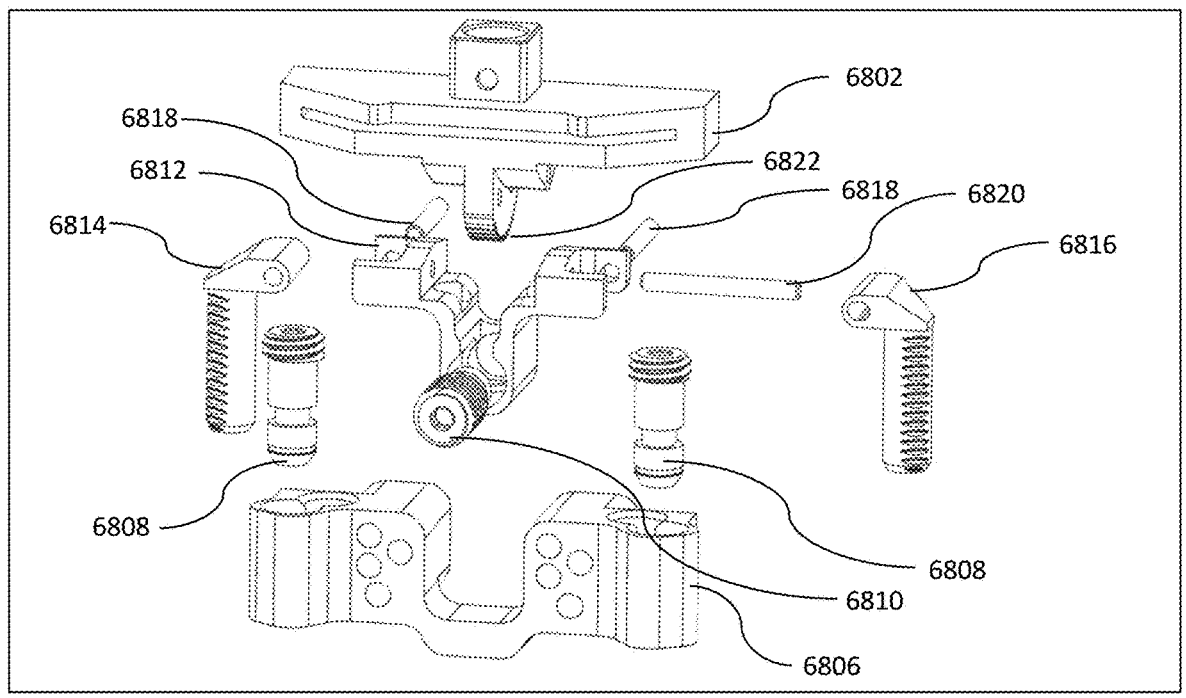
FIG. 68B shows an exploded view of the cutting block depicted in FIG. 68A.

FIGS. 68A and 68B depict one embodiment of cutting guide 6616 configured to be adjustable after mounting on a bone. Fixed base 6806 is rigidly attached to a bone. Movable cutting head 6802 includes a cutting slot 6804. Two valgus adjustment screws 6808 can be turned to adjust the angle of cutting head 6802 in a frontal plane, while flexion adjustment screw 6810 can be turned to adjust the angle of cutting head 6802 in a perpendicular plane. Valgus adjustment screws 6808 actuate left and right adjustment posts 6814 and 6816, respectively, by inter-meshing screw threads. Axial motion of either of these adjustment posts 6814 or 6816 in turn rotates valgus block 6812 and cutting head 6802 about one of valgus pins 6818. In one embodiment, valgus pins 6818 are spaced approximately the same distance as femoral condyles 6604 and 6606, allowing cutting head 6802 to rotate about an axis aligned with one condyle so the distance from cutting slot 6804 to that condyle remains constant as the user 106 adjusts the angle of cutting head 6802. This addresses a common problem with existing cutting guides, where adjusting the angle of the guide in the frontal plane also changes the depth of resection measured from one or both condyles. Further referring to FIG. 68B, cutting head 6802 is configured to pivot in a sagittal plane relative to valgus block 6812 about flexion pin 6820 when flexion adjustment screw 6810 is turned, actuating cutting head 6802 via inter-meshing screw threads 6822 incorporated therein.

FIG. 80 depicts a view of cutting guide 6616 rigidly mounted to condylar guide 6612. Proximal surface 7904 is shown in contact with femur 6602. Cutting guide 6616 and condylar guide 6612 are configured so the distance 8002 between proximal surface 7904 and cutting slot 6804 matches the resection depth corresponding to the intended femoral implant, for example, about 9 mm Although 9 mm is typical, resection depths of about 7 mm to about 12 mm may be used. With the depth mechanically fixed, user 106 need only adjust the angle of the assembled cutting guide 6616 and condylar guide 6612 while resting proximal surface 7904 on femur 6602. When the target angle is achieved, one or more pins 8004 are inserted through cutting guide 6616 and into femur 6602 while user 106 holds handle 7902 to prevent the angle of condylar guide 6612 from changing during pinning Condylar guide 6612 is then removed. The angle and depth of cutting guide 6616 relative to femur 6602 can still be measured and reported by system 10 by tracking marker 6620, which is still rigidly mounted on cutting guide 6616. If the position of cutting guide 6616 is still acceptable, user 106 then removes marker and 6620 and resects femur 6602 through slot 6804. If cutting guide 6616 has moved during pinning, its angle and/or depth can be adjusted prior to resection.

VIII. Other Medical Procedures

Figure 10:
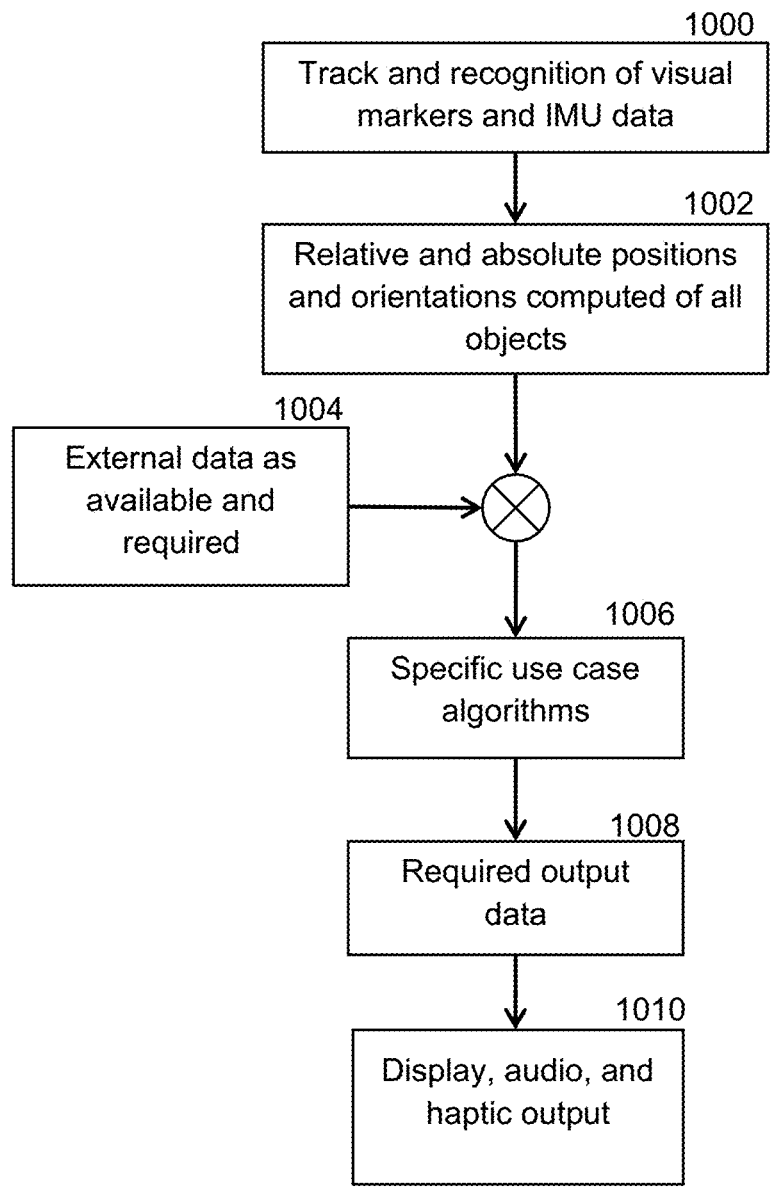
FIG. 10 is a flowchart showing a method of using the system of FIG. 1 to perform a general medical procedure in accordance with the principles of the present invention.

Referring to FIG. 10, the present invention further provides a method of using the system 10 to perform other surgical procedures (specific examples are provided below). The method includes data collection (1000) that includes, but is not limited to, tracking and recognition of visual markers and IMUs. This data is used to determine relative and/or absolute orientation and position of multiple items in the work view (1002). External data (1004) is brought into the algorithm. Algorithms are used to process the data for specific use cases (1006) and determine the required output (1008). This data is used in an augmented reality AR or virtual reality VR output display (1010) to assist the medical professional.

For example, these methods can be used for total hip arthroplasty. The markers (e.g., 100, 108, 110, etc.) for anatomic landmarks and tools are used for data collection (1000) and the determination of position and orientation (1002) of hip and surgical tools. Algorithms (1006) are used to determine solutions including, but not limited to, component positioning, femoral head cut, acetabulum positioning, screw placement, leg length determination, and locating good bone in the acetabulum for revision setting.

These methods can also be used for total knee arthroplasty. The markers (e.g., 100, 108, 110, etc.) for anatomic landmarks and tools are used for data collection (1000) and the determination of position and orientation (1002) of knee, tibia, and surgical tools. Algorithms (1006) are used to determine solutions including, but not limited to, location, angle, and slope of tibial cut; placement and fine-tuning of guide; avoidance of intra-medullary guide; and/or improvement of femoral cuts.

These methods can be used for corrective osteotomy for malunion of distal radial fractures. The markers (e.g., 100, 108, 110, etc.) for anatomic landmarks and tools are used for data collection (1000), which may be combined with pre-operative CT scan data for the determination of position and orientation (1002) of malunion and surgical tools. Algorithms (1006) are used to determine solutions including but not limited to location of osteotomy, angle of cut and assessment of results.

These methods can be used for corrective osteotomy for malunion of arm bones including the humerus, distal humerus, radius, and ulna with fractures that can be complicated and involve angular and rotational corrections. The markers (e.g., 100, 108, 110, etc.) for anatomic landmarks and tools are used for data collection (1000), which may be combined with pre-operative CT scan data for the determination of position and orientation (1002) of malunion and surgical tools. Algorithms (1006) are used to determine solutions including, but not limited to, location of osteotomy site, angle of cut, degree of correction, and assessment of results.

These methods can be used for distal femoral and proximal tibial osteotomy to correct early osteoarthritis and malalignment. The markers (e.g., 100, 108, 110, etc.) for anatomic landmarks and tools are used for data collection (1000), which may be combined with pre-operative CT scan data or long-leg X-ray imagery for the determination of position and orientation (1002) of osteotomy location and scale and surgical tools. Algorithms (1006) are used to determine solutions including, but not limited to, location of osteotomy site, angle of cut, degree of correction, and assessment of results.

These methods can be used for peri-acetabular osteotomy for acetabular dysplasia. The markers (e.g., 100, 108, 110, etc.) for anatomic landmarks and tools are used for data collection (1000), which may be combined with pre-operative CT scan data for the determination of position and orientation (1002) of osteotomy location and surgical tools. Algorithms (1006) are used to determine solutions including, but not limited to, location of osteotomy site, angulation, degree of correction, and assessment of results.

These methods can be used for pediatric orthopedic osteotomies similar to the previous embodiments. The markers (e.g., 100, 108, 110, etc.) for anatomic landmarks and tools are used for data collection (1000), which may be combined with pre-operative CT scan data for the determination of position and orientation (1002) of osteotomy location and surgical tools. Algorithms (1006) are used to determine solutions including, but not limited to, location of osteotomy site, angle of cut, degree of correction, and assessment of results.

These methods can be used for elbow ligament reconstructions including, but not limited to, radial collateral ligament reconstruction (RCL) and UCL reconstruction (Tommy-John). The markers (e.g., 100, 108, 110, etc.) for anatomic landmarks and tools are used for data collection (1000), which may be combined with pre-operative CT scan or MRI data for the determination of position and orientation (1002) of isometric points for ligament reconstruction and surgical tools. Algorithms (1006) are used to determine solutions including, but not limited to, precise localization of tunnel placement and assessment of results.

These methods can be used for knee ligament reconstructions including, but not limited to, MCL, LCL, ACL, PCL and posterolateral corner reconstructions. The markers (e.g., 100, 108, 110, etc.) for anatomic landmarks and tools are used for data collection (1000), which may be combined with pre-operative CT scan or MRI data for the determination of position and orientation (1002) of isometric points for ligament reconstruction and surgical tools. Algorithms (1006) are used to determine solutions including, but not limited to, precise localization of tunnel placement, tunnel depth, tunnel angle, graft placement, and assessment of results.

These methods can be used for ankle ligament reconstructions including, but not limited to, reconstruction to correct instability. The markers (e.g., 100, 108, 110, etc.) for anatomic landmarks and tools are used for data collection (1000), which may be combined with pre-operative CT scan or MRI data for the determination of position and orientation (1002) of isometric points for ligament reconstruction and surgical tools. Algorithms (1006) are used to determine solutions including, but not limited to, precise localization of tunnel placement, tunnel depth, tunnel angle, and assessment of results.

These methods can be used for shoulder acromioclavicular (AC) joint reconstruction surgical procedures including, but not limited to, placement of tunnels in the clavicle. The markers (e.g., 100, 108, 110, etc.) for anatomic landmarks and tools are used for data collection (1000), which may be combined with pre-operative CT scan or MRI data for the determination of position and orientation (1002) of isometric points for ligament reconstruction and surgical tools. Algorithms (1006) are used to determine solutions including, but not limited to, precise localization of tunnel placement, tunnel depth, tunnel angle, and assessment of results.

These methods can be used for anatomic and reverse total shoulder replacement (TSA and RSA) surgical procedures including revision TSA/RSA. The markers (e.g., 100, 108, 110, etc.) for anatomic landmarks and tools are used for data collection (1000), which may be combined with pre-operative CT scan or MRI data for the determination of position and orientation (1002) of humeral head, related landmarks, and surgical tools. Algorithms (1006) are used to determine solutions including, but not limited to, precise localization of humeral head cut and glenoid bone placement, baseplate and screws, and reaming angle and guide placement for glenoid correction, and assessment of results.

These methods can be used for total ankle arthroplasty surgical procedures. The markers (e.g., 100, 108, 110, etc.) for anatomic landmarks and tools are used for data collection (1000), which may be combined with pre-operative CT scan or MRI data for the determination of position and orientation (1002) of tibia, fibula, talus, navicular and other related landmarks and surgical tools. Algorithms (1006) are used to determine solutions including, but not limited to, precise localization of tibial head cut, anatomic axis determination, and assessment of results.

These methods can be used for percutaneous screw placement for pelvic fractures, tibial plateau, acetabulum and pelvis, but not limited to these areas. The markers (e.g., 100, 108, 110, etc.) for anatomic landmarks and tools are used for data collection (1000), which may be combined with pre-operative CT scan or MRI data for the determination of position and orientation (1002) of anatomic and other related landmarks and surgical tools including screws. Algorithms (1006) are used to determine solutions including, but not limited to, precise localization of bones receiving screws, surrounding anatomy and soft tissue features to be avoided, localization of screws, angle of insertion (e.g., of an injection), depth of insertion (e.g., of an injection), and assessment of results.

These methods can be used for in-office injections to areas including, but not limited to, ankle, knee, hip, shoulder, and spine. The markers (e.g., 100, 108, 110, etc.) for anatomic landmarks and tools are used for data collection (1000), which may be combined with pre-operative CT scan or MRI data for the determination of position and orientation (1002) of related landmarks and surgical tools. Algorithms (1006) are used to determine solutions including, but not limited to, precise localization of injection location, angulation, and depth in order to maximize effect and minimize interaction with internal organs and anatomy.

These methods can be used for pedicle screw placement for spinal fusion procedures including the lumbar and thoracic spine, but not limited to these areas. The markers (e.g., 100, 108, 110, etc.) for anatomic landmarks and tools are used for data collection (1000), which may be combined with pre-operative CT scan or MRI data for the determination of position and orientation (1002) of anatomic and other related landmarks and surgical tools including screws. Algorithms (1006) are used to determine solutions including, but not limited to, precise localization of bones receiving screws, opening of the cortex, cranial-caudal angulation or similar, medio-lateral inclination, screw insertion trajectory, depth of insertion, and assessment of results.

These methods can be used for visualization of alternate spectrum imagery including, but not limited to, infrared, ultraviolet, ankle, knee, hip, shoulder, and spine. The markers (e.g., 100, 108, 110, etc.) for anatomic landmarks and tools are used for data collection (1000), which may include, but is not limited to, dual color camera(s) with alternate spectrum sensitivities and/or injection dye for highlight of the patient's features for the determination of position and orientation (1002) of related landmarks and surgical tools and position, location, and type of anatomic features more readily visible in alternate spectrums including nerves, tumors, soft tissues and arteries. Algorithms (1006) are used to determine solutions including, but not limited to, precise localization of nerves, tumors, soft tissues of interest, arteries and other features of interest that can be enhanced with this technique.

These methods can be used for tumor diagnostic, staging, and curative surgical procedures. The markers (e.g., 100, 108, 110, etc.) for anatomic landmarks and tools are used for data collection (1000), which may be combined with pre-operative CT scan or MRI data for the determination of position and orientation (1002) of tumor location and surgical tools. Alternately during diagnostic surgery, localization of the tumor with respect to anatomic landmarks can be performed. Algorithms (1006) are used to determine solutions including, but not limited to, location of tumor site and size extent, removal guidance and assessment of results.

These methods can be used for projection of a visible or invisible but camera visible point of light on objects of interest in the field of regard, including, but not limited to, bony landmarks, nerves, tumors, and other organic and inorganic objects. The markers (e.g., 100, 108, 110, etc.) are used to augment or supersede external data sets for anatomic data and can be used in place of a physical pointer or tool as has been described previously. The point of light can be displayed from the user's head display or other location. The point of light can also be manifested as a pattern or other array of lights. These light(s) highlight features on the patient for determination of position and orientation (1002) of related landmarks and surgical tools, as well as augmentation of data sets including, but not limited to, fluoroscopy, CT scans and MRI data. Algorithms (1006) are used to determine solutions previously described but with the alternate or added selection option.

These methods can be used for minimally invasive positioning of implants and inserting locking screws percutaneously. A marker (e.g., 100, 108, or 110, etc.) is mounted on the proximal end of an intramedullary nail. Another marker (e.g., 100, 108, or 110, etc.) is mounted on the cross-screw insertion tool. A virtual model of the nail is displayed including the target trajectory for the locking cross-screw. The surgeon is able to insert the cross screw by aligning the virtual cross-screw with the target trajectory. In another embodiment, the same method can be applied to the external fixation plates. In this case, virtual locking plate with a plurality of locking screw trajectories, one for each hole, would be displayed.

These methods can be used for visualization of ultrasound imaging data. In one application, the system can assist in guidance of needles during medical procedures, such as injection of anesthetic drugs. Ultrasound imaging can assist in needle visualization, but not until the needle enters the ultrasound field of view within the tissue, by which time its trajectory is already established and cannot be adjusted without causing pain to the patient. The system of the present invention can assist the user with tracking a needle both before and after insertion. Referring to FIGS. 10 and 31, a fiducial 3106 is mounted on an ultrasound transducer 3104. As the user 106 collects 2D images of an internal anatomy of a patient using the ultrasound transducer, the system 10 simultaneously tracks the position and orientation of the ultrasound transducer 3104 and receives the 2D ultrasound images 1004. The system 10 could, optionally and/or additionally, track patient 1900. The system 10 then combines the 2D images of the patient with the position and orientation of the ultrasound transducer 3104 relative to the patient; reconstructs the 2D images in a common reference frame using the acquired ultrasound transducer and patient position and orientation data; and displays the reconstructed images or 3D images to the user 106 in AR headset 3600. The system 10 can further use image analysis algorithms 1006 to generate and display surface or solid models 1008 created from anatomic structures identified in the imaging data. The system 10 can optionally display a virtual tool superimposed on the 3D imaging data based on the tracked position of one or more physical tools, such as a needle. Since the accuracy of the 3D reconstruction is subject to errors such as magnification discrepancies due to the speed of sound in various tissues, the relative position of a virtual tool may be imperfect. However, once the needle enters the ultrasound field of view, its positional accuracy is improved by direct visualization of the needle in the image. At this stage, the 3D reconstruction of the needle is valuable in determining the location of the needle tip, which is difficult to distinguish from a random cross-section in a standard 2D image. Knowing the location of the needle tip, not just its axis, assists the user in inserting the needle to the desired depth without causing injury to adjacent tissues. The system 10 continues to track a position and an orientation of a probe (e.g., needle, injection, pin, screw, etc.) and displays an axis (e.g., along an axial length of the probe) and/or location of the tip of the probe relative to the 3D image of the internal anatomy of the patient. The axis may be, for example, a virtual axis of the probe or a graphical representation of the probe. The tip of probe is then advanced to a desired position based on the location relative to the internal anatomy of the patient. Optionally, as shown in FIG. 31, an outer surface of the patient is mapped using stereo cameras and displayed in conjunction with the 3D images of the internal anatomy of the patient and/or ultrasound transducer 3104.

IX. Database of Trackable Instruments and Equipment

Figure 29:
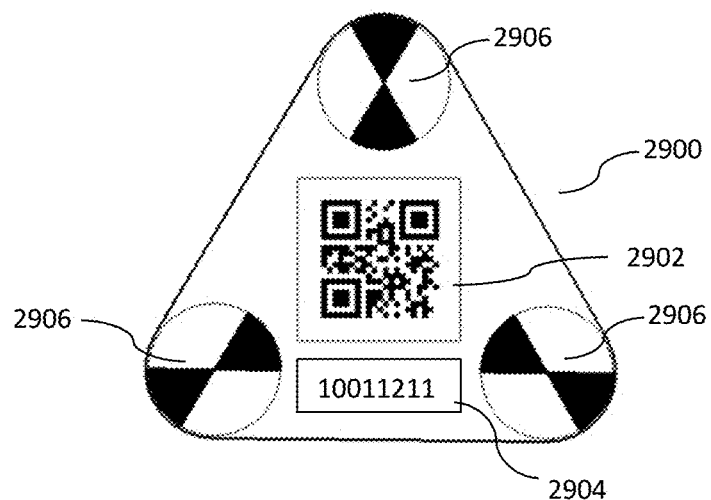
FIG. 29 shows a front view of a diagrammatic depiction of an equipment identification and tracking label that is optionally included in the system of FIG. 1.

The present invention optionally includes the construction of an electronic database of instruments and equipment in order to allow the AR headset 3600 to identify what instruments are present in the surgical field or in the operating room area. Referring to FIG. 29, a serialized tracking label 2900 is optionally included in the system to facilitate the construction of such database. The serialized tracking label 2900 includes a machine-readable serial number code 2902, a human readable serial number 2904, and a set of optical features which facilitate six-degree of freedom optical pose tracking such as a plurality of fiducials 2906. In one embodiment, the machine-readable number code 2902 pattern can be imaged by the camera(s) 3904 of the AR headset 3600 and used alone to determine pose and position of the medical instrument using machine vision algorithms. In another embodiment, the serial number image 2904 can be imaged by the camera(s) 3904 and used alone to determine pose and position of the medical instrument using machine vision algorithms. In yet another embodiment, the entire physical model of the tracking label 2900 can be imaged by the camera(s) 3904 and used alone to determine pose and position of the medical instrument using machine vision algorithms. In another embodiment, the tracking label 2900 may be comprised or contain a wireless RFID tag for non-optical identification of equipment in a kit that can be then verified automatically using optical recognition.

Figure 30:
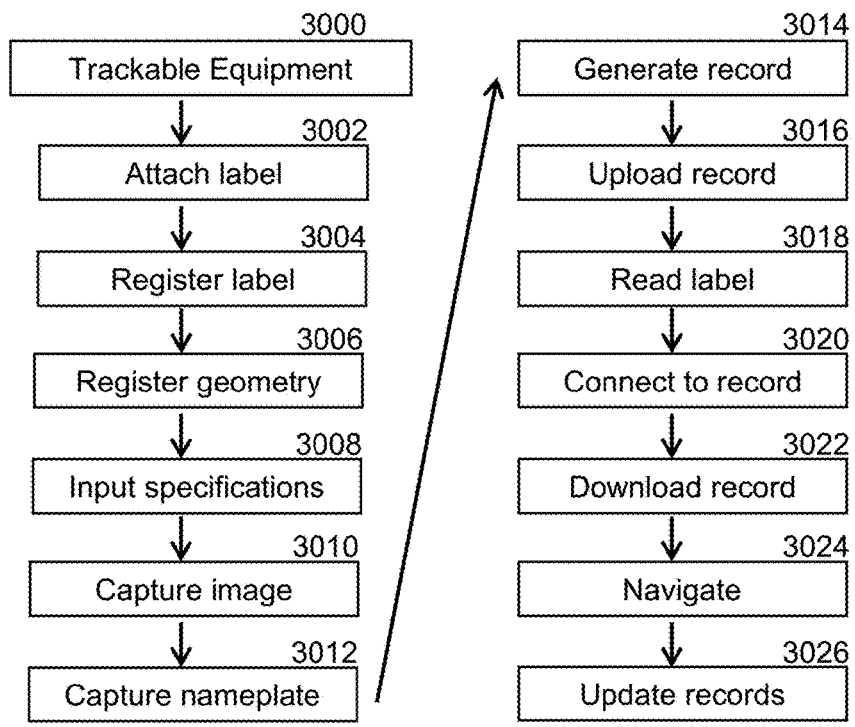
FIG. 30 is a flowchart of a method for registering, sharing, and/or tracking medical equipment using the system of FIG. 1 in accordance with the principles of the present invention.

Referring to FIG. 30, a flowchart showing a system for registering item type and physical parameters of equipment and storing and sharing this data for use in surgery using an augmented reality headset is provided. In this exemplary embodiment, serialized trackable labels are pre-printed on durable self-adhesive material. The label is attached (3002) to an item of equipment (3000), which could be, but is not limited to, a C-arm, impactor, pointer, or any other equipment used in the procedure, in a location which will be most advantageously viewed during a surgical procedure or in the preparatory effort leading to the procedure (i.e. back table operations). The label is then registered (3004) by viewing with the camera(s) 3904, identifying the label, and initiating a database record associated with that serial number. Geometry of interest relating to the item of equipment can also be registered (3006) and stored relative to the trackable sticker. For example, in the case of a C-arm, a registration stylus may be used to register three points around the perimeter of the face of the imager and a point representing the origin of the X-ray beam source. This provides a coordinate frame, orientation (pose) data, and position data of the X-ray beam source with respect to the AR headset 3600 coordinate frame for use by the AR headset's 3600 algorithms. In one alternate embodiment, the cameras 3904 are stereo cameras and are used to scan and recognize C-arm geometry by recognition of key features such as the cylindrical or rectangular surface of the imager. Additional relevant specifications (3008) for the item of equipment can be entered into the record and includes, but is not limited to, the equipment type and model, calibration due date, electronic interface parameters, and wireless connectivity passwords. An image of the device is captured 3010 with the camera(s) 3904. An image of the equipment label (3012) of the device is captured. All these items are added to the completed record (3014), which is currently local to the AR headset 3600. The record is then time-stamped and shared with a central database (3016). This may be located on a local server within the hospital system or in any remote server including any cloud-based storage via the internet. Upload of the database may be done via Wi-Fi common network protocols or other art-disclosed means. The above actions may be performed by a company representative, a technician employed by the hospital, or any other trained individuals. To prevent poorly registered equipment entering the database, administrator privileges may be required to capture a record.

When an item of equipment is being used in surgery, the camera(s) 3904 are utilized to recognize the label as a trackable item of equipment and read the serial number (3018). The AR headset 3600 can then connect (3020) to the database and download the equipment record (3022). The equipment can thus be used in a six-degree of freedom trackable manner during the surgery (3024). If applicable, to the equipment with the data labels, the records (3026) may also be updated with data specific to the equipment itself, for example, upload images captured by the equipment during a surgery or capture logs of equipment activity during a surgery in a log. Log entries describing the use of the equipment in the surgery can be added to the database and to the patient record showing utilization of the equipment. The database thus generated can be mined for various reasons such as retrieving usage of defective equipment.

The system may also be used to recognize surgical instruments and implants encountered during surgery. A database of CAD models of instruments and equipment to scale is held in memory. During a procedure, SLAM or similar machine vision algorithms can capture topography of items in the scene and compare to the database on instruments and equipment. If a match is found, system can then take actions appropriate such as tracking the position and orientation of instruments relative to the patient and other instruments being used in surgery or enter a mode relevant to use of that instrument. For example, in a hip replacement procedure, if an acetabular impactor is detected, the mode for cup placement navigation is entered.

The system may also use its knowledge of the current software workflow steps to provide applicable instructions to OR staff, such as a scrub tech. Instructions may be displayed on a remote monitor or a second AR headset 3600 networked with the surgeon's system. For example, the system may display information about the next step coming in the workflow and instruct the scrub tech or assistant which instruments to prepare, optionally including pictures, video, or audio instructions for locating, identifying, or assembling the required instrumentation. The system's cameras could be used to identify specific instruments or instrument sets and indicate required instruments to an assistant and via an AR headset display. The surgeon or other experienced user could optionally input custom instructions to be displayed to assistants or staff for each step in a surgical workflow.

Figure 65:
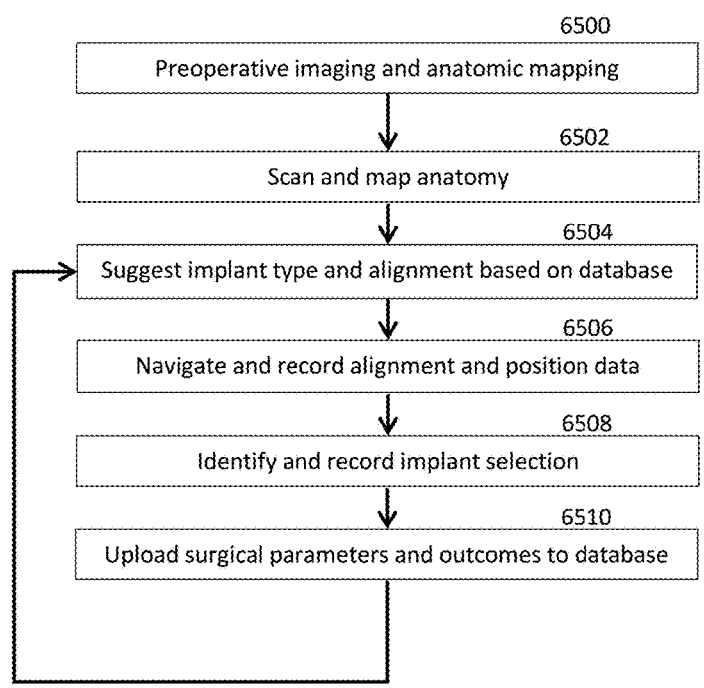
FIG. 65 is a flowchart showing an exemplary method of optimizing surgical parameters.

The system may also be used to optimize implant selection and/or placement based on outcomes data or common practice. FIG. 65 depicts a flowchart showing an exemplary method for using the system to assist in surgical decision-making. The system first scans and maps the native anatomy using sensor suite 210 (block 6502). Optionally, the anatomic data may be augmented or replaced by preoperative imaging such as CT or MRI. Then, comparing the anatomy to a database and identifying cases with similar anatomy, the system outputs implant types, alignment, and positioning of components (block 6504). Alternatively, or additionally, the system outputs implant types based on one or more shape matching algorithms that match one or more characteristics of the anatomy with a best fit within a database of known implants. The one or more characteristics of the anatomy used for the one or more shape matching algorithms may be based on inter-operative imaging scans, as opposed to pre-operative imaging scans. The user 106 proceeds to navigate and complete the surgery as the system 10 records the actual alignment and positioning data (block 6506). The system 10 proceeds to record the implant type and size selected by the user 10, either by automated scanning with sensor suite 210, or with manual input (block 6508). The surgical data are uploaded to a database including surgical outcomes, if available (block 6510). The updated database is used to inform the next case at block 6504. Suggestions may be based on desired surgical outcomes, if available in the database, or based on common practice by the same user 106 or other users in similar situations. Other data may be collected intraoperatively, including data on procedure time and instrument usage. Sensor suite 2010 may use machine vision algorithms to automatically identify instruments during surgery and record which instruments are used in each procedure, as well as when instruments are used. Hospitals may use this information for efficiently packaging instrument sets to contain the most commonly used instruments, or for training or instructing staff on when in a procedure specific instruments are needed. Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

X. Speech and/or Gaze Use in Systems and Methods Herein

Figure 84:
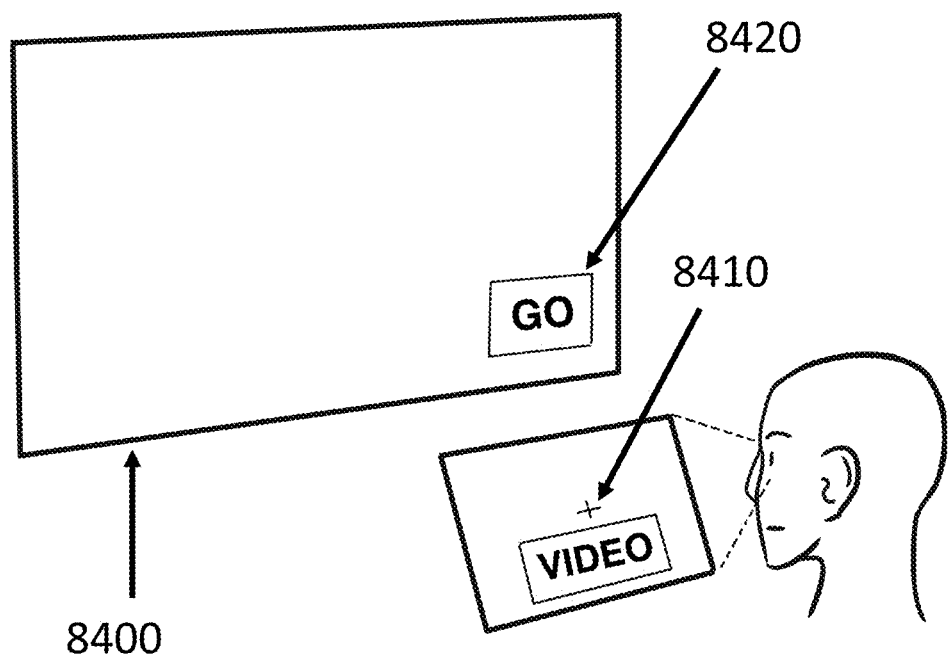
FIG. 84 shows one embodiment of a gaze control method.

As shown in FIG. 84, in some embodiments, any one or more of the devices or systems described herein may implement gaze control. As used herein, 'gaze' refers to a process in which augmented reality virtual objects are positioned and fixed in inertial space (i.e., inertial fixed object 8400) but can also be interacted upon by the user. The user can turn their head or move about the room and one or more inertial fixed objects 8400 remain fixed in the local environment or in inertial space. In some embodiments, a reticle 8410 is shown in a center or a center region of the eyepiece display. If the user moves such that this reticle 8410 visually lines up with one of the virtual objects 8420, then the head-worn display and navigation system is configured to activate the virtual object 8420. As an example, the system presents a virtual object, for example a button with a lightbulb on it. The virtual object is fixed in inertial space in the local environment or the environment surrounding the user. The system may prompt the user to orient his view so that the lightbulb object is in line with the reticle in the center of the eyepiece. The interaction between the reticle and the virtual object is detected, such that the virtual object is activated, for example the headlamp is turned on (or off) based on this control input (aligning the reticle with the virtual object) from the user.

This gaze control can be used for many interactions including, but not limited to, user input selection (e.g., button selection, on or off control, slider control, etc.), alpha-numerical input (e.g., through selection on a virtual keypad), etc.

There are times when it is more beneficial to have a head fixed display that always shows content regardless of head position, however. This is referred to as a "head fixed" object—a virtual object moves synchronously with movement of the head-worn display. The reticle described in FIG.

84 is a head-fixed object while the virtual objects 8400, 8420 shown in FIG. 84 are inertially fixed objects.

Head fixed objects versus inertially fixed objects can be managed for use concurrently in a surgical procedure. Specifically, inertial screens are used for information data and control of the system using gaze control. However, when tracking targets, a 'head fixed' video screen showing the navigation camera tracking scene is displayed in addition to the inertial screens. The inertial screens can be placed such that the controls are very close to the operative site. When the surgeon looks at the operative site, a head fixed screen showing tracking content is displayed. Since the gaze controls are located inertially in the same field of view, the surgeon can control the system with minimal head motion.

Figure 85:
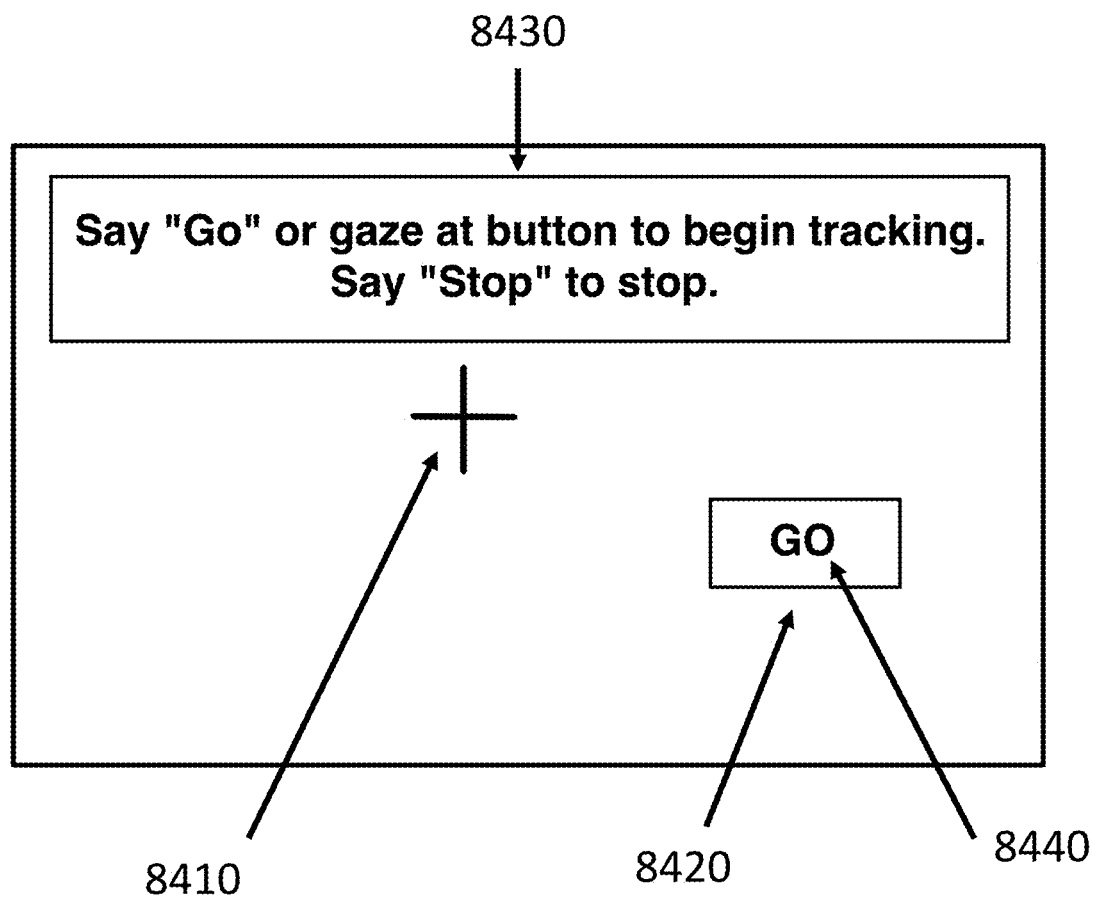
FIG. 85 shows one embodiment of a speech recognition and/or gaze control method.

Further, as shown in FIG. 85, in some embodiments, any one or more of the devices or systems described herein may implement speech recognition. As used herein, 'speech recognition' is the process of taking audible speech and processing it to recognize utterances. This can include words like "go" or "stop". The simultaneous use of gaze control with speech recognition reduces a surgeon's reliance on gaze control (and resulting head motion that is less desirable at certain times in a surgery). Having both speech recognition and gaze control active reduces the risk that use of one or the other exclusively would result in poor interaction for the surgeon (i.e., speech recognition is unable to determine his command, or gaze control is laborious for a long surgery).

For example, in one embodiment, the system may prompt the user, for example a surgeon, to use gaze control to select a user input element or virtual object 8420, for example a 'forward' button, using a reticle or virtual control 8410. The system is configured to accept the gaze control-based input from the user and display a screen, window, or other indicator 8430 that prompts the user to say 'go', say 'stop', or to gaze at a button to start tracking or the like. In some embodiments, a virtual object 8420, for example a button, may also include a label 8440, for example text that says 'go'. The user is prompted by the system to either gaze at the virtual object 8420 to activate tracking or say the word "go" out loud. When tracking starts, the virtual object label 8440 is changed to "stop" or to another indicator, for example a red color. The system may then prompt the user to either gaze at the virtual object 8420 to de-activate tracking or say the word 'stop'.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor in the support module and/or a computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context clearly dictates otherwise. For example, the term "sensor" may include, and is contemplated to include, a plurality of sensors. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method for navigating a knee replacement procedure utilizing a head-worn surgical navigation system, the method comprising:

providing, during the procedure, the head-worn surgical navigation system having a sensor suite comprising at least one of a head worn depth sensor and a head worn stereoscopic camera, a display device, and at least one processor, the head-worn surgical navigation system being configured to perform instructions with the at least one processor, the instructions comprising:

performing, using the at least one of a head worn depth sensor and a head worn stereoscopic camera, a plurality of scans of a region defined for the procedure;

generating, based on at least a portion of the plurality of scans, a 3D reference topographical surface map associated with a distal surface of a femur in the region defined for the procedure;

generating, based on at least one of the plurality of scans, at least one 3D displaced topographical surface map for the distal surface of the femur in the region defined for the procedure;

aligning the at least one 3D displaced topographical surface map with the 3D reference topographical surface map to determine a geometric rotation and translation between the at least one 3D displaced topographical surface map and the 3D reference topographical surface map;

tracking a pose of the femur based on the determined geometric rotation and translation;

generating virtual content based on the tracked pose; and causing, on the display device, display of the generated virtual content.

2. The method of claim 1, further comprising:
tracking at least one tool during the procedure, wherein data obtained from the tracking of the at least one tool is used to arrange the virtual content to align the at least one tool with a portion of the region defined for the procedure.

3. The method of claim 2, wherein: the at least one tool includes a saw;
the virtual content includes a virtual saw blade defining a resection plane; and
the instructions include directions for a user of the head-worn surgical navigation system to align the saw to a resection site defined by the resection plane to perform a resection at the resection site using the saw.

4. The method of claim 3, wherein the resection site is depicted as a virtual resection plane associated with a resection associated with the femur.

5. The method of claim 2, wherein:
the at least one tool includes a cutting tool; and
the virtual content includes a virtual ideal plane of resection to be performed by the cutting tool.

6. The method of claim 1, wherein the virtual content includes virtual text, a virtual image, a virtual marker, a virtual highlight, a virtual control, a virtual trajectory, a hologram, or a virtual target.

7. The method of claim 6, wherein the virtual image includes portions of a surgical tool associated with the knee replacement procedure, portions of an anatomical object in a field of view associated with the head-worn surgical navigation system, virtual guides, or a virtual landmark.

8. The method of claim 1, wherein the virtual content is supplemented by audio or tactile feedback.

9. The method of claim 1, wherein the virtual content includes data about a proposed implant size associated with the knee replacement procedure, the data including suggested femur implant sizes based on retrieved external implant data, the method further comprising causing, on the display device, display of the data.

10. The method of claim 1, wherein the virtual content depicts instructions to be carried out during the knee replacement procedure.

11. A method for navigating a knee replacement procedure utilizing a head-worn surgical navigation system, the method comprising:

providing, during the procedure, the head-worn surgical navigation system having a sensor suite comprising at least one of a head worn depth sensor and a head worn stereoscopic camera, a display device, and at least one processor, the head-worn surgical navigation system being configured to perform instructions with the at least one processor, the instructions comprising:

performing, using the at least one of a head worn depth sensor and a head worn stereoscopic camera, a plurality of scans of a region defined for the procedure;

generating, based on at least a portion of the plurality of scans, a 3D reference topographical surface map associated with a proximal surface of a tibia in the region defined for the procedure;

generating, based on at least one of the plurality of scans, at least one 3D displaced topographical surface map for the proximal surface of the tibia in the region defined for the procedure;

aligning the at least one 3D displaced topographical surface map with the 3D reference topographical surface map to determine a geometric rotation and translation between the at least one 3D displaced topographical surface map and the 3D reference topographical surface map;

tracking a pose of the femur based on the determined geometric rotation and translation;

generating virtual content based on the tracked pose; and causing, on the display device, display of the generated virtual content.

12. The method of claim 11, wherein the virtual content depicts at least one location guide for at least one pin for a tibial cutting block.

13. The method of claim 11, further comprising:
tracking at least one tool during the procedure, wherein data obtained from the tracking of the at least one tool is used to arrange the virtual content to align the at least one tool with a portion of the region defined for the procedure.

14. The method of claim 13, wherein: the at least one tool includes a saw;
the virtual content includes a virtual saw blade defining a resection plane; and
the instructions include directions for a user of the head-worn surgical navigation system to align the saw to a resection site defined by the resection plane to perform a resection at the resection site using the saw.

15. The method of claim 14, wherein the resection site is depicted as a virtual resection plane associated with a resection associated with the tibia.

16. The method of claim 13, wherein:
the at least one tool includes a cutting tool; and
the virtual content includes a virtual ideal plane of resection to be performed by the cutting tool.

17. The method of claim 11, wherein the virtual content includes virtual text, a virtual image, a virtual marker, a virtual highlight, a virtual control, a virtual trajectory, a hologram, or a virtual target.

18. The method of claim 17, wherein the virtual image includes portions of a surgical tool associated with the knee replacement procedure, portions of an anatomical object in a field of view associated with the head-worn surgical navigation system, virtual guides, or a virtual landmark.

19. The method of claim 11, wherein the virtual content includes data about a proposed implant size associated with the knee replacement procedure, the data including suggested tibia implant sizes based on retrieved external implant data, the method further comprising causing, on the display device, display of the data.

20. The method of claim 11, wherein the virtual content depicts instructions to be carried out during the knee replacement procedure.

* * * * *